(12) United States Patent
Goodman

(10) Patent No.: US 6,243,446 B1
(45) Date of Patent: *Jun. 5, 2001

(54) DISTRIBUTED SPLITTER FOR DATA TRANSMISSION OVER TWISTED WIRE PAIRS

(75) Inventor: David D. Goodman, Arlington, VA (US)

(73) Assignees: Inline Connections Corporation, Arlington, VA (US); CAIS, Inc., Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/362,180

(22) Filed: Jul. 27, 1999

Related U.S. Application Data

(63) Continuation of application No. 08/814,837, filed on Mar. 11, 1997, now Pat. No. 5,844,596.

(51) Int. Cl.⁷ .................................................. H04M 11/00
(52) U.S. Cl. ..................................... 379/93.01; 379/90.01
(58) Field of Search ............. 379/90.01, 102.01–102.03, 379/93.17, 93.26, 93.28, 93.37, 93.01; 348/14–16, 734, 7

(56) References Cited

U.S. PATENT DOCUMENTS

| | | |
|---|---|---|
| 3,723,653 | 3/1973 | Tatsuzawa . |
| 3,937,889 | 2/1976 | Bell . |
| 3,974,337 | 8/1976 | Tatsuzawa . |
| 3,992,589 | 11/1976 | Kuegler . |
| 4,054,910 | 10/1977 | Chou . |
| 4,302,629 | 11/1981 | Foulkes et al. . |
| 4,328,579 | 5/1982 | Hashimoto . |
| 4,509,211 | 4/1985 | Robbins . |
| 4,546,212 | 10/1985 | Crowder . |
| 4,608,686 | 8/1986 | Barsellotti . |

(List continued on next page.)

FOREIGN PATENT DOCUMENTS

| | | |
|---|---|---|
| 062442 | 10/1982 | (EP) . |
| 2166322 | 4/1986 | (GB) . |
| 2166328 | 4/1986 | (GB) . |
| 127358 | 1/1989 | (JP) . |
| WO8805979 | 8/1988 | (WO) . |
| WO9107018 | 5/1991 | (WO) . |

OTHER PUBLICATIONS

* Waring, David L., The Asymmetrical Digital Subscriber Line (ADSL): A New Transport Technology for Delivery Wideband Capabilities to the Residence), IEEE Globecom 1991.

*Primary Examiner*—Wing F. Chan
(74) *Attorney, Agent, or Firm*—Fish & Richardson PC

(57) ABSTRACT

A system that provides video signal communication between a source of the video signal and a plurality of units that include destinations of the video signal includes an interface coupled to the source and to telephone lines, each of which serves at least one of the units and carries voice signals to and from one or more telephones coupled to the telephone line at said unit. The interface receives the video signal from the source, and transmits the received video signal onto at least one of the telephone lines in a selected frequency range that is different from frequencies at which the voice signals are carried on that telephone line. This causes the video signal to be coupled to a receiver which is connected to the telephone line at the unit served by that line and is adapted to recover the video signal from the telephone line and apply it to one or more of the destinations at the unit. The source is a cable (e.g., electrical or fiber optic) that is linked to the interface and that carries a plurality of video signals. The destinations are, e.g., televisions. The units can be residences (such as individual houses or apartments in an apartment building) or offices in an office building.

6 Claims, 25 Drawing Sheets

U.S. PATENT DOCUMENTS

| | | |
|---|---|---|
| 4,670,870 | 6/1987 | Sato . |
| 4,679,227 | 7/1987 | Hughes . |
| 4,709,412 | 11/1987 | Seymour . |
| 4,757,495 * | 7/1988 | Decker et al. . |
| 4,757,497 | 7/1988 | Beierle . |
| 4,766,402 | 8/1988 | Crane . |
| 4,776,006 | 10/1988 | Comerford . |
| 4,785,448 | 11/1988 | Reichart . |
| 4,785,472 | 11/1988 | Shapiro . |
| 4,799,213 * | 1/1989 | Fitzgerald . |
| 4,807,225 | 2/1989 | Fitch . |
| 4,825,435 | 4/1989 | Amundsen . |
| 4,829,570 | 5/1989 | Schotz . |
| 4,849,811 | 7/1989 | Kleinerman . |
| 4,882,747 | 11/1989 | Williams . |
| 4,885,803 | 12/1989 | Hermann . |
| 4,890,316 | 12/1989 | Walsh . |
| 4,893,326 | 1/1990 | Duran . |
| 4,918,688 * | 4/1990 | Krause et al. . |
| 4,924,492 | 5/1990 | Gitlin . |
| 4,949,187 | 8/1990 | Cohen . |
| 4,953,160 | 8/1990 | Gupta . |
| 4,955,048 | 9/1990 | Iwamura . |
| 4,985,892 | 1/1991 | Camarata . |
| 5,010,399 * | 4/1991 | Goodman . |
| 5,025,443 | 6/1991 | Gupta . |
| 5,036,513 | 7/1991 | Greenblatt . |
| 5,089,886 | 2/1992 | Grandmougin . |
| 5,095,497 | 3/1992 | Aman . |
| 5,247,347 | 9/1993 | Litteral . |
| 5,283,637 | 2/1994 | Goolcharan . |
| 5,844,596 * | 12/1998 | Goodman ........................ 348/14 |
| 5,929,896 | 7/1999 | Goodman . |
| 5,949,473 * | 9/1999 | Goodman ........................ 348/14 |

* cited by examiner

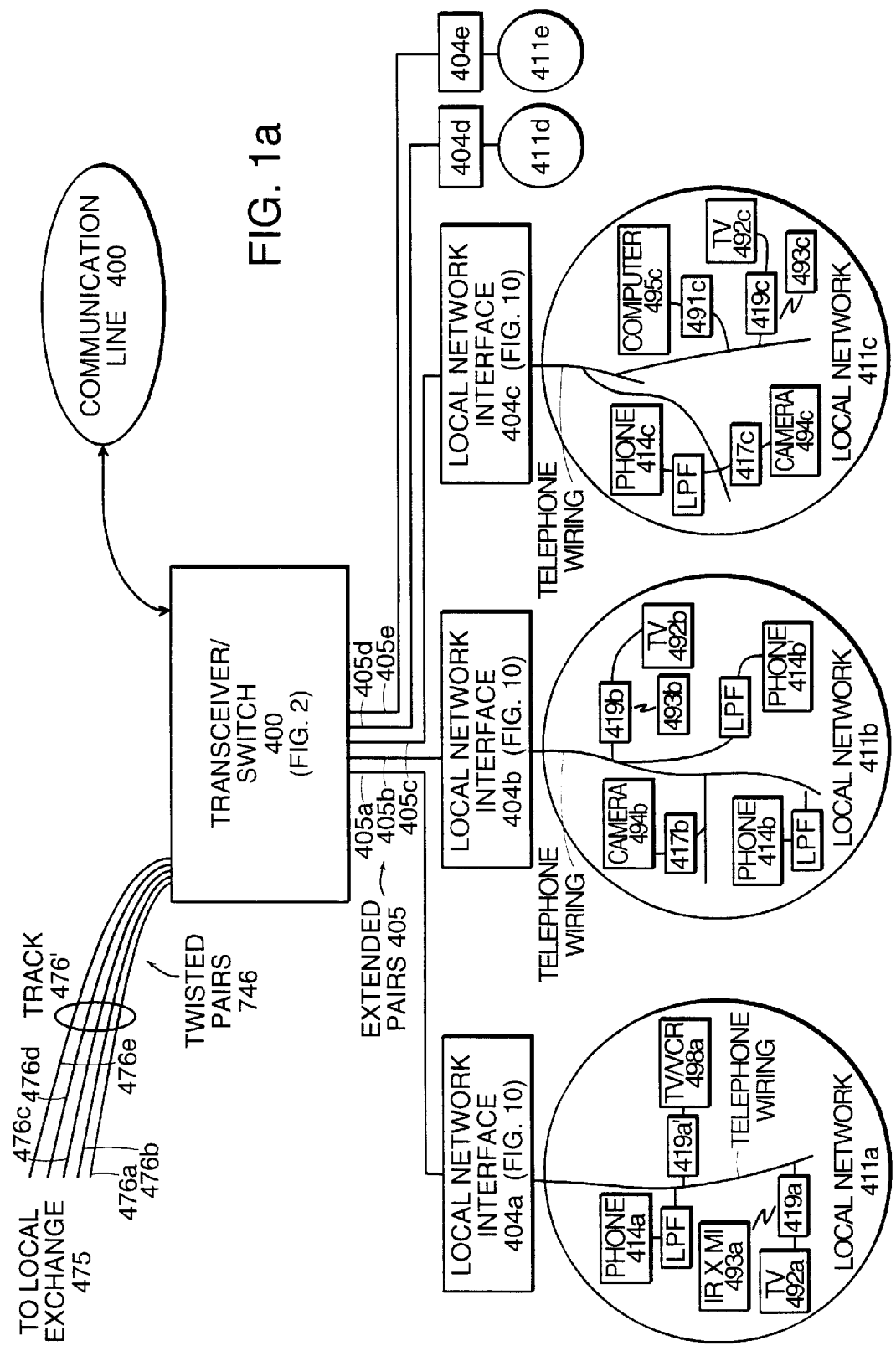

SPECTRUM OF AN AMPLITUDE MODULATED NTSC SIGNAL NEAR VOICEBAND

SPECTRUM OF AN NTSC SIGNAL TRANSMITTING AT BASEBAND

SPECTRUM OF AN FM NTSC SIGNAL NEAR VOICEBAND

FIG. 8

| | ORIGIN/DEST | FREQUENCY DURING TRANSMISSION OVER EXTENDED PAIRS (MHz) | | | FREQUENCY DURING TRANSMISSION OVER LOCAL NETWORKS (MHz) | | |
|---|---|---|---|---|---|---|---|
| | | 405a | 405b | 405c | 411a | 411b | 411c |
| CONTROL A | 493a/415 | 22.75-23.25 | | | 22.75-23.25 | | |
| B | 493b/415 | | 22.75-23.25 | | | 22.75-23.25 | |
| C | 493c/415 | | | 22.75-23.25 | | | 22.75-23.25 |
| VIDEO U | 402/492a | 1-6(AM) | | | 12-18(AM) | | |
| V | 402/492b 492c 498a | 7-22(FM) | 1-6(AM) | 1-6(AM) | 24-30(AM) | 54-60(AM) | 12-18(AM) |
| W | 494b/402 | | 24-54(FM) | | | 6-12(AM) | |
| X | 494c/402 | | | 24-54(FM) | | | 6-12(AM) |
| DIGITAL Y | 402/495c | | | 6-18 | | | 18-40 |
| Z | 495c/402 | | | 54-100 | | | 1-6 |

DISTRIBUTED SPLITTER FOR DATA TRANSMISSION OVER TWISTED WIRE PAIRS

CROSS REFERENCE TO RELATED APPLICATIONS

This application is a continuation of U.S. Ser. No. 09/191,168, filed Nov. 13, 1998, which is a continuation of U.S. Ser. No. 08/814,837, filed on Mar. 11, 1997, which issued as U.S. Pat. No. 5,844,596 on Dec. 1, 1998, which is a continuation of U.S. Ser. No. 08/673,577, filed on Jul. 1, 1996, which is a continuation of U.S. Ser. No. 08/545,937, filed on Oct. 20, 1995, which is a continuation of 08/372,561, filed on Jan. 13, 1995, which is a continuation of U.S. Ser. No. 08/245,759, filed on May 18, 1994, which is a continuation of U.S. Ser. No. 08/115,930, filed on Aug. 31, 1993, which is a continuation of U.S. Ser. No. 07/802,738, filed on Dec. 5, 1991, which is a continuation of U.S. Ser. No. 07/688,864, filed on Apr. 19, 1991, which is a continuation-in-part of U.S. Ser. No. 07/379,751, filed on Jul. 14, 1989, which issued as U.S. Pat. No. 5,010,399 on Apr. 23, 1991.

INTRODUCTION

The present invention relates to a system for simultaneous two-way communication of video signals and other signals between multiple networks of telephone wiring whose twisted pairs converge together into a single bundle, wiring block, or other common point of access, and a high capacity communication line located at that point of access. Each network includes a set of interconnected, active telephone wires (i.e., a group of wires that create a conductive path for telephonic signals) internal to a house, an apartment unit, or a room in a commercial building. (Such wiring internal to houses, apartment units, or rooms in commercial buildings shall be referred to herein as "local networks.") In the case of houses, the point of common access can be a telephone pole. In the case of apartment buildings, the point of access can be the "wiring closets" found in those buildings. In the case of commercial buildings, the point of access can be the electronic PBX, or "private branch exchange" common to those types of buildings. The high capacity line can be a coaxial cable or an optical fiber. In addition to communication between each network and the high capacity line, communication from one network to another is also provided.

This invention is partly an outgrowth of technology presented in the parent application, and two other continuations-in-part thereof, respectively entitled "RF Broadcast System Utilizing Internal Telephone Lines" (hereinafter, the "first CIP application") and "Cable TV Distribution and Communication System Utilizing Internal Telephone Wiring" (hereinafter, the "second CIP application"). The first and second CIP applications were filed on the same day as this application. The parent application and the first and second CIP applications are incorporated herein by reference.

The communication systems disclosed in the parent and first and second CIP applications are designed to simultaneously transmit telephone signals and non-telephonic signals (such as cable television signals, other video signals, audio signals, data signals, and control signals) across the active telephone wiring internal to (i.e., locally within) residences and other structures. The present invention adds to these techniques, providing distribution of all of these signals to a local network of active telephone wiring (i.e. the wiring internal to a house, apartment unit, or a room in a commercial building) from a distribution device that connects to the trunk line of a public or private telephone network. That device is located where the telephone lines for multiple local networks converge to meet the public network trunk (or PBX, in the case of office buildings), enabling the distribution device to perform communication functions for many local networks at once, including communication between one local network and another. The distribution system works just as well when the point of convergence is the center of a computer communications network with a "star" topology, and the wires are the twisted pair wires connecting each individual computer to this center.

BACKGROUND OF THE INVENTION

The current method of providing cable TV signals to a house requires that a cable branch (typically a coaxial cable) connect from the main cable trunk to each subscriber. In addition, at the end of the subscriber branch, an additional segment of the coaxial cable must be installed for every extra TV "hookup" within the residence.

The challenge of providing cable TV to an apartment building is even more formidable. If coaxial cabling is not included at the time of construction, a coaxial cable leading through the entire building must be installed, and a branch must connect between each of the individual apartment units to a point on this cable. This is obviously an expensive procedure, even if easily accessible cabling conduits exist. Furthermore, each branch provides service at only one location within the unit it connects. Extra branches must be installed to provide cable TV service at other locations in the unit.

Providing a group of TV signals to various rooms in an office building currently requires a similar amount of coaxial cable installation. The demand for economical video distribution within office buildings is increasing, moreover, because of the increased popularity of video teleconferencing.

The method of distributing cable TV signals commonly used in the U.S. can be called a "one-way branched" system because signals transmitted at the head-end (i.e., at the root or entrance point to the network) spread across to each of the various subscribers by continually splitting into multiple downstream branches. Due to an increase in the popularity of video programming, however, demand for a new system has emerged. Under the new system, sometimes called "video on demand," a subscriber can request a specific program from a library of programs stored at a central location on, for example, video tapes. The signal from this program is subsequently sent to the subscriber from the "head end" of the system. No other viewers can receive the same signal unless they make a similar request.

One method for providing video on demand is to install a high-capacity fiber optic transmission line from the library through a series of residential or commercial neighborhoods. At each neighborhood, all signals targeted for the local residences or businesses (hereinafter, the term "residence" is used to mean both types of buildings unless otherwise stated) are encoded (i.e. scrambled) and then "handed off" at different channels onto the coaxial cable branch that feeds those residences. Thus, each neighborhood has its own individual headend at the point of handoff.

To prevent all residences from receiving each of the signals handed off to their neighborhood, a control signal is sent over the fiber optic transmission line that includes the "address" of a converter box in the house of the subscriber who requests a particular signal. This control signal provides descrambling instructions that, because of the addressing, only the targeted converter box will recognize. Under this system, each subscriber receives all signals targeted for his or her neighborhood, but only the program (i.e., the specific video signal) actually requested by a subscriber becomes available to him or her in unscrambled form.

The concept of "video on demand" can be considered to be part of a broader communication concept. The broader concept is the widening of communication paths to the ordinary subscribers on the switched public communication network. This would enable subscribers to communicate video signals and other relatively wide bandwidth signals in the same way that they currently communicate voice signals.

The transmission medium that is best suited to provide wider communication paths is fiber optic cables. Indeed, many of the public telephone companies have converted most of their main communication trunks to fiber optics, and have upgraded their switching equipment to handle these signals and their attendant increase in data rates.

To bring the wider capacity to an individual site, however, requires one to install a new fiber optic branch from the main fiber optic trunk to each local network (i.e. a house, apartment unit, or a room in an office building), and to switch signals from the trunk onto the branches. Furthermore, conversion from light to electrical signals must take place at the point where the branch reaches the targeted residence. (Conversion is necessary because the communication devices currently found in typical residences and offices respond to electrical signals.) Finally, the electrical signals must be distributed through the house.

SUMMARY OF THE INVENTION

The invention described in the second CIP application eliminates the need for installation of multiple coaxial cable branches within a residence. Once a feed from the main cable trunk is brought to a house or apartment unit, the technology described in that application can transmit signals from that feed onto the internal active telephone wiring of the residence, using those wires to carry the signals to the individual televisions. Thus, only the coaxial cable which leads from the main cable trunk to the residence is necessary.

One general concept that this invention provides is the use of active telephone wiring (i.e., wiring that is also used for its normal purpose to carry telephone signals) as the transmission line leading from a main cable trunk (which is coaxial cable or fiber optics) to the individual subscribers. This significantly reduces the complexity and expense normally associated with cable TV wiring, above the reduction described in the second CIP application. A major advantage of this wiring over coaxial cable is that nearly every residence (such as an individual house or an apartment unit in an apartment building) has one or more phone lines, each including at least one twisted pair (e.g., the red-green pair; typically, a second twisted pair of black-yellow wires is also provided) leading to it from the telephone company trunk line. A second advantage is that signals applied to the telephone line are available at every telephone jack, rather than at a single coaxial outlet.

Thus, a general aspect of this invention is a system that provides video signal communication between a source of the video signal and a plurality of units that include destinations of the video signal and that includes an interface coupled to the source and to telephone lines, each of which serves at least one of the units and carries voice signals to and from one or more telephones coupled to the telephone line at said unit. The interface receives the video signal from the source, and transmits the received video signal onto at least one of the telephone lines in a selected frequency range that is different from frequencies at which the voice signals are carried on that telephone line. This causes the video signal to be coupled to a receiver which is connected to the telephone line at the unit served by that line and is adapted to recover the video signal from the telephone line and apply it to one or more of the destinations at the unit.

Preferred embodiments include the following features.

The source is a cable (e.g., electrical or fibre optic) that is linked to the interface and that carries a plurality of video signals. The destinations are, e.g., televisions. The units can be residences (such as individual houses or apartments in an apartment building) or offices in an office building. Hereinafter, the term "residence" will be used for all such units.

The interface is adapted to select one or more of the video signals in response to control information from a user or users of televisions at any residence and transmit the selected video signal or signals onto the telephone line that serves that residence for recovery and application to one or more televisions in the residence. If multiple video signals are selected for a given residence, the interface transmit the video signals onto the telephone line that serves that residence at different frequencies within the selected frequency range. This prevents the selected video signals from interfering with each other.

The interface can select the same video signal for multiple residences and transmit the video signal onto the plurality of telephone lines that serve those residences. Further, the same video signal can be sent over the telephone lines at the same or different frequencies.

At least one of the residences includes an internal telephone link to which its receiver and at least one telephone is connected. The internal telephone link is connected to the telephone line that serves that residence, either directly or via a local interface. The local interface amplifies video signals received over the telephone line and couples them onto the internal telephone link. This helps compensate for attenuation that typically occurs during transmission to the local interface, thereby increasing the quality of the video signals recovered by the receiver.

At least one of the residences includes a source (e.g., a video camera) that applies a second video signal that applies said second video signal onto the internal telephone link in a second selected frequency range that is different from both the frequency range selected by the interface and the frequencies at which the voice signals are carried on the telephone link. The local interface amplifies the second video signal and couples it onto the telephone line that serves the residence to cause the second video signal to be coupled to the interface. The interface, in turn, transmits the second video signal to the source.

The interface is coupled between the telephone lines and corresponding public telephone lines (which carry voice signals at voiceband frequencies) that serve the residences. In one embodiment, the interface couples the voice signals between each public telephone line and each telephone line at voiceband frequencies, and the selected frequency range exceeds the voiceband frequencies.

In another embodiment, the interface converts the voice signals on the public telephone lines to a frequency range above voiceband frequencies before coupling the voice signals onto the telephone lines for transmission to the residences. In this case, at least a portion of the selected frequency range for the video signals includes voiceband frequencies. The local interfaces at the residences reconvert the voice signals to voiceband frequencies and change the frequency of the video signals to a frequency band above voiceband frequencies before coupling the voice signals and the video signals onto the internal telephone link.

A possible drawback of using active telephone wiring to transmit video signals (e.g., cable TV signals) to the residence according to this aspect of the invention is that the number of signals that can be effectively transmitted may be more limited. This, however, can be solved because only a very limited number of signals are typically useful at a single time. One recommended solution is to locate the channel selection device at the point of connection to the main telephone trunk (also called the "point of convergence" of telephone lines from multiple residences) and send only the selected video signals to each residence via the telephone line.

This arrangement can actually achieve extra economies if telephone lines from several subscribers converge at one point, as they do in apartment buildings and sometimes on telephone poles or pedestals. One economy that can result is that the channel selection electronics for several subscribers can be embodied in a single device, thereby reducing hardware cost. The second economy is that scrambling of the signals is not necessary. Signals not paid for by a subscriber will simply not be handed off onto the telephone lines leading to the residence of that subscriber.

Ordinarily, piracy would be a problem because it is easier to "tap" an RF signal from a twisted pair, which is unshielded, than from a coaxial cable. Furthermore, a "tap" onto a twisted pair is less obvious than a tap onto a cable. Because the signals are "handed off" from a point of convergence, however, only specifically selected signals emerge from that point, and there will ordinarily be less than three video signals on any individual wire (as described in more detail below). By protecting that convergence point, therefore, fewer signals are available for piracy than in the case where coaxial cables reach all the way to the television. Because easy, surreptitious access to the convergence point will not be available when the point is on a utility pole or in the basement of an apartment building, piracy from the twisted pair distribution system of this invention is even more difficult.

The general principles and techniques described in the parent and first and second CIP applications include some of the ingredients useful to enable converging telephone lines to carry video and other signals from a point of convergence to the individual local networks (i.e. houses, apartment units, rooms in office buildings) in addition to carrying the telephone signals. Problems can arise, however, due to the unusually long path length of the wire branch leading between the point of convergence and the internal telephone network within a residence. Other problems can arise because the wire pairs from neighboring subscribers are often tightly bundled near the point of convergence. This may cause a signal from one wire pair to be picked up by a neighboring pair in the bundle, causing interference. Finally, provision must be made for selection of cable TV channels from within each residence. One of the objects of this invention is to overcome these problems.

Using active telephone wiring as the transmission line for wideband signals (e.g., cable TV signals) leading from a main telephone trunk line to the individual subscribers can also improve upon communication systems other than those used to distribute ordinary cable TV. One example is the "video on demand" system described above. A shortcoming of the typical video on demand system is the coding and decoding (i.e., scrambling and unscrambling) that must be provided at each end of the transmission line. Another drawback is that the excess capacity on cable trunks carrying cable TV signals is typically very limited. If, for example, a cable TV franchise provides signals up to cable channel 63 (which extends between 462 Mhz and 468 Mhz), the "video-on-demand" signals are restricted to the frequencies above that. Using higher frequencies may be undesirable because the attenuation of the cable increases with increasing frequency, and most cable converters are not designed to extend that high. If the existing cable can transmit signals up to, for example, 600 Mhz, then only 132 Mhz, or the equivalent of twenty-two 6 Mhz AM channels, are available above channel 63 at each neighborhood. In this situation, at most 22 houses per neighborhood can receive video on demand.

Telephone wiring from a centralized location (such as the point of convergence discussed above) can be useful because it can replace the coaxial cable as the conductor leading from the cable trunk (e.g., the high-capacity fiber optic line) to the individual residences. One advantage of telephone wiring is that it provides a dedicated path from the point of convergence to each subscriber. This means that signals on the optic fiber line that are "handed-off" onto an individual wire pair transmit to only one subscriber. This eliminates the need for scrambling which is otherwise necessary when many subscribers receive a signal (such as over a shared coaxial cable TV network) that only a limited group of them pay for.

A disadvantage, mentioned above, is that such a point of convergence at which conductors lead to a large number of subscribers is not always nearby. If some of the subscribers are a great distance from the convergence point, the attenuation of transmission may be too severe to allow reliable communication across the twisted pairs that comprise the telephone line.

This problem is less severe in the case of the residential units in an apartment building. Because these buildings typically consist of many units whose telephone wire pairs usually converge at a nearby point, such as when a "wiring closet" is provided for each floor, their telephone lines are particularly good candidates for providing this type of communication. Usually, there is a point in the basement of such buildings where the wiring from all units on all floors converges.

Commercial buildings also include locations where many telephone lines converge. Often, the individual wires leading to the various rooms of the building converge at what is called a "PBX," or private branch exchange. Such an exchange is provided because considerable communication between rooms is required that is not, of course, economically provided by the public telephone exchange.

As mentioned earlier, the popularity of teleconferencing has created a demand for video distribution within an office setting. Often, videoconferencing allows for a group of workers in a building to monitor a conference at a remote location. This requires one-way communication of video. Other forms of video conferencing, however, require two-way video communication. Using telephone wires for these purposes is more complicated, of course, because at least two video signals must transmit in opposite directions. One solution, proposed herein, is to use more of the frequencies, or spectrum, available on each wire pair. Another is to use a different wire pair in the same bundle leading to each office, if it is available. Each of these causes special problems, as will be described herein. One of the objects of this invention is to overcome the problems associated with two-way communication of video across the telephone wires in an office building.

Because of the considerable communication demand between rooms in an office setting, a demand has also arisen for two-way video communication between rooms in the office. A difficulty in using the telephone wiring for transmission of video across that setting is that the conductive paths between the various offices are broken by the PBX. In the first parent application, a technique to provide a high frequency "bridge" between the various wires leading to a PBX was described, thus making the various wires appear, at high frequencies, as a single conductive path. In this application, that technique is expanded upon to provide switching of video between offices, and simultaneous communication of more signals.

In many office buildings, the telephone wiring is not the only network of twisted pair wiring that extends to each office and converges at a common point. Over the past several years, common communication networks that connect personal computers, known as Local Area Networks or LANs, have begun to use twisted pair wiring for their conductive paths. In the typical configuration, a digital electronic device serves as the "hub" for such a system, and a separate twisted pair wire connects from this center to each of the computer nodes. Transmission of video across this medium involves the same problems encountered in transmitting across a PBX system. Additionally, extra difficulties are encountered because the signals that "naturally" transmit across the system, i.e. the digital computer signals, occupy a much wider band than telephone signals. In this application, the technique for communication across a PBX is expanded to provide the same capabilities for wiring networks that provide the conductive paths of a computer local area network (LAN).

In addition to video distribution to houses and apartment units and video communication within office buildings, there is a fourth communication system that can be improved upon by distributing video signals over multiple pairs of telephone wires. This system is the main public telephone network itself. The copper wires of this network are currently being replaced by fiber optics because these lines can carry much more information. Increasing the communication capacity to an individual residence using current technology requires installation of a fiber optic cable spanning the entire distance from the "local exchange" to the residence. The improvement described herein is the result of using the existing copper wires to communicate video and other signals over approximately the last 1000 feet of this link, i.e. from the main optical fiber trunks to electronic devices in subscriber facilities. This eliminates the need to install a new communication line between each residence and the main trunk. It also eliminates the need to adapt each electronic device in a residence to receive optical signals.

A new development in video communication colors the entire concept described so far. The new development is the advent of techniques that digitize and compress standard commercial video signals (such as NTSC or PAL) in real time, without reducing information content, so that the resultant digital bitstream has a data rate that is slow enough to be expressed as an analog waveform in a remarkably narrow channel. This development presents the possibility that considerable programming will be transmitted in this form in the near future.

Accordingly, it is seen that the present invention provides a technique for one-way distribution of signals of a general nature that require bandwidths much wider than the 3 Khz voiceband currently in use. These signals are transmitted to multiple local networks of active telephone wiring, (i.e. the telephone wiring systems of several houses, apartment units, or rooms in an office building) from a signal source at a location where the active telephone wires leading to the residences converge. In the typical application this signal source will be a "tap" into high capacity communication link such as a fiber optic transmission line or a coaxial cable.

The interface provided by the invention includes a transceiver/switch located at the point of convergence. This device replaces the existing interface between the public telephone network (i.e., an ordinary telephone trunk line) and the telephone lines that lead to the individual residences. (These telephone lines are referred to below as "extended twisted pairs".) Typically, the existing interface will be a simple "punch-down" panel that provides electronic connections between the extended pairs and the pairs that are part of the trunk line. The transceiver/switch receives multiple signals (such as several channels of cable TV signals) from the high-capacity communication link such as a coaxial cable or fiber-optic line, and selectively switches these video signals onto the individual phone lines, together with the phone signals. Means are provided at each individual network (i.e. the internal telephone wiring of each residence) to receive and separate these signals.

In addition, the invention allows each subscriber to control the signal selection by the transceiver/switch in situations in which a large group of signals on the high capacity communication link is made available for selection by any subscriber. Control (e.g. channel selection) is established by sending signals from a local network to the transceiver/switch over the extended twisted pair telephone lines, e.g., in the reverse direction from the direction of transmission of the selected video signals. A particularly appropriate application for such a system is as an alternative method of distributing cable TV service.

The invention also provides two-way communication of signals of a general nature with the high capacity transmission line. This allows the user to transmit wideband (e.g. 5 Mhz) signals of an arbitrary nature (such as video signals and high data rate computer signals) over the extended twisted pairs from the user's residence to the transceiver/switch, so that the transceiver/switch can add them to the high capacity transmission line for communication with, for example, a receiver at the point where signals transmitting in the "forward" direction originate (e.g., the video library discussed above.) The invention further provides two-way switched video communication between the local networks (e.g. the rooms) in office buildings and in other buildings that have requirements for two-way communication.

Moreover, all of the communication capabilities discussed above can (and preferably do) use networks of twisted pair wiring that are also used for computer communications.

The communication techniques of the present invention can be adapted to provide the same capabilities when the signal source at the point of convergence provides video signals expressed as analog signals representing compressed digital bitstreams.

It is important to note that this invention provides the video signal communication capabilities described above while preserving all of the features of the pre-existing telephone and computer communications. Thus, interference on the telephone lines between ordinary telephone communications and the selected video signals is avoided.

As discussed above, the interface includes a transceiver/switch that is connected to multiple pairs of telephone wiring and is interposed between telephone wire pairs from the local telephone exchange (the trunk line) and the extended telephone wire pairs leading to separate local networks of telephone wiring. The transceiver/switch also connects to a link used for long distance communication of many multiple signals, such as TV signals.

The invention also includes RF transmitters and RF receivers (described in detail in the parent and first and second CIP applications) that are connected to the telephone wiring of the local networks and a local network interface device disposed between the local network wiring and the extended twisted pair wiring that leads to the transceiver/switch. These elements cooperate to provide the following results:

1) The transceiver/switch can select any one of the signals provided by the high-capacity communication link and transmit it along the extended wire pair leading to any one of the local networks. At least one video signal can be sent to every local network at one time.

2) Normal telephone communication on all local networks and between the local networks and the public network (trunk) is preserved. All pre-existing computer communication capabilities are also preserved.

3) A signal transmitted from the point of convergence will be received by the local network interface and retransmitted onto the local network, making it available for reception by an RF receiver connected at any point on the local network. (In some embodiments, a local network interface is not included and signals transmitted at the point of convergence transmits directly onto the local network for reception by a video receiver connected thereto.)

4) Any RF transmitter connected to a local network can transmit a signal to the transceiver/switch by transmitting that signal onto the local network. A signal sent in this manner is received by the local network interface and retransmitted onto the extended twisted pair wire. (In some embodiments, a local network interface is not included and a signal applied to a local network by an RF transmitter is transmitted directly to the transceiver/switch without interception and retransmission.) At least one video signal from each local network can be transmitted in this direction at the same time.

5) Any RF video receiver on a local network can detect control signals from infrared transmitters (e.g., hand-held remote control devices typically used to control the operation of televisions, VCRs, etc.) and transmit them to the transceiver/switch, allowing the user to control program selection at the transceiver/switch from the location of, e.g., any television connected to the local network through an RF receiver.

6) In addition to selecting any one of the signals provided by the high-capacity communication link for transmission along the extended wire pair leading to any one of the local networks, the transceiver/switch can also select any of the video signals received from one local network for transmission to any other local network.

Other features and advantages of the invention will become apparent from the following detailed description, and from the claims.

BRIEF DESCRIPTION OF THE DRAWINGS

FIG. 1a is a block diagram showing the placement of the transceiver/switch and local network interfaces in a system of telephone lines leading to multiple local networks according to one aspect of to the invention.

FIG. 5c shows another alternative embodiment of the component shown in FIG. 5a.

FIG. 6b shows an alternative embodiment of the component of FIG. 6a.

FIG. 8 is a table that summarizes the signals transmitted across the extended pairs in one of the examples used in the disclosure.

FIG. 10 illustrates one embodiment of a local network interface of FIG. 1a.

DETAILED DESCRIPTION OF THE PREFERRED EMBODIMENTS

A. Overview (FIG. 1a)

Figure 1B:
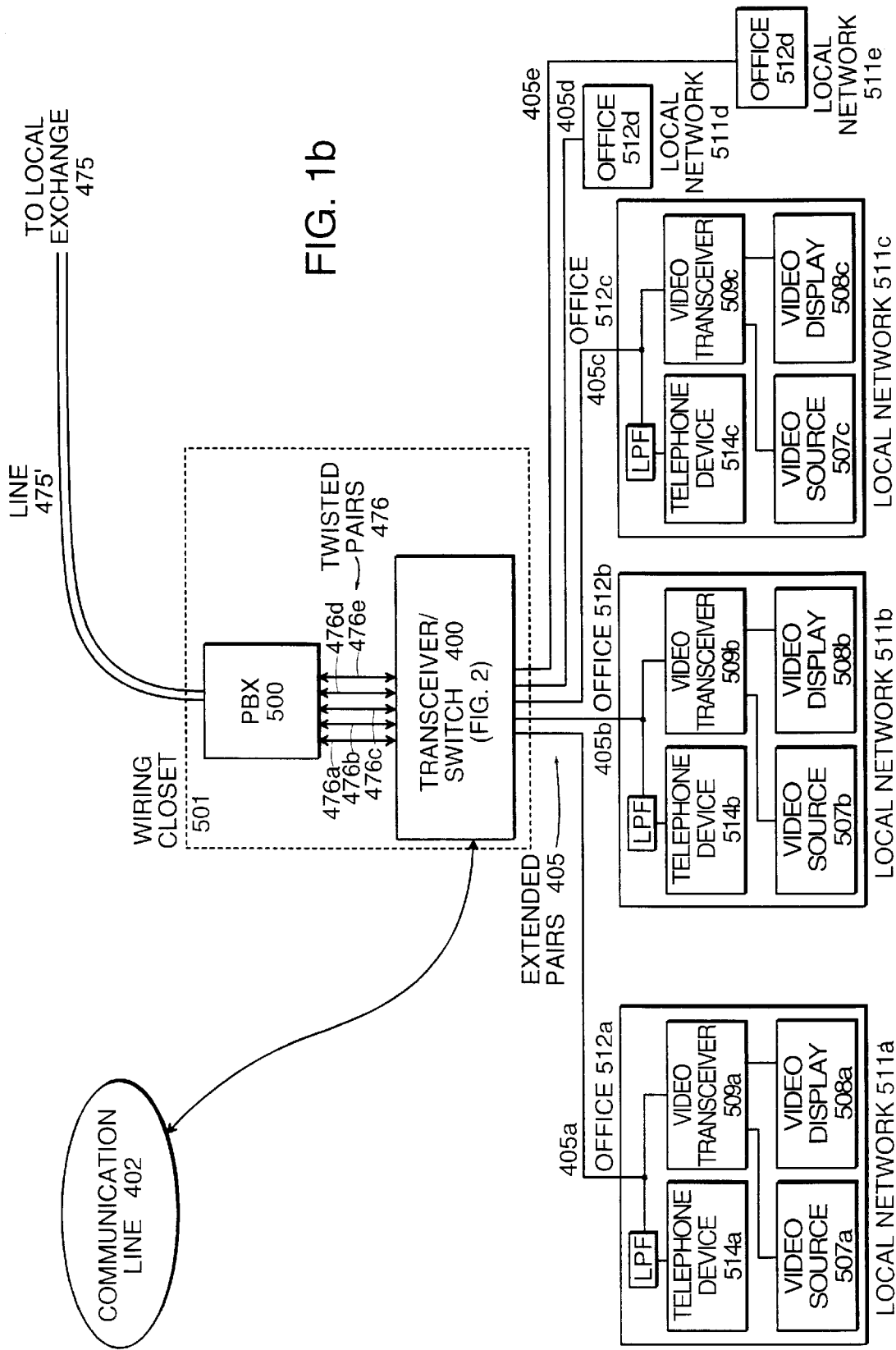
FIG. 1b is a block diagram showing the placement of the transceiver/switch of FIG. 1a between a PBX ("private branch exchange") and the system of telephone lines leading to different rooms in an office building according to another aspect of the invention.

Referring to FIG. 1a, the technology described in this application is designed to communicate signals between transceiver/switch 400, located where individual telephone lines from multiple local networks converge for connection to a main telephone trunk 476', and groups of RF communication devices that are connected to the individual local networks 411a–411e of telephone wiring. Each of local networks 411a–411e (collectively "local networks 411") includes the wiring confined to a structure such as a house or to an area within a structure such as an apartment unit or a room in an office building. This wiring provides a single conductive path for a single ordinary telephone signal. Thus, in the case of the common four conductor telephone wiring, the red/green pair constitutes one local network, and the yellow/black pair constitutes a second local network. (The only special relationship between these local networks is that they bundle more tightly together than wiring serving different areas. Theoretically, this could increase the crosstalk between the pairs.)

Note that the details of the wiring of local networks 411d, 411e are not shown in FIG. 1a. Those local networks will not be served by the communication system described herein. They are included only to demonstrate that not all local networks within a group whose wires converge at a particular point need participate in the communication system described herein.

The wiring of each local network further includes a single branch that strays far from the structure, ultimately leading to the point of convergence where they connect to (or become part of) trunk 476'. These are extended pairs 405a–405e, (collectively, extended pairs 405.) The extended pairs 405 from each of local networks 411 may be bundled closely together near the point of convergence.

When transceiver/switch 400 is installed, extended pairs 405 are broken near the point of convergence, with transceiver/switch 400 interposing between the two ends of each pair. One segment of each pair remains connected to trunk 476'. These segments are called twisted pairs 476a–476e, (collectively, twisted pairs 476.) Thus, twisted pairs 476 and their associated extended pairs 405 ordinarily constitute an uninterrupted connection between local networks 411 and local telephone exchange 475. In the system described herein, transceiver/switch 400 interposes between these wires to provide a link between communication line 402 and local networks 411. As will be described below, one of local network interfaces 404a–404c may also interpose along this path, in the middle of or at the opposite end of the corresponding one of extended pairs 405.

Communication line 402 provides high capacity communication (such as for cable TV signals) with remote locations. Line 402 includes one or more coaxial cables, optical fibers, or the like. Transceiver/switch 400 connects to line 402 to receive and transmit signals. It processes the signals it receives, and switches them onto selected ones of extended wire pairs 405 leading to local networks 411, together with (and without interfering with) the telephone signals (e.g., voice signals) that also use those wires. The switched signals are received by the RF communication devices connected to local networks 411.

Transceiver/switch 400 also receives video, digital, control, and other types of signals from extended pairs 405. These signals, which normally originate in the areas served by the local networks 411, are applied to local networks 411 by the connected RF communication devices, and transmit across extended pairs 405 to transceiver/switch 400.

Local network interfaces 404a–404c (collectively, interfaces 404) are respectively interposed on extended pairs 405a–405c, thus connecting between transceiver/switch 400 and the corresponding local networks 411. Typically, they will be located at a part of extended pairs 405 that is closer to the corresponding local network 411, rather than transceiver/switch 400. They assist in the transmission of signals in both directions between transceiver/switch 400 and local networks 411, as described in more detail below.

Each local network interface 404 intercepts signals sent from the corresponding extended pair 405, applies amplification and/or other signal processing, and feeds the resulting signal onto the corresponding one of local networks 411. This assists in the transmission between transceiver/switch 400 and local networks 411. Each local network interface 404 also performs a similar function to assist signals that are transmitted in the other direction, i.e., by receiving signals from one of local networks 411 for transmission to transceiver/switch 400 via one of extended pairs 405.

As is emphasized at several points in this document, local network interfaces 404 need not be used in some conditions, particularly when extended pairs 405 are relatively short, e.g., less than 300 feet in length. Such is often the case in apartment buildings. This is fortuitous because there is often no opportunity to interpose a device between the point of convergence and the telephone jacks in an apartment unit when a transceiver/switch is located in the wiring closet on each floor of the building. (When the point of convergence is a room in the basement where all the twisted pairs converge, the wiring closets are good locations for local network interfaces, as is described in greater detail below. A communication system is shown in FIG. 1b and described later on that does not include local interfaces 404.)

The communication devices connected to local networks 411 are now described. Video receivers 419a–419c and 419a', video transmitters 417b–417c, digital transceiver 491c4c, and telephone devices 414a–414c (collectively, telephone devices 414) all connect to local networks 411a–411c as shown in FIG. 1a. Except for telephone devices 414, all of these devices communicate RF signals over local networks 411, and are referred to herein as RF transmitters and RF receivers. The RF signals they apply to local networks 411 are received by local network interfaces 404 and retransmitted across extended pairs 405. (These signals can also be received by other devices connected to local networks 411.) Any number of RF transmitters and receivers and telephone devices can connect to any one of local networks 411.

Each of telephone devices 414 connects via a low-pass filter (LPF). As described in the first CIP application, these filters prevent telephone devices 414 from affecting RF energy on the local networks 411. These filters may be provided as part of splitter 161, which is described in the first CIP application.

The video transmitters and receivers are those described in the parent application and in the first and second CIP applications. Video receivers 419a–419c and 419a' (collectively, video receivers 419) connect to televisions 492a–492c and VCR 498a, respectively. Video receivers 419 also detect infrared (IR) light signals, convert them to equivalent electrical signals, and apply them to the corresponding one of local networks 411. These signals transmit across extended pairs 405 to transceiver/switch 400 for purposes described in detail below. Infrared transmitters 493a–493c (collectively, infrared transmitters 493), are respectively provided at local networks 411a–411c to produce the IR signals.

Video transmitter 417b connects to video camera 494b. It derives a video signal from that device, processes the signal, and applies it to network 411b. Camera 494c connects to video transmitter 417c which connects to local network 411c and operates in a similar manner. Transmitters 417b and 417c also receive the control signals applied to their associated local network 411. They convert these signals to infrared signals equivalent to the original signal, then broadcast them out into the vicinity for reception by nearby infrared responsive devices.

Digital transceiver 491c connects between a computer 495c and local network 411c. It receives digital signals from the network wiring and transmits them to computer 495c, and it also receives signals from computer 495c and applies them to the wiring. Digital transmitters and receivers are described in the first CIP application. That application also describes how to combine RF transmitters and receivers into a single device that communicates through a single connection to active telephone wiring.

Except for control signals meant to communicate with transceiver/switch 400, the non-telephone signals received from extended pairs 405 by transceiver/switch 400 are fed to line 402 for transmission to other communication devices that connect to line 402 at locations removed from transceiver/switch 400. One application for this is to establish a simple two-way videoconference between two people located near opposite ends of communication line 402 or at two points of line 402 that are far from each other.

In the reverse direction, transceiver/switch 400 can transmit any of the signals (such as cable TV signals) selected and recovered from communication line 402 over any one of the extended pairs 405, without disturbing the telephone signals that also use those wires. A single selected signal (e.g. an ordinary NTSC television signal) can be assigned to more than one pair, and several signals can be assigned to the same pair.

The processing performed by transceiver/switch 400 on the signals it recovers from communication line 402 converts those signals to the waveform (e.g. the modulation type such as AM or FM) energy level, and frequency band at which they will be effectively transmitted onto wire pairs 405. These signal characteristics must be such that the signals will communicate with high fidelity over extended pairs 405a–405c to the RF communication devices connected to local networks 411a–411c. The relationship between these signal characteristics and the success of this communication is discussed at length below.

The selection of the signals from line 402 and their assignment to particular ones of extended pairs 405a–405c (and thus their assignment to the various local networks 411a–411c) is made by transceiver/switch 400 in response to the control signals sent from local networks 411 over extended pairs 405. Transceiver/switch 400 also receives and responds to control signals from communication line 402, which can give the originator of those signals partial control over signal distribution to local networks 411.

The signals from local networks 411 to which transceiver/switch 400 responds in making selections are known as "control" signals and are sent by subscribers using infrared transmitters 493. Using techniques partly described in the parent and first and second CIP applications, video receivers 419 detect these infrared signals, convert them to electrical signals and apply them to local networks 411. These signals then transmit to transceiver/switch 400, as is described below. Control signals from local networks 411 can also be generated by other means, and applied to local networks 411 by other RF communication devices. The digital transmitters described in the first CIP application, for example, can respond to manual inputs to transmit an electrical signal (representing binary information) onto local networks 411. This electrical signal can be used to communicate a channel selection to transceiver/switch 400.

Following is an example of how this system is used to communicate video and control signals. First, assume communication line 402 conveys 30 video signals from a local cable TV franchise. According to the invention, transceiver/switch 400 selects one or more (typically one or two) video signals from among those 30 to be sent to, for example, local network 411a. Transceiver/switch 400 transmits the selected video signals over extended pair 405a to local network interface 404a. Interface 404a receives these signals and retransmit them onto local network 411a, where they will transmit to video receivers 419a and 419a' and be provided to TV 492a and VCR 498a. Other RF receivers that connect to local network 411a can also receive these signals.

Viewers of television 492a connected to local network 411a via video receiver 419a, meanwhile, can use transmitter 493a to issue infrared control signals to determine which signals are selected and transmitted to local network 411a. Video receiver 419a detects these infrared patterns, converts them to electrical signals, and applies them to local network 411a. These electrical signals are received by local network interface 404a which processes them and relays the signal across extended pair 405a to transceiver/switch 400. These signals indicate to master controller 415 (FIG. 2) the identity of the cable TV signals that are to be sent to local network 411a. Alternatively, signals from communication line 402 detected by master controller 415 can also determine the identity of the cable signal to be sent to local network 411a.

The viewer can also transmit video signals from a local network 411 to communication line 402. This can be useful for any number of purposes, the most simple of which is to add pictures to an ordinary two-way telephone conversation. An example of this is where the signal from video camera 494b is applied to local network 411b by video transmitter 417b. That signal will transmit over local network 411b to local network interface 404b. Local network interface 404b receives the video signal and transmits it across extended pair 405b to transceiver/switch 400 which will apply the signal to communication line 402. (Again, local network interface 404b will facilitate this communication only if it is included in the system.) There can be a large variation in the lengths of extended pairs 405. In an apartment building, the telephone wires serving different units may converge at a point 100 feet or less from each apartment unit. An example of the other extreme occurs when distributing signals to separate houses in a neighborhood. In this case, connecting ten houses to the a single transceiver/switch 400 may mean that some of extended pairs 405 will be longer than, perhaps, 1000 feet.

Unfortunately, attenuation of the video signals increases with frequency, which means that the highest useful frequency on extended pairs 405 decreases with length, ultimately restricting the signals to below 4 Mhz. This is a problem because 4 Mhz of bandwidth is the approximate minimum required for transmission of an NTSC video signal in analog form. The inventors estimate that this point occurs before the lengths of extended pairs 405 reach 3000 feet.

The solutions described herein take advantage of the improved ability of RF (radio frequency) signals to transmit over longer distances at lower frequencies to avoid problems due to the lengths of extended pairs 405. The invention also takes advantage of the property of conducted RF transmission that dictates that the tendency for energy from a signal on one wire pair to cross over to a neighboring pair decreases as the frequency of the signal decreases. This crossover, which can cause interference, is likely to result when pairs 405 are closely bundled within a common sheath, as often happens. Finally, the ability of frequency modulated (FM) signals to resist interference to a greater degree than amplitude modulated (AM) signals with more narrow bandwidths also plays a part in the system design.

The next part of the disclosure describes the signal flow between major components internal to transceiver/switch 400, and the processing performed by those components. That section is entitled "Signal Flow and Signal Processing in Transceiver/Switch 400." One of the major goals of this processing is to convert signals from the form provided by communication line 402 to the waveform, frequency band, and amplitude useful for successful communication across one of the extended pairs 405a–405c. The requirements for these characteristics are described in the section entitled "Transmission of Wideband Signals Over an Extended Pair."

Two other sections following are entitled "Signal Conversion and Switching in Transmitter/Switch 400" and "Transmission and Recovery of Signals from a Single Twisted Pair in a Bundle." Details of major processing components of transceiver/switch 400 are provided therein. Finally, details of signal processing with in local network interfaces 404 is described in the last section, which is entitled "Signal Processing at the Local Network Interface.

Figure 2:
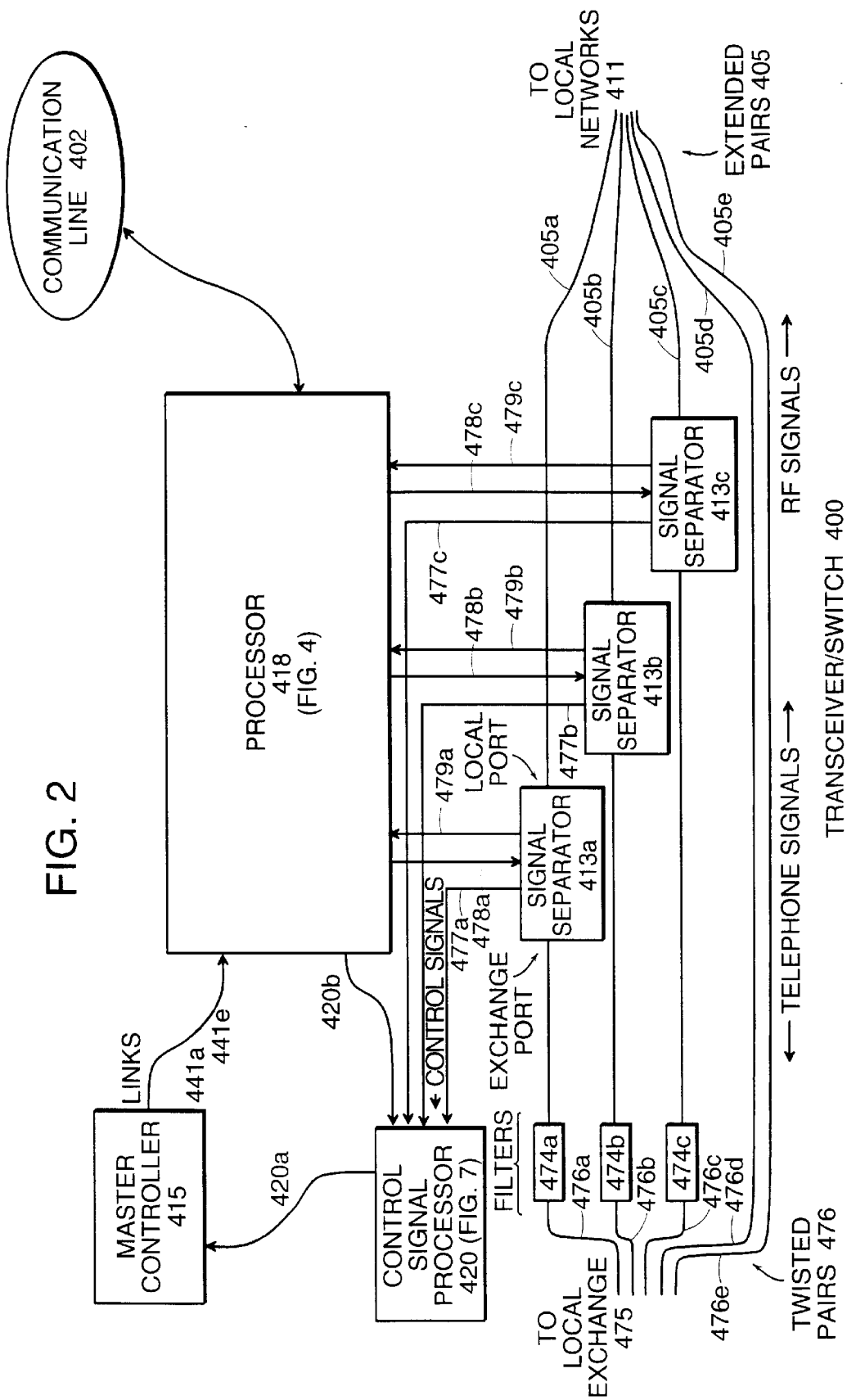
FIG. 2 is a functional block diagram of the transceiver/switch of FIGS. 1a and 1b.

B. "Signal Flow and Signal Processing in Transceiver/Switch 400 (FIG. 2)

Following is a description of a general embodiment of transceiver/switch 400. Referring to FIG. 2, the major processing elements of transceiver/switch 400 are processor 418, signal separators 413a–413c master controller 415, low pass filters 474a–474c, and control signal processor 420. Processor 418 serves as the interface to communication line 402, and each signal separator 413a–413c (collectively, signal separators 413) serves as the interface to the corresponding one of extended pairs 405. One of the functions of processor 418 is to select, under the direction of master controller 415, video and other signals from communication line 402, to process those signals, and to feed them to signal separators 413. Another function of processor 418 is to receive video and other signals from signal separators 413, convert those signals to a form appropriate for transmission on line 402, and feed them to communication line 402. A third function is to receive signals from any given one of signal separators 413, convert those signals, and to feed them to a different one of signal separators 413, thus establishing communication from one of local networks 411 to another.

Each of signal separators 413 is connected between one of extended pairs 405 and the corresponding one of twisted pairs 476. One of the two major functions of each of signal separators 413 is to transmit signals from processor 418 onto one of extended pairs 405. These signals are applied so that they transmit onto extended pairs 405 in the direction of local networks 411. A second purpose of each of signal separators 413 is to recover signals transmitting from one of local networks 411 over the corresponding one of extended pairs 405, and to provide these signals to processor 418. In some embodiments, signal separators 413 also convert telephone signals so that they transmit over extended pairs 405 at frequencies above voiceband.

Each of twisted pairs 476 connects to the "exchange" port of the corresponding one of signal separators 413. In FIG. 2, the "exchange" port is on the left side of signal separators 413, and the "local" port is on the right side. Signals provided by processor 418 to signal separators 413 transmit out the "local" port onto one of extended pairs 405 towards the associated one of local networks 411. Signals transmitting from local networks 411 to transceiver/switch 400 flow in the opposite direction. The various ports of signal separators 413 are shown in more detail in FIG. 9a. The details of signal routing within signal separators 413 are described below.

In contrast to the "local" port, only telephone signals flow through the "exchange" ports of signal separators 413. Telephone signals transmit over twisted pairs 476 in both directions, transmitting between local exchange 475 and the "exchange" ports, thus passing through low-pass filters 474a–474c (collectively, low pass filters 474) during transmission.

Low-pass filters 474 connect in series on twisted pairs 476 to suppress the higher harmonics of telephone signals transmitting across them. This suppression prevents the higher harmonics of the telephone signals from local exchange 475 from reaching extended pairs 405, where they could possibly interfere with RF signals.

Signal flow between signal separators 413 and processor 418 is now described. There are two conductive paths connecting processor 418 with each of signal separators 413. Paths 478a–478c (collectively, paths 478) conduct signals transmitted by processor 418, and paths 479a–479c (collectively, paths 479) conduct signals transmitted by the associated one of signal separators 413.

The electrical signal, i.e. the voltage variations transmitted to each one of signal separators 413 from processor 418, may include several individual signals at different frequencies that are combined together onto the associated one of conductive paths 478. In response to commands sent from master controller 415, processor 418 determines the composition of each of these combined signals. After transmission to a particular one of signal separators 413, each combined signal continues on to transmit to the corresponding one of extended pairs 405.

Other than switching and filtering, no processing of the combined signal takes place after it leaves processor 418 until it reaches one of local network interfaces 404. Thus, the signal processing performed by processor 418 on the individual signals it selects and recovers from communication line 402 determines the waveform (e.g., AM or FM), frequency, and amplitude at which these individual signals are transmitted across pairs 405.

In the reverse direction, signals transmitted by RF transmitting devices 417 onto one of local networks 411 transmit to the corresponding one of signal separators 413. (Other devices can also transmit RF signals onto one of local networks 411. An example is any of video receivers 419, which transmit control signals.) The corresponding one of signal separators 413 recovers these signals and, except for control signals targeted for master controller 415, feeds them over the associated one of paths 479 to processor 418. These signals are received by processor 418 and applied to communication line 402. They may also be transmitted to any of local networks 411 that are different from the local network 411 of origin.

Control signals originated by subscribers are fed to local networks 411 within a specific frequency band, and are transmitted to master controller 415, as described below.

This provides a method of communication between a subscriber and transceiver/switch 400, allowing the subscriber to control, among other things, the channels that are selected from communication line 402 for transmission to the local network 411 where the control signal originated. In a preferred embodiment, these signals are issued by an IR device 493 as infrared patterns which are detected by video receivers 419, converted to electrical signals, and fed onto the wiring. Other systems of feeding signals onto local network 411 within the particular frequency band can also suffice.

The control signals targeted for master controller 415 are received from local networks 411 by local network interfaces 404 which process them and apply them to extended pairs 405. These signals are recovered from pairs 405 by signal separators 413 and fed over the associated one of paths 477a–477c (collectively, paths 477) to control signal processor 420. Processor 420 processes these control signals and communicates them over path 420a to master controller 415.

Master controller 415 also receives (via control signal processor 420) control signals that processor 418 recovers from communication line 402 and sends over path 420b. In response to these signals and to the control signals it receives from local networks 411, master controller 415 sends signals to processor 418 over links 446a–446e (collectively, links 446). Processor 418 determines the selection of signals from communication line 402 and the composition of the signals fed over extended pairs 405 to local networks 411 in response to signals from links 446.

C. Transmission of Wideband Signals over an Extended Pair

As described above, processor 418 selects signals from communication line 402 and converts them to the waveform, frequency, and energy level at which they are fed to extended pairs 405. These characteristics determine, to a large extent, the ability of video receivers 419 connected to local networks 411 to detect these signals and the ability of extended pairs 405 to conduct more than one signal at a time.

The nature of the communication medium that is the subject of this application presents two particular problems. One problem is that there is a significant possibility of crosstalk interference between the various signals on extended pairs 405. This possibility is high because telephone wires converging at a common point may run parallel and very close to each other for a long distance. This makes interference resulting from crossover of RF energy between the pairs likely. A second problem is that the usefulness of the system is related to the length of the longest path over which communication can succeed. This is a problem because communication bandwidth decreases as the length of a twisted pair communication line increases. (The issue of transmission length will be less important for communication within apartment houses and office buildings than they will be for communication with separate residential structures in a neighborhood. This is mostly because the wires of many different networks in an apartment or office building often converge at a point less than 500 feet from those networks.)

In addition to these problems, there are also particular advantages to this medium. In particular, because extended pairs 405 connect directly between transceiver/switch 400 and local network interfaces 404, these wires encounter no splits and no connected telephone devices. Thus, signal splitting does not cause problems on extended pairs 405, and connected telephone devices will also not have an influence on transmission over those pairs.

The parent and first and second CIP applications describe many of the relationships between the properties of a signal and its tendency to be attenuated and distorted during transmission across telephone wiring. As described therein, the maximum transmission length increases with decreasing frequency because of improvements in transmission characteristics. Specifically, attenuation, radiation, and the ability of the wiring to pick up (interfering) broadcast energy all decrease as transmission frequency is reduced. Also, crossover of energy between neighboring pairs decreases with decreasing frequency. Those applications also discuss spectral tilt, another undesirable byproduct of transmission over telephone lines.

The first CIP application explains that FM video signals have a greater noise immunity than do AM video signals, i.e., the SNR after demodulation of an FM signal is higher than that of AM video signals if the frequency modulation process creates a signal with a wider bandwidth than the AM signal. As explained in the first CIP application, the sensitivity advantage of FM video signals over AM increases as the bandwidth of the FM signal increases.

The ability of FM signals to reject interference increases when the interfering signal is a second FM signal confined within the same channel. As explained in the first CIP application, the minimum energy advantage that a receiver requires to reject a weaker but otherwise equivalent signal in the same channel is known as the "capture ratio", and is often significantly less than the minimum SNR necessary to avoid distortion by white noise. The exact capture ratio will depend on several factors, but the inventors estimate that the "capture ratio" of an FM NTSC video signal with a 15 Mhz wide bandwidth will typically be less than 10 db, allowing it to ignore interfering FM signals whose levels are suppressed by at least 10 dB.

Using FM to transmit video has three disadvantages, however. One is that the tuning circuitry of common television sets expects to receive AM signals. This means that an extra signal conversion may be required before a picture is generated. Secondly, FM video electronic circuitry is more expensive. The third disadvantage is that a group of adjacent FM video channels will cover a wider band than a group of adjacent AM channels. In addition to occupying more spectral area, a band of adjacent FM channels will reach higher frequencies than a band of the same number of adjacent AM channels (assuming that both bands begin at the same frequency). Signals transmitting over FM channels, therefore, will generally suffer more from the problems associated with increasing frequency.

When processor 418 transmits several signals simultaneously across one of extended pairs 405, it assigns each signal to a separate frequency band, or channel. The energy of each signal will be confined within that band. (Effectively, this "channelizes" that particular extended pair 405.) Additionally, processor 418 determines the waveform and energy level of each individual signal. On the basis of the considerations described above, a set of guidelines have been developed to aid in determining these characteristics for a given communication scenario. Some of the guidelines apply to transmission of signals of a general nature. Other guidelines will apply only to television signals. Still others will apply only to the specific situation of the communication of one or two video signals over especially long distances. These guidelines are disclosed in the following paragraphs (1–6).

1) Energy Level

Because RF signals that may be transmitted across telephone lines are relatively low in power, increasing signal level is not likely to cause a significant increase in cost, and is also not likely to cause problems of safety. Furthermore, maximizing the signal levels maximizes the SNR at the receiver. Thus, there are no benefits to lower signal levels, and the signal level should be set so that the resulting radiation falls just below governmental limits on the airborne radiation.

Because telephone wiring is unshielded, EMF radiation will result no matter how well the transmitting or receiving devices are shielded. Thus, these radiation levels will not significantly vary with any factor other than the signal level. This means that the radiation can be determined at the time of manufacture, avoiding the expense of providing for adjustable signal levels.

For example, following FCC procedures, the inventors fed a 22.45 Mhz NTSC video signal onto a telephone wire and measured the resulting radiation. It was found that at a conducted signal level of approximately 50 dB mV, radiation from the wire would be just below the governmental limits of 30 uV/M measured at 30 Meters. Thus, a level of 50 dB mV would be preferred for a transmitter that applies a 22.45 Mhz video signal to telephone wiring.

2) Adjacent Low-Frequency Channels

As described above, attenuation, radiation, crosstalk interference and reception of external interference all increase as frequency increases. This means that the signal with the highest frequency is most likely to have the lower SNR, and that overall communication success can be improved by lowering the frequency below which all signals are confined.

To minimize the highest frequency used for transmission, it is recommended that the first channel be placed as close to the voiceband as feasible, and that each succeeding channel be placed above and adjacent to the previous channel. The channels should be separated in frequency sufficiently, however, to allow clean separation at the receive end without excessive filtering costs.

3) Minimum Frequency

If AM is used to transmit video signals, it is preferred that the picture carrier of the first such channel be located above 4.25 Mhz. This frequency is chosen as a rough compromise between the following factors: a) transmission properties improve with lower frequencies; b) as described in the first CIP application, the likelihood of distortion of AM signals caused by the phenomena of spectral tilt increases with decreasing picture carrier frequency below 5 Mhz; and c) there are certain advantages in arranging for transmission of several adjacent 6 Mhz AM NTSC video signals beginning with a signal whose picture carrier is at 4.45 Mhz. (One major advantage, which is described more fully in the second CIP application, is that arranging video channels in this manner reduces the likelihood of interference from amateur radios.) For FM transmission, it is preferred that the low end of the first channel be 4 Mhz. This frequency is chosen as a rough compromise between the following considerations:

a) Transmission properties improve at lower frequencies;
b) Spectral tilt becomes more pronounced with increasing ratios between the highest and lowest frequencies of an FM signal. (the problem of the spectral tilt of FM signals is described in the first CIP application);
c) lowering the low end of an FM band by 1 Mhz does not provide a significant decrease in the percentage reduction of the frequency of the high end. For example, moving the low end of a 15 Mhz channel from 3 Mhz to 2 Mhz only reduces the upper frequency by 5%, i.e. from 18 to 17 Mhz.

4) Bandwidth

Assume that "N" different signals are to be transmitted within adjacent channels, that the average width of the channel confining a signal is B Mhz, and that the low end of the lowest channel is k Mhz. Under these conditions, the high end of the channel highest in frequency is given by (Nb+k) Mhz. Thus, decreasing bandwidth decreases the maximum frequency.

Because of this, a preferred system when transmitting multiple NTSC video signals is to provide all signals using AM modulation within 6 Mhz channels distributed according to the NTSC standard. (I.e. a picture carrier 1.25 Mhz above the low end and a sound carrier 0.25 Mhz below the high end.) This arrangement is chosen because the bandwidth is relatively narrow, yet separation can be achieved using inexpensive filtering. This is the same arrangement that was chosen for airwave transmission of video shortly after the invention of television. The same justifications applied. Because of that standard, very inexpensive electronics exist for this type of channeling, providing another advantage.

The preferred lower end for the band of transmission over extended pairs 405 is defined by an AM signal with a picture carrier of 4.45 Mhz. (The lower end of an NTSC video channel with a carrier of 4.45 is at 3.2 Mhz. This is because the bottom of the 6 Mhz channel is 1.25 Mhz below the picture carrier.) The advantages of providing adjacent AM signals with picture carriers spaced 6 Mhz apart and beginning at 4.45 Mhz are described in the second CIP application. Also, a picture carrier of 4.45 Mhz is above the minimum frequency requirement of 4.25 Mhz suggested above.

Amplitude modulation is particularly adequate when only a small number of signals transmit over a short distance. As transmission distance increases, attenuation causes the SNR at the receiving end to drop. Similarly, as more channels are added to a wire pair of fixed length, one is forced to use higher frequencies, until the signal at the highest frequency is not received with an adequate SNR. (Note that capacity tightens up very rapidly with increasing frequencies because attenuation increases and at the same time the signals radiate more, forcing a reduction in the initial signal levels.)

A third phenomenon that can cause an inadequate received SNR is the presence of broadcast energy, which elevates the noise level. This is largely a function of the radio broadcasters in the area, but it is also related to frequency because telephone wiring acts as a more efficient antenna as the frequency of the broadcast signal increases.

5a) Increasing Bandwidth to Counter Signal Attenuation

When the attenuation of transmission or the presence of broadcast energy at the "unused" frequencies on a transmission line suppresses the SNR at the receive end below the minimum required for AM video, the proposed solution is to use frequency modulation with bandwidths significantly larger than 4 Mhz. (Four Mhz is the approximate bandwidth of an NTSC video signal at baseband.) As mentioned in the first CIP application, receivers in FM communication systems that use 15 Mhz of bandwidth per NTSC video signal are known to produce a demodulated signal that is approximately 10 db higher than the SNR at its input. This is an improvement over AM systems because, in those systems, the SNR at the receiver output is equal to the SNR at the receiver input.

Following is an example. Assume that nine AM NTSC signals transmit across a path 400 feet long within adjacent 6 Mhz channels beginning at 6–12 Mhz and ending at 54–60 Mhz. Now assume that a signal of 45 dB mV with a carrier at 61.25 Mhz, (corresponding to the channel between 60–66 Mhz), creates radiation just below the legal (FCC) limit when applied to telephone wiring. Because the attenuation on telephone wiring at 60 Mhz is approximately 12 dB per 100 feet, the SNR of such a signal at the receive end of the above path should, theoretically, be −3 dB mV, or 3 dB below the minimum (0 dB mV) required for high quality video reception.

A solution is to transmit a 15 Mhz wide FM signal between 60 Mhz and 75 Mhz. The high end of this signal, being at 75 Mhz rather than 66 Mhz, will suffer greater attenuation, and will also radiate more energy. According to measurements performed by the inventors, however, the radiation difference will be negligible, (perhaps 1 dB), and the extra attenuation at 75 Mhz over the 40 foot path will be approximately 2 dB. Thus, the received level will be approximately −6 dB mV. If the SNR at the output of a 15 Mhz FM video receiver is approximately 10 dB higher than the SNR at the input, however, the SNR of the demodulated video signal will be 4 dB, which is sufficient. Thus, transmission of an extra channel can be enhanced by using FM for the additional channel.

At higher frequencies, the 10 dB advantage of a 15 Mhz FM signal may not be sufficient to overcome the extra attenuation. The solution, in that case, is to use wider FM bandwidths which produce a greater SNR improvement at the receiver. This, of course, brings one to even higher frequencies more quickly with each channel that is added. Because of this, the inventors expect that higher frequencies will not be useful beyond some point, and certainly not beyond 1000 Mhz.

5b) Using FM to Counter Crosstalk

Within a bundle of unshielded telephone wire pairs, the amount of energy radiated by one pair that is received by another increases with frequency. This happens both because the radiation at a fixed signal level increases with frequency, and because the ability of the second wire pair to "pick up" the radiation also increases. This energy received by the second wire pair is known as "crosstalk" and the tendency of a particular medium to exhibit this type of interference is known as "crosstalk loss." That quantity is the ratio, in dB, between the signal directly applied to a communication line and the energy received from the radiation of a signal of equal strength fed to a neighboring line. The greater the "crosstalk loss," the less the interference.

At the voiceband frequencies of ordinary telephone signals, which are below 5 Khz, crosstalk loss is very high. Thus, the portion of the "noise" typically encountered by telephone signals that is related to crosstalk energy is very small. For this reason, telephone signals on neighboring wire pairs usually do not interfere with each other.

At frequencies above 1 Mhz, however, interference from crosstalk can be significant. Crosstalk loss will be affected by many different factors. According to measurements, made by the inventors, of several bundles of 12 pair and 25 pair telephone wires, crosstalk loss at 6 Mhz occasionally becomes less than 45 dB, while crosstalk loss above 50 Mhz rarely exceeds 40 dB. These measurements indicate that AM video signals, which can display the effects of interference at SNRs as low as 40 dB, may suffer interference from crosstalk at even relatively low frequencies such as 6 MHz.

FM signals, on the other hand, have impressive resistance to crosstalk interference because of their very low "capture ratios." As stated in the first CIP application, the inventors estimate that receivers that process FM video signals with bandwidths of 15 Mhz or more can reject interference from any FM signals transmitting in the same channel if the level of the interfering signal is weaker by 10 dB or more. Thus, it would appear that FM video signals will not encounter crosstalk interference until at least 50 Mhz, and the use of FM at the very lowest video channel may be indicated.

5c) Using Secondary Pairs for Additional Channels

As mentioned above, there is an upper limit to the frequencies that can be useful for transmission of signals across a transmission path of a given length. Thus, the number of signals that can transmit over an extended pair to a given local network is limited.

In most apartment buildings, however, several extended pairs service (i.e. are dedicated to) each apartment unit. Each of these pairs typically branches off to connect to each of the jacks in the unit. Typically, one of these pairs conducts the signals for the primary telephone service to that unit. Additional pairs are left empty unless and until secondary telephone lines are requested. Thus, apartment units are typically serviced by more than one of extended pairs 405 and, correspondingly, more than one of local networks 411.

An example is where red, green, black, and yellow conductors connect at each jack in a unit and also extend down to the point of concentration in the basement of the building. The red and green wires in the unit constitute one of local networks 411, and the yellow and black wires constitute a second of local networks 411. The lengths of these wires that extend down to the basement of the apartment building constitute the extended pairs 405.

If more signals are required than can be accommodated by a single extended pair, the extra wires present an opportunity. As described earlier, the twisted pairs connecting to the same unit may be bundled more tightly together than arbitrary pairs in the same bundle, potentially increasing crosstalk interference. If this increase is not dramatic, however, the techniques to avoid crosstalk described above will be sufficient to prevent crosstalk interference between signals on these two pairs that serve the same unit, preserving the opportunity for transmission of additional signals.

Indeed, using an additional pair for the second channel provides the economy that fewer frequency bands are required to transmit a given number of signals. For example, assume that transmitting two signals can be done by using FM within the channels between 6–18 Mhz and 18–30 Mhz, and that at most two signals are required by any unit. It may be more economical, in this case, to provide the second signal within the 6–18 Mhz channel but on a secondary pair. This allows video receivers 419 to receive either signal using only the electronics necessary to tune the 6–18 Mhz channel. Switching from one signal to the other is simply a matter of switching between wire pairs.

Transceiver/switch 400 can enjoy a similar economy. Using the example above, transceiver/switch 400 need only be equipped to transmit within the 6–18 Mhz channel to satisfy the system requirements.

5d) Transmitting over Unused VHF Channels

As described in the first CIP application, systems that transmit signals at unused VHF television channels are very reliable because they enjoy the advantage of total immunity (as a practical matter) from broadcast interference. It was further described how the relatively high attenuation suffered by signals transmitting at those relatively high frequencies can be overcome, in some circumstances, by using low-pass filters to remove all of the attenuative affects of all telephone devices connected to the wiring.

Because cable TV companies consider reliability an extremely important part of their delivery systems, use of unused VHF channels within the systems described herein is an interesting option. For example, a cable company considering distribution of AM signals through an apartment unit within 6 Mhz channels below 30 Mhz may be concerned that an amateur radio enthusiast can erect an antenna nearby and broadcast at the 10 meter, 15 meter, 20 meter, and 30 meter bands, all of which are below 30 Mhz.

One of the problems of using unused television broadcast channels in the systems that are the subject of this application, however, is that the wires leading to the various units may be bundled tightly together, causing the crosstalk problems described above. Crosstalk interference is even more likely to occur because crosstalk increases with frequency, and unused TV channels are at relatively high frequencies. Also, because adjacent unused channels are not typical, only 6 Mhz is available per channel, preventing the use of FM, which is more resistant to crosstalk.

In many apartment buildings, however, the wires providing telephone signals to an individual unit are often not bundled tightly together with wires leading to other units. This is especially common for the wires that lead from a "wiring closet" that serves as a concentration point for the various units on the same floor. Often, separate bundles of four or more conductors lead from this point to each apartment unit. Because the bundles are separate, crosstalk will be negligible. Because they need not traverse between floors, moreover, these bundles are relatively short in length, decreasing the likelihood that they will exceed the relatively short transmission length limits imposed by unused television channels.

The combination of short path lengths and separate bundles is an ideal configuration for transmitting over the unused television channels. Following is an example. Assume a five story apartment building in New York City includes five units on each floor, and that four wires service each of the units on a floor. Assume further that the conductors from each unit are bundled together and lead to a wiring closet on the same floor. Inside each wiring closet, transceiver/switch 400 is installed and connected to the cable TV trunk which is brought to each closet. (Leading this cable to each closet is the only wire installation required.) In New York City, VHF channels 2, 4, and 5 are used, making VHF channels 3 and 6 open for transmission. Using the technology described herein, transceiver/switch 400 feeds two different signals, one at VHF channel 3 and one at VHF channel 6, onto one of the twisted pairs leading to each unit. Note that the second twisted pair will typically not be useful because it is bundled too closely to the first pair.

Figure 15:
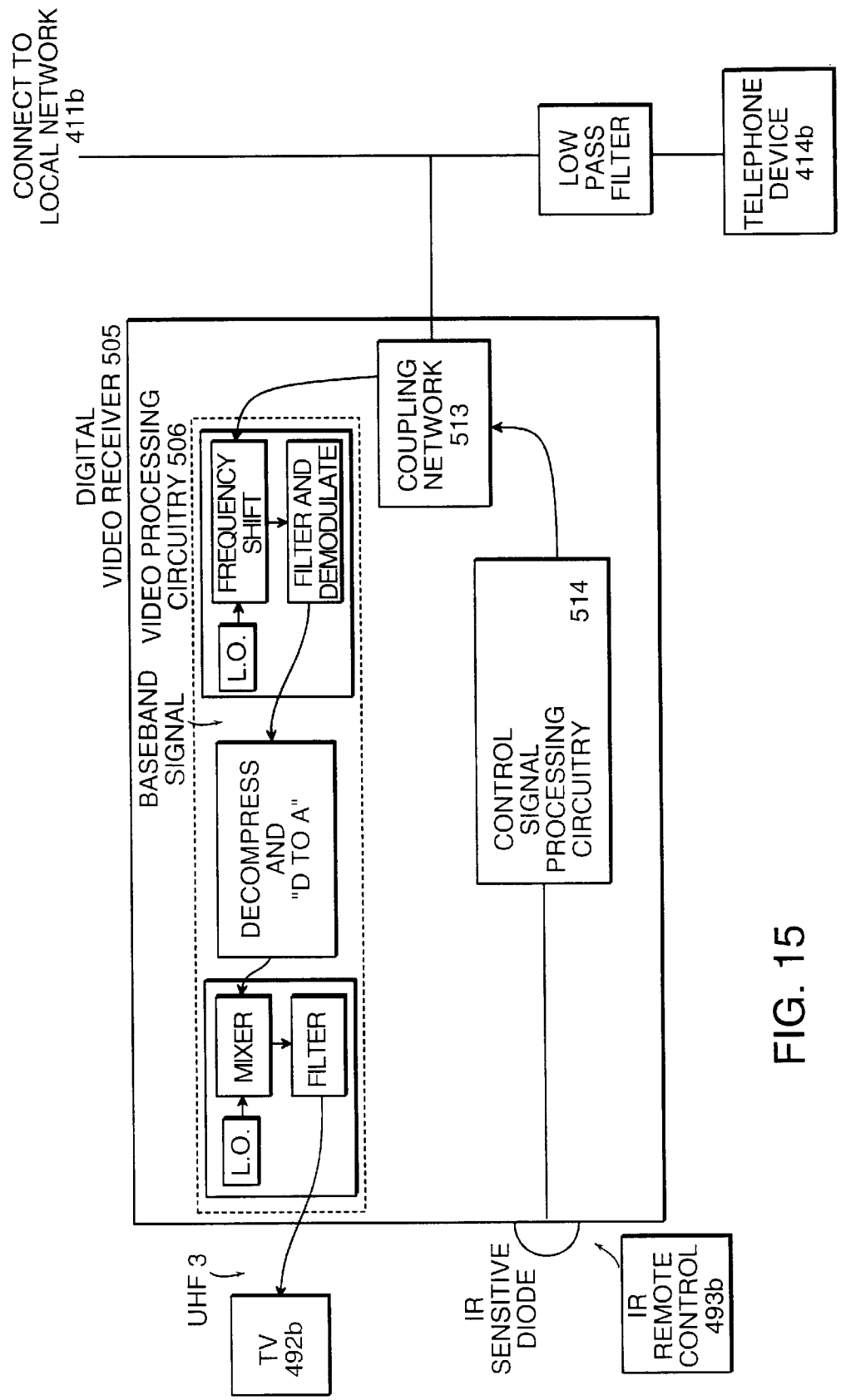
FIG. 15 is a block diagram of a digital video receiver useful with the systems of FIGS. 1a and 1b.

6) Transmission of Video using Compressed Digital Signals (FIG. 15)

Currently, extensive effort is focused on developing methods to compress digital representations of NTSC video signals. These efforts have reached the point where it appears that the digital bitstream representing an NTSC video signal can be compressed sufficiently so that it can be transmitted within a channel narrower than the 4 Mhz occupied by the video portion of the original analog NTSC signal. In other words, the digital bitstream can be expressed, using techniques such as pulse code modulation (PCM), as an analog signal with a bandwidth less than 4 Mhz. Furthermore, the SNR required for accurate reception of this signal and recreation of the compressed bitstream is less, potentially, than the SNR required for quality reception of FM video signals. Also, the digital signal has similar resistance to crosstalk interference. Thus, it appears that video signals can be communicated more efficiently across networks of the particular type discussed herein if they are in digital form. The drawback of digital transmission of video, of course, is the expense of digitization and compression of the video signal at the transmit end, and the expense of the inverse processes at the receive end. Because it is expected that compression circuitry will dramatically decrease in price, techniques to transmit compressed digital video signals are included in a later section of this disclosure and shown in FIG. 15.

D. Two-Way Transmission of Video Signals

The guidelines for choosing transmission bands and modulation methods for transmitting video signals from transceiver/switch 400 to local networks 411 also apply for transmission in the opposite direction. An extra consideration arises, however, when transmission in both directions takes place simultaneously. The consideration is a form of interference sometimes called "nearend crosstalk." This interference can occur when signals are fed to a wire pair at one end while signals transmitting at the same frequencies are received from a neighboring pair (in the same bundle) at the same end. To see why this type of situation is likely to cause interference, consider the following example.

Assume that transceiver/switch 400 modulates a first video signal using AM with a carrier frequency of 8 Mhz and feeds it onto extended pair 405*a*, and that local network interface 404*b* modulates a second video signal using AM and a carrier at the same frequency and feeds it onto extended pair 405*b* towards transceiver/switch 400. Assume further that the attenuation of transmission at 8 Mhz is 2 dB per 100 feet, and the paths, i.e. pairs 405*a* and 405*b*, are 1000 feet long.

Now consider the signals present at transceiver/switch 400 on pair 405*b*. The level of the first signal is simply that produced by transceiver/switch 400 minus the loss in energy as it leaks from pair 405*a* onto pair 405*b*. The level of the second signal, which is the signal of interest on 405*b*, is 20 dB lower than that produced by interface 404*b* because of the attenuation of transmission. Thus, if the second signal is an AM video signal, interference will occur unless the first signal loses at least 60 dB crossing from 405*a* to 405*b*. Experiments performed by the inventors indicate that, in typical situations and at frequencies above 5 Mhz, the crossover loss is likely to be much less than that, perhaps even low enough to cause interference with FM video signals.

The solution proposed herein is to ensure that the bands used for transmission in the "forward" direction, i.e. from transceiver/switch 400 to local networks 411, are the same for each of extended pairs 405. In other words, the frequencies used by signals transmitting along extended pair 405*a* from transceiver/switch 400 to local network 411*a* are not also used by signals transmitting over extended pair 405*b* in the reverse direction, i.e. from local network 411*b* to transceiver/switch 400.

As described above, a very important application of the techniques disclosed herein is the one-way distribution of cable TV signals. In these types of applications, wideband video signals are transmitted from transceiver/switch 400 (i.e.,the point of convergence) to local networks 411, and control signals, which will be narrowband because they have very small information content, transmit in the opposite direction to provide the selection mechanism.

In these situations, where only a very narrow (e.g. less than 0.5 Mhz) signal transmits towards transceiver/switch 400, it is preferred that the narrowband signal transmit just above voiceband, below the wideband signals. This reduces the expense of filtering, because the cost of a filter is inversely proportional to its "fractional bandwidth," which is the bandwidth divided by the center frequency. Thus, a 0.5 Mhz filter at 1 Mhz, for example, has a fractional bandwidth of 0.5, and the fractional bandwidth of a 6 Mhz video signal at 4 Mhz is 1.5. Reversing the frequency order of the narrowband signal and the video signal, i.e., placing the narrowband signal at 7 Mhz and the video signal at 3 Mhz, makes these fractional bandwidths 0.07 and 2, dramatically decreasing the fractional bandwidth of the narrowband signal, without significantly changing that of the video signal.

E. Transmitting a Single Video Signal over Long Transmission Lengths (FIGS. 3A–3C)

When transmission lengths are longer than 1000 feet, transmission problems may be encountered even at frequencies below 10 Mhz. In these types of situations, use of extended pairs 405 to communicate multiple signals over a large frequency range may not be feasible. A system that communicates only a single video signal, however, can still be very useful in many important applications.

Figure 3A:
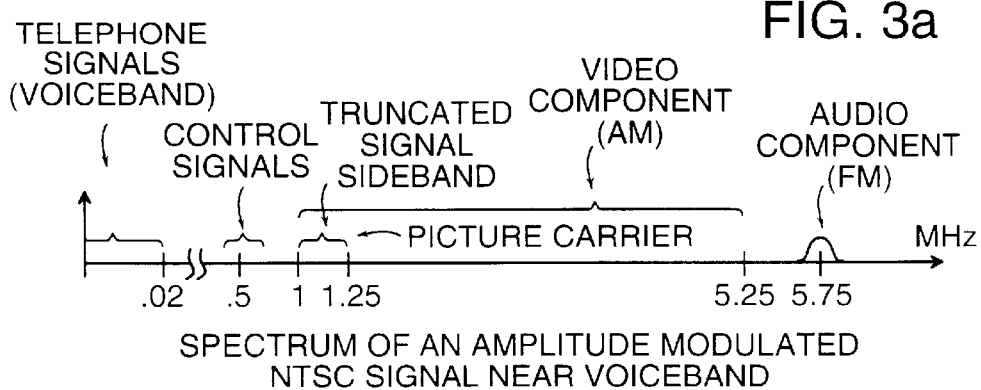
FIGS. 3a–3c show different spectral distributions of video signals that are useful in understanding the invention.
Figure 3B:
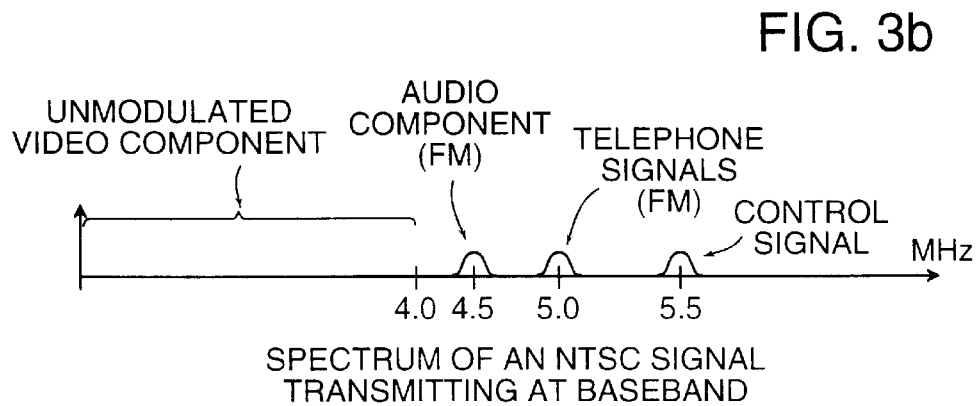
Figure 3C:
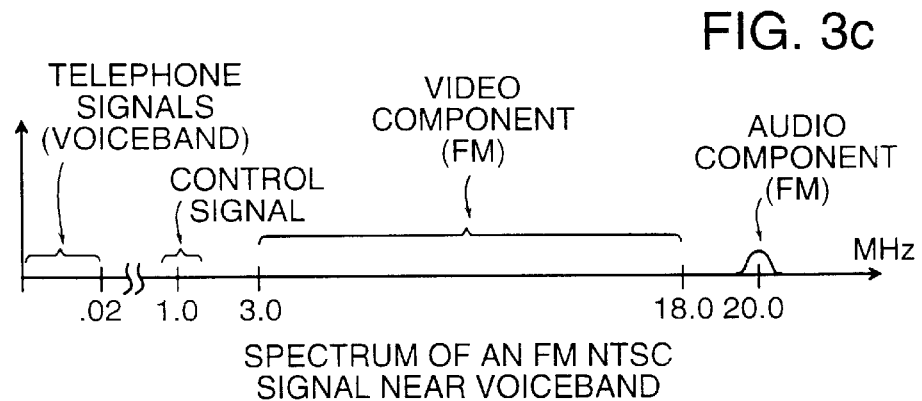

To provide for communication of a single video signal under circumstances of long transmission length, three different sets of specific waveform/frequency combinations are shown in FIGS. 3a–3c and disclosed below. To gain extra transmission length, each of these uses frequencies below the lower limits suggested above.

Each of these techniques has advantages and disadvantages vis-a-vis the other two. One technique is to transmit the signal amplitude modulated at a frequency slightly above voiceband (FIG. 3a). A second technique is transmit an unmodulated signal at baseband (FIG. 3b). The third technique is to transmit the signal frequency modulated within a band having a low end of approximately 3 Mhz (FIG. 3c).

One of the applications where communication of a single video signal can be important is in transmitting cable TV signals over extended pairs 405. In this case, provision is made for the user to select the signal to be transmitted. Methods of encoding low data rate bitstreams, e.g., 100 bits per second, into signals with narrow bandwidths, e.g., less than 0.5 Mhz, that can tolerate very low SNR levels at the receiver input are well known. Thus, it will be appreciated that the "selection" (i.e., control) signal can normally be transmitted at frequencies above the video signals in each of the techniques described below, and still tolerate the added attenuation of those higher frequencies.

Alternatively, in the case of the distributions shown in FIGS. 3a and 3c, there is "room" to transmit a narrow band control signal between the voiceband and the video signal. Because placing narrowband signals near the voiceband reduces filtering costs, as described above, this is a preferred method of transmitting these signals. Thus, FIGS. 3a and 3c allocate a small part of the spectrum between the voiceband and the video signal to these selection signals.

The distribution shown in FIG. 3b does not allow this because the video signal extends down to baseband. In this situation, a preferred method is to transmit the narrowband "selection signal" in a frequency band above both the video information and the telephone signals.

1) Amplitude Modulation within a Low-Frequency Channel (FIG. 3a)

In the first technique, processor 418 converts each video signal selected from communication line 402 to an AM signal whose carrier frequency is below 3 Mhz, and is preferably closer to 1 Mhz. To prevent interference with telephone signals, the lower sideband of this signal, known as the lower vestigial sideband, is suppressed to substantially eliminate the energy in the voiceband.

FIG. 3a shows the spectrum of such a signal. The carrier frequency is 1.25 Mhz, with the lower sideband substantially suppressed below 1 Mhz. The 1.25 Mhz frequency is chosen as a compromise between the transmission advantages of lower frequencies (which are described in the parent and first CIP applications,) the disadvantages of lower frequencies (which are described below), and a particular advantage of the specific frequency of 1.25 Mhz (described in the next paragraph).

One of the disadvantages of lower frequencies is that the filtering that separates these signals from voiceband signals is more expensive because of the sharp cutoff required between the upper end of the voiceband and 1 Mhz. A second disadvantage is that the harmonics of the telephone signals at lower frequencies are stronger, meaning that stronger filtering of the harmonics is required to protect against interference from these signals. A third disadvantage is that the modulation electronics become more expensive as the picture carrier approaches DC. The particular advantage of the 1.25 Mhz picture carrier is that it coordinates with one of the channelization schemes disclosed in the second CIP application.

In the channelization scheme shown in FIG. 3a, the audio component of the television signal is frequency modulated with a carrier frequency of 5.75 Mhz. That is, the audio component is placed slightly above the high-end of the video band. In particular, it is spaced 4.5 Mhz above the video carrier, thus following the convention of standard NTSC channels.

The signals whose harmonics are likely to cause the interference described above are those with high energy, such as ringing signals, and signals relatively high in frequency such as the transient signals that occur with sudden voltage changes during hook-switching. Ordinarily, the harmonics as high as radio frequencies are harmless because the energy level of a harmonic series reduces with frequency. Because of the relatively low frequencies of the video signals, however, these harmonics may still have significant energy when reaching the same frequencies.

The ringing and transient signals originate at local exchange 476 or within telephone devices 414. To prevent this type of interference, these sources are filtered, preventing the harmonics from transmitting onto extended pairs 405. This filtering is now described.

Figure 13A:
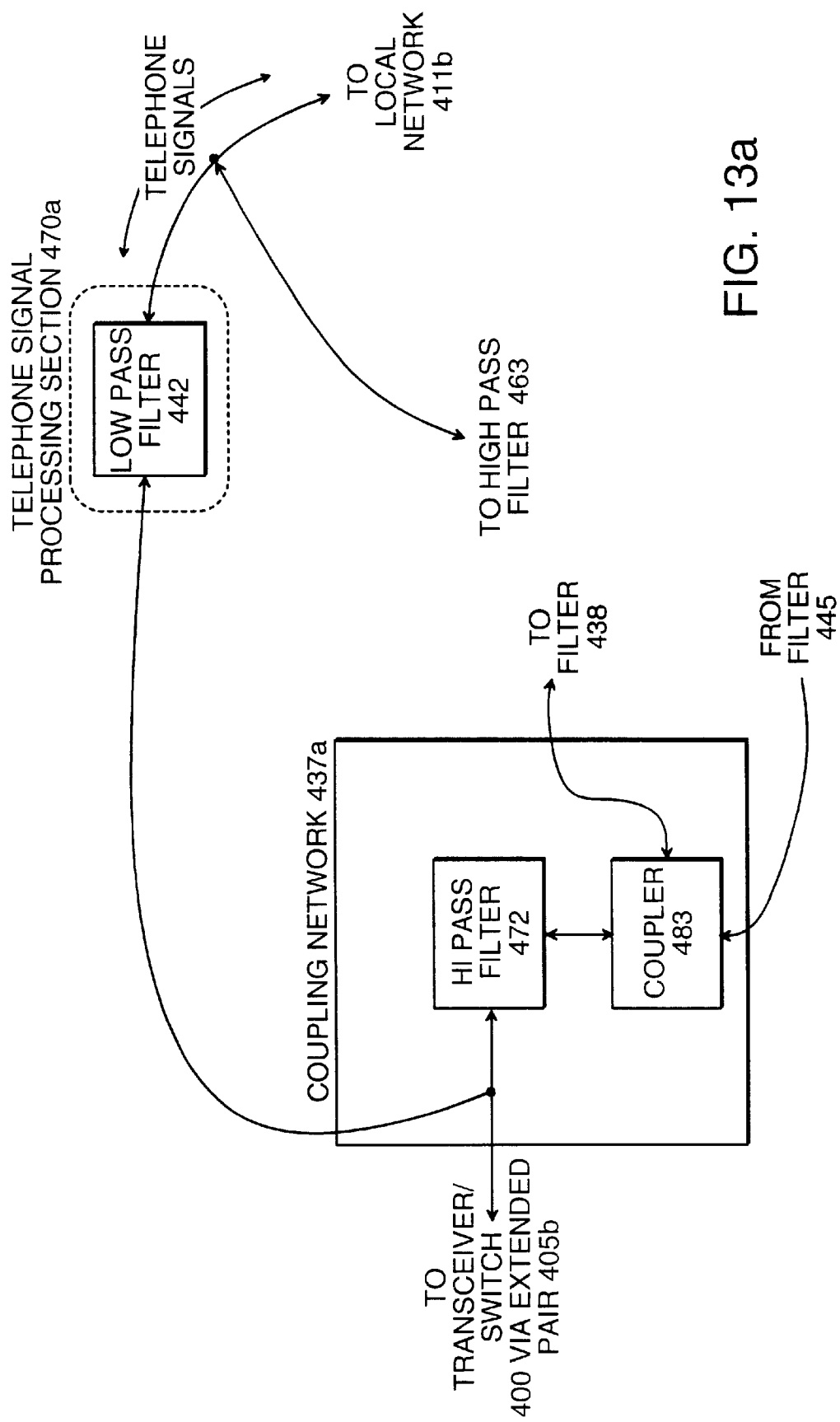
FIGS. 13a and 13b show additional details of the components of the local network interface of FIG. 10 that processes the telephone signals transmitting between the local networks and the transceiver/switch.
Figure 13B:
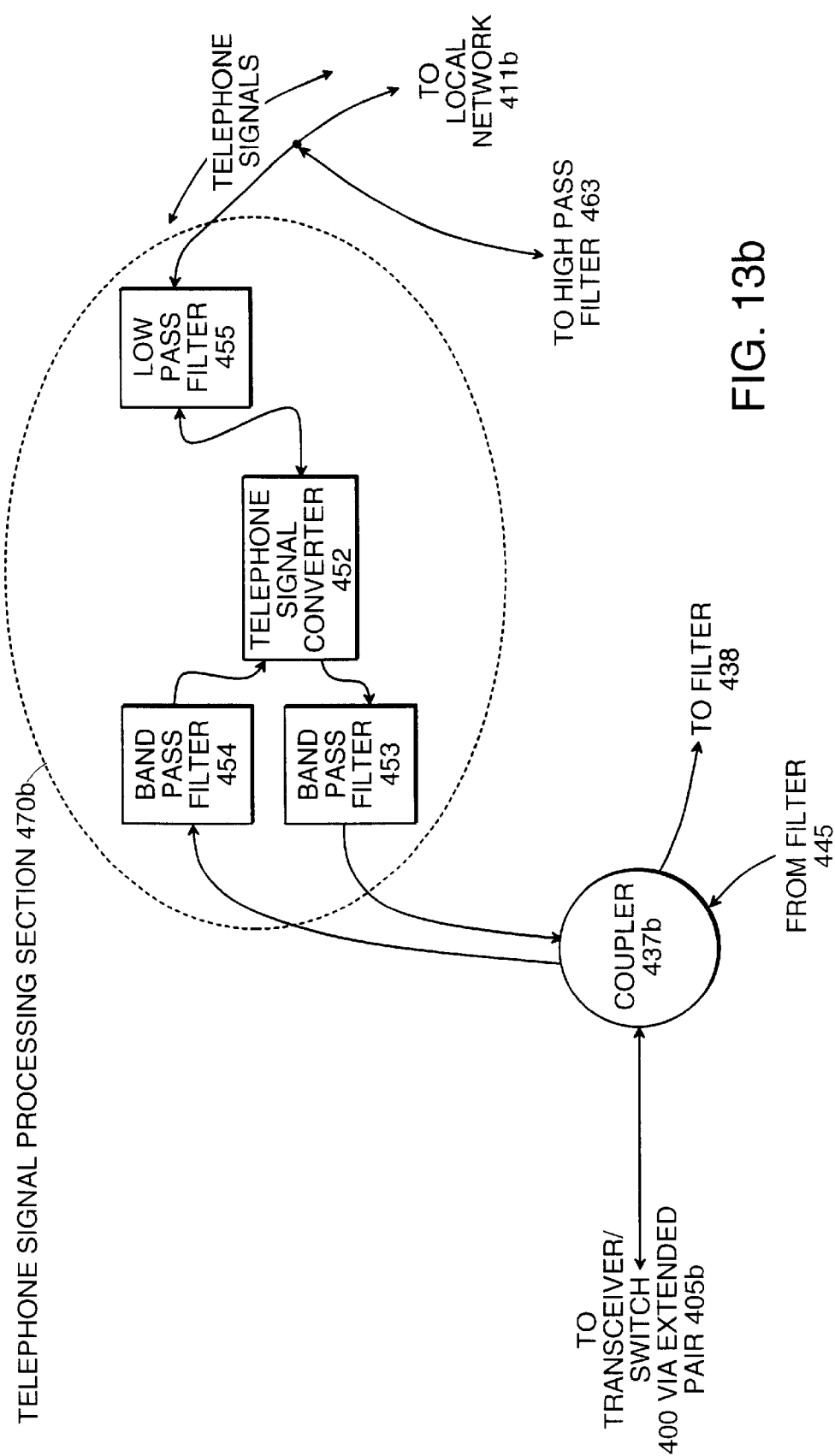

Referring again to FIG. 2, filters 474, which include low-pass filters 474a–474e, respectively, placed in series on each of twisted pairs 476a–476e, block the harmonics of telephone signals that originate at local exchange 475 from transmission to extended pairs 405. This avoids interference with RF signals transmitting over those wires. Similarly, transients and harmonics created by the telephone devices 414 on local networks 411 are blocked from crossing over to extended pairs 405 by filtering within local network interfaces 404. That filtering is shown in FIGS. 13a–13b and is described below. In the embodiments where local network interfaces 404 are not provided, other filtering must block the harmonics of telephone devices 414. This filtering is provided by the low pass filter (LPF) interposed between each of telephone devices 414 and the network wiring, as shown in FIG. 1a.

As described in the first CIP application, the video signal shown in FIG. 3a may suffer from the problem of spectral tilt because it is amplitude modulated with a picture carrier substantially below 5 Mhz. To reduce this tilt, processor 418 pre-emphasizes, or amplifies, the higher frequencies of the signal by a greater amount than the lower frequencies. This pre-emphasis is performed in processor 418 by modulators 410a–410d (collectively, modulators 410) as described below.

If pre-emphasis is not provided, or if the signal arrives at the corresponding local network interface 404 with a significant tilt despite precautions, processing in interface 404 can include means known as equalization that estimate the tilt and adjust the spectrum accordingly. Alternatively, equalization can be performed in video receivers 419 that recover signals from local networks 411 and provide them to televisions 492.

In the reverse direction, compensation for spectral tilt is implemented by providing pre-emphasis in video transmitters 417 or in local interfaces 404. Alternatively, equalization of the video signals received from extended pairs 405 can be provided in demodulators 416 of processor 418, as described below.

The preferred compensation technique for the spectral tilt of signals transmitting to local networks 411 is to perform pre-emphasis in processor 418. The preferred technique for compensation of signals transmitting in the opposite direction is to use equalization in processor 418. These techniques are preferred because using them would confine all the special compensation circuitry in a single device, transceiver/switch 400, which would seem to be economical. Also, adjustment of the compensation circuitry must normally be done for each of extended pairs 411. Thus, performing an adjustment for an entire system is more convenient when the adjustment controls are confined to one device.

2) Transmitting Unmodulated Video Signals over Active Twisted Pairs (FIG. 3*b*)

Referring to FIG. 3*b*, an alternative to transmission using AM at a low frequency is to transmit the video signal in its unmodulated form. This will reduce (e.g., by 25%) the highest frequency used by the video signal below that of the previous example from 5.25 Mhz to 4 Mhz, reducing the attenuation of transmission and providing a further increase in the length over which transmission can succeed. Equally important, crosstalk energy from neighboring pairs will also decrease.

Because the unmodulated video signal occupies voiceband frequencies, telephone signals on extended pairs 405 are transmitted within a frequency band above the unmodulated video signal to prevent interference. As shown in FIGS. 9*b* and 13*b* and described below, signal separators 413 (FIG. 9) and local network interfaces 404 (FIG. 10) cooperate to ensure that the telephone signals transmit above 4 Mhz on pairs 405. FIG. 3*b* shows the 0.5 Mhz band centered at 5.0 Mhz allocated to telephone signals.

Transmission of a television signal also requires, of course, transmission of audio information. As shown in FIG. 3*b*, the audio information transmits FM encoded at 4.5 Mhz, just above the end of the video spectrum. This is consistent with the NTSC standard. Control signals for channel selection are transmitted within a 0.5 Mhz band centered at 5.5 Mhz.

Provision of the telephone, control, and audio signals above the video band would seem to defeat the advantage of using unmodulated signals to reduce the maximum frequency. Because the information content of the audio and telephone signals are very low, however, these signals can be FM encoded so that the minimum SNR that they require at the receiver is much less than the 40 dB required by an AM video signal. This means that the transmission length is limited by the attenuation at the upper bound (4 Mhz, in this case) of the video signal, and that distortion from crosstalk interference will be caused by crosstalk at 4 Mhz before it is caused at the frequencies used by the audio and the telephone signals.

To transmit unmodulated signals, processor 418 receives signals from communication line 402 and demodulates them, if necessary. Processor 418 then amplifies these signals, and switches a separate signal on each one of paths 478 leading to signal separators 413.

Under the proposed scheme, telephone signals from local exchange 475 that transmit over twisted pairs 476 at voiceband frequencies are converted to RF frequencies (FM, with a 5.0 Mhz carrier frequency) by signal separators 413 and fed onto extended pairs 405. Electronics within local network interfaces 404 convert the RF telephone signals back to baseband and the video signals to an RF frequency, and feed both onto local networks 411. This allows the telephone signals to be received from local networks 411 by telephone devices 414 in the ordinary manner. (Because they are at baseband, the telephone signals will pass through the low pass filter (LPF) connected between each of devices 414 and the local network wiring.)

In the opposite direction, telephone signals are fed to local networks 411 by telephone devices 414. These are intercepted by local network interfaces 404, converted to RF signals, and fed onto pairs 405 towards transmitter/switch 400. These signals are received by signal separators 413, converted to ordinary voiceband telephone signals, and fed (via filters 474) onto pairs 476 leading to local exchange 475.

Some of the details of the telephone signal processing are shown in FIGS. 9*b* and 13*b* and are described in detail below. Note that local network interfaces 404 are needed to implement this scheme.

Because energy at the frequencies near DC will be attenuated much less than energy at 4 Mhz, the spectrum of the video signal is likely to tilt significantly during transmission over extended pairs 405. The same pre-emphasis and equalization techniques described to compensate for the tilt of low-frequency AM signals can be used to adjust these baseband signals, and reduce the possibility of distortion.

3) Frequency Modulation within a Low-Frequency Channel (FIG. 3*c*)

In this technique, processor 418 converts each signal derived from communication line 402 to an FM waveform before transmitting the signal onto the selected one of extended pairs 405. It is preferred that the video energy be distributed between 3 Mhz and 18 Mhz, as shown in FIG. 3*c*. A 15 Mhz bandwidth is preferred partly because this range is sufficiently wide to ensure that the minimum SNR required at the receiver input is significantly lower SNR than that required by an AM video signal. FM transmission also provides extra protection from crosstalk interference. These benefits can justify the added expense of FM modulation in certain situations.

When extended pairs 405 are particularly long, of course, the SNR at the receiver input will be below that required by 15 Mhz FM signals. In this event, bandwidths wider than 15 Mhz can be useful because they will provide extra sensitivity, i.e., their minimum SNR level will be even lower. They do, however, suffer greater attenuation because they have energy at higher frequencies. If the greater attenuation does not defeat the extra sensitivity, bandwidths wider than 15 Mhz can extend the transmission length.

The 3–18 Mhz band is preferred above 15 Mhz bands lower in frequency because the advantage of lower bands is small. The attenuation difference, for example, between 16 and 18 Mhz is approximately 0.5 dB per 100 ft, meaning that only a very small advantage can realized by shifting the low end of the 15 Mhz band from 3 Mhz to 1 Mhz. The advantage of the 3–18 Mhz band over a lower band of equal width is a reduction in expense of electronics, a reduced likelihood of interference from voiceband transients, and less spectral tilt.

As shown in FIG. 3C, the audio is frequency modulated to a frequency of 20 Mhz. This frequency was chosen because it is relatively close to the high end of the video band, yet not so close to the video that sharp filtering would be required. Other frequencies, however, can also be used.

Because it requires less SNR at the receiver input, video signals encoded using FM between 3–18 Mhz (FIG. 3C) can communicate over longer distances, under some circumstances, than can be achieved using AM with a carrier below 5 Mhz (FIG. 3A). Under other circumstances, the higher frequencies required by the FM signal will more than cancel this benefit.

Following is an illustrative example. At 18 Mhz, telephone wiring attenuates a signal approximately 3.5 dB per 100 feet. That means that the energy at the high end of the FM signal will be 10.5 dB lower after being transmitted 300 feet over an extended pair 405. The attenuation of energy at 40.5 Mhz, which is near the high end of the AM signal (FIG. 3A) or the unmodulated signal (FIG. 3B) is approximately 3 dB over the same path (i.e., 1 dB per 100 feet). Thus, after 300 feet, the level of the FM signal of FIG. 3C will be 7.5 dB lower than either of the signals of FIGS. 3a or 3b.

Because of its higher sensitivity, however, the level of the FM signal need only exceed the noise by 30 dB, while AM and unmodulated signals should have an SNR of at least 40 dB. Thus, when first fed to the transmission line, the AM signal will 10 dB closer to its minimum required level, which is approximately 0 dB mV for most receivers. Assuming the signals are fed at 30 dB mV, the high end of the FM signal will be at 19.5 dB mV after 300 feet, while the high end of the AM signal will be at 27 dB mV. Thus, FM will still have an advantage, meaning it can tolerate, for example, more broadcast interference. The advantage, however, has reduced to 2.5 dB, i.e. the advantage of 10 dB has been eroded by an amount of 7.5 dB. This advantage will disappear at a transmission distance of 400 feet.

Now consider the situation where local network interfaces 404 are not provided and the transmission path includes 200 feet on extended pairs 405 and 100 feet on the part of the local networks 411 that leads to video receivers 419. In this situation, the attenuation of transmission will be the same but splits may be encountered along the final 100 feet (i.e., the portion of the transmission path that includes a local network 411). Because each split causes 3.5 dB of attenuation, if 8 spits are encountered, the FM signal will be at −8.5 dB mV, above its requirement of −10 dB mV, while the AM signal will be at −1 dB mV, below its minimum.

Independent of the transmission path length, the FM signals will be more resistant to crosstalk interference than AM video signals. At 15 Mhz, for example, the crosstalk loss within a 25-pair bundle of wires varies between 25–50 dB, according to measurements made by the inventors. (As explained above, crosstalk loss is the energy loss, in dB, suffered by a signal while broadcasting across to neighboring wires.) Thus, if signals transmit over ten neighboring pairs at similar levels, the interfering energy contributed by each pair will be 25–50 less than the signal of interest, and the total interfering energy will be 10 dB higher, or 15–40 dB less than the signal of interest. (This assumes that the interfering signals are incoherent because they originate from different sources. The final paragraphs of this section discuss the situation where the interfering signals are all the same, i.e., coherent.) FM video signals with a 15 Mhz bandwidth, however, can have a capture ratio of approximately 10 dB, eliminating crosstalk as a problem in nearly all cases.

At 5 Mhz, on the other hand, which is the approximate upper frequency of the AM signals (FIG. 3A), crosstalk loss varies between 30–60 dB. Because AM signals require at least 40 dB SNR, there is a good possibility that this energy will cause interference with the AM signals at that frequency.

4) Coherent Addition of Crosstalk Energy from Identical Signals Transmitting over Several Pairs at Once A particular type of crosstalk interference can occur when transmitting signals over several twisted pairs in a large bundle of pairs. Specifically, if the signals transmitting over a large group of pairs in a bundle are identical, and one particular pair outside that group carries a different signal, then the energy in the multiple pairs may "add coherently" onto the single pair, causing more interference that would occur if all pairs carried different signals. Such a situation is likely to occur when a group of signals is made freely available for selection by users at several local networks served by the same bundle. (i.e., when the signals on communication line 402 are not targeted specifically for one of the units.) In that event, this problem can occur when the popularity of one signal dominates the others.

An example is where a coaxial cable is brought to the basement of an apartment building, and transceiver/switch 400 derives signals from that cable, offering any one of 30 video signals to the units therein by transmission over the telephone wires that lead to the units. Assume there are 25 units in the building, and 10 of those units select a first video signal. An eleventh unit selects a second video signal. Assuming crossover loss from any of the ten pairs to the eleventh pair is 30 dB, and the contributions from the ten pairs add coherently, the total amount of interfering energy on the extended pair carrying the second signal will be only 10 db below the level of that second signal, or 20 dB higher than the interference from any one of the ten pairs carrying the first signal. Thus, even if FM is used, there is a high likelihood of interference with the second signal in this situation. (If the signals added incoherently, i.e., if all units in the group of ten selected different signals, the total interfering energy would be 20 dB below the signal of interest.)

Below we describe a technique which can reduce the increase in crosstalk interference which occurs in this situation. This technique is embodied in signal separators 413 and shown in FIGS. 9a and 9b.

F. Signal Processing, Conversion, and Switching in Transceiver/Switch 400 (FIGS. 4–7)

Figure 7:
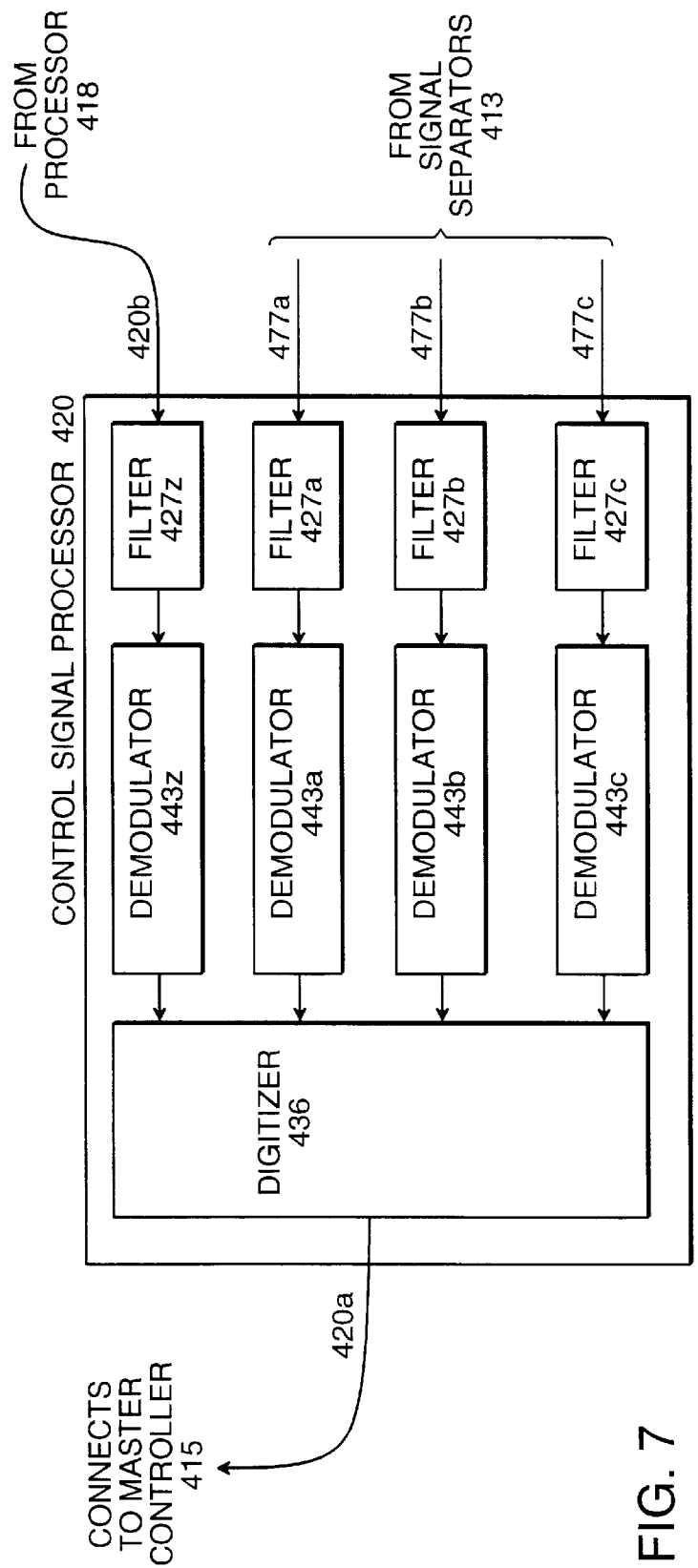
FIG. 7 is a block diagram of a control signal processor in the transceiver/switch of FIG. 2 for processing the signals sent from the local networks to control signal selection and other processing at the point of convergence.

As described above, conversion and switching of signals in transceiver/switch 400 is accomplished by interface processor 418 (FIG. 4) and control signal processor 420 (FIG. 7). Processor 418 serves as the interface between transceiver/switch 400 and communication line 402, and also as the interface between different ones of extended pairs 405. Each of signal separators 413 serves as the interface between transceiver/switch 400 and an associated one of extended pairs 405. As such, one of the functions of processor 418 is to select and recover video and other types of signals from communication line 402, change the characteristics of the recovered signals through processing, and apply them to signal separators 413 for transmission to local networks 411 via extended pairs 405. Another function of processor 418 is to receive video and other types of signals from signal separators 413, process those signals, and transmit them to communication line 402. A third function of processor 418 is to apply signals received from one of signal separators 413 to a different one of signal separators 413.

As emphasized earlier, no processing (such as modulation, demodulation, or frequency shifting) of the signals destined for one of local networks 411 takes place after output from processor 418 (along paths 478) and before reaching local network interfaces 404. Thus, the signal processing performed by processor 418 on the individual signals it selects and recovers from communication line 402 determines the waveform, frequency, and amplitude at which these individual signals will be transmitted across extended pairs 405. This processing is discussed below.

Control signal processor 420 receives control signals transmitted onto local networks 411 (by IR control devices 493) that are targeted for master controller 415, and it also receives control signals from communication line 402. As described above, processor 420 converts the control signals to a form that can be interpreted by master controller 415, and then passes the resulting signals to controller 415. Master controller 415 uses those signals to determine, among other things, which signals shall be selected from communication line 402, and which of local networks 411 shall be targeted to receive those signals. This processing is described in detail below.

A detailed description of a preferred embodiment of interface 418 is given in the following paragraphs, followed by a description of a preferred embodiment of control signal processor 420. It will be appreciated, however, that processor 418 can take on many different embodiments, as long as it fulfills the following three functions (which are also described above):

1) recover video and other signals from communication line 402, and transmit separate electrical signals, including combinations of the recovered signals, onto each of paths 478 that lead to signal separators 413;

2) receive signals transmitted from signal separators 413 along paths 479, process these signals, and apply them to communication line 402;

3) receive signals transmitted from signal separators 413 along paths 479, process these signals, and apply them to other signal separators 413.

There are many ways that processor 418 can be implemented to fulfill these functions. Indeed, the closed circuit TV industry provides a large variety of electrical and optical processing devices that couple video signals, split video signals, modulate and demodulate signals, and shift signals in frequency. What is shown herein is a method that is preferred in this application, as well as several alternatives.

Figure 4:
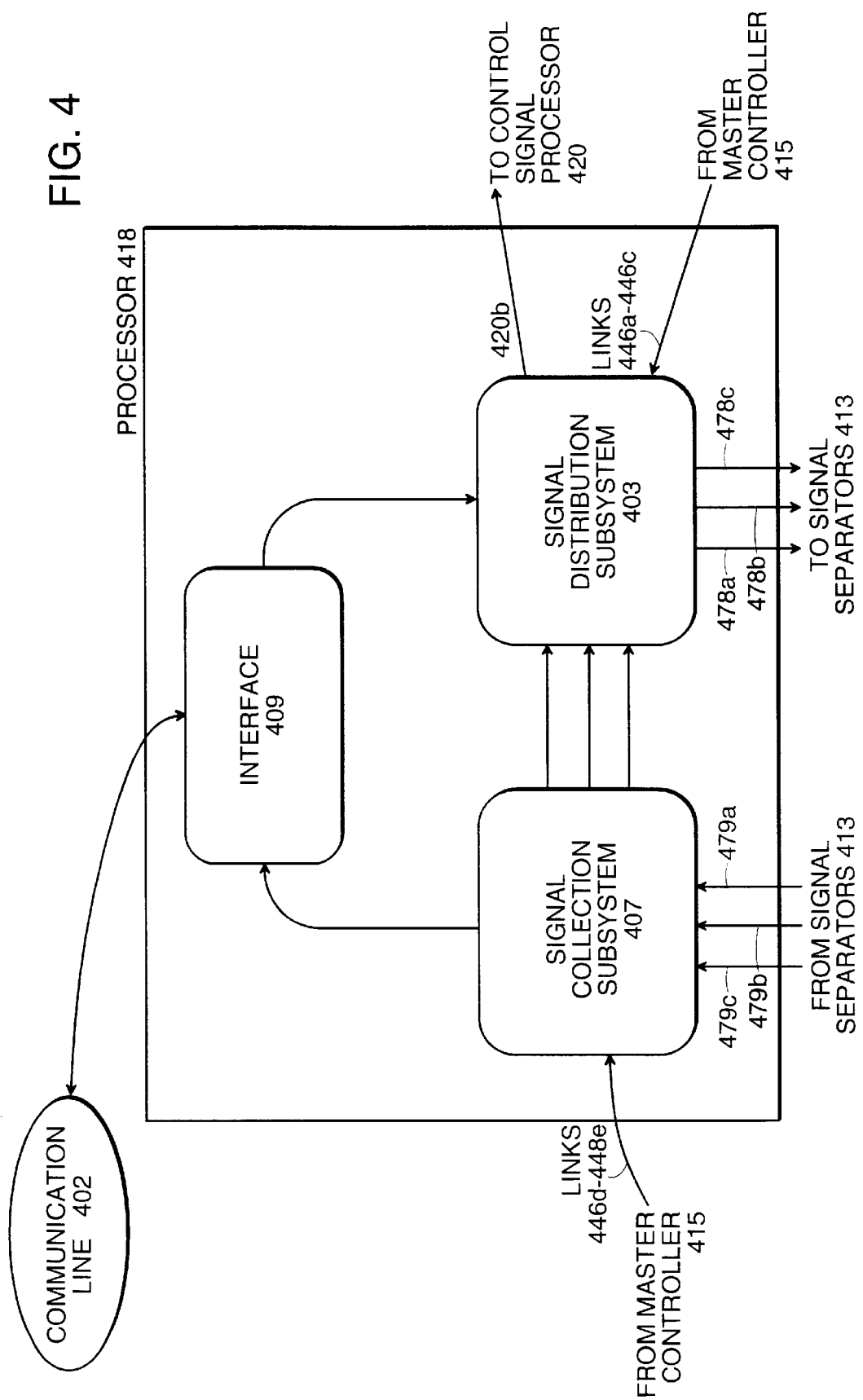
FIG. 4 is a block diagram of a processor in the transceiver/switch of FIG. 2.

1) Processor 418 (FIG. 4)

Referring to FIG. 4, processor 418 includes interface 409, signal distribution subsystem 403, and signal collection subsystem 407. Interface 409 performs two functions. One is to receive signals from communication line 402 and feed them to subsystem 403 in electrical form, independent of the form at which these signals transmit across line 402. (Thus, interface 409 can receive optical signals from communication line 402.) The other function is to receive electrical signals from signal collection subsystem 407 and to apply them to communication line 402, independent of the mode (i.e. electrical, optical, or other) of line 402. (That is, if line 402 is a fiber optic medium, interface 409 converts electrical signals from sub-system 407 to light signals.)

Figure 4A:
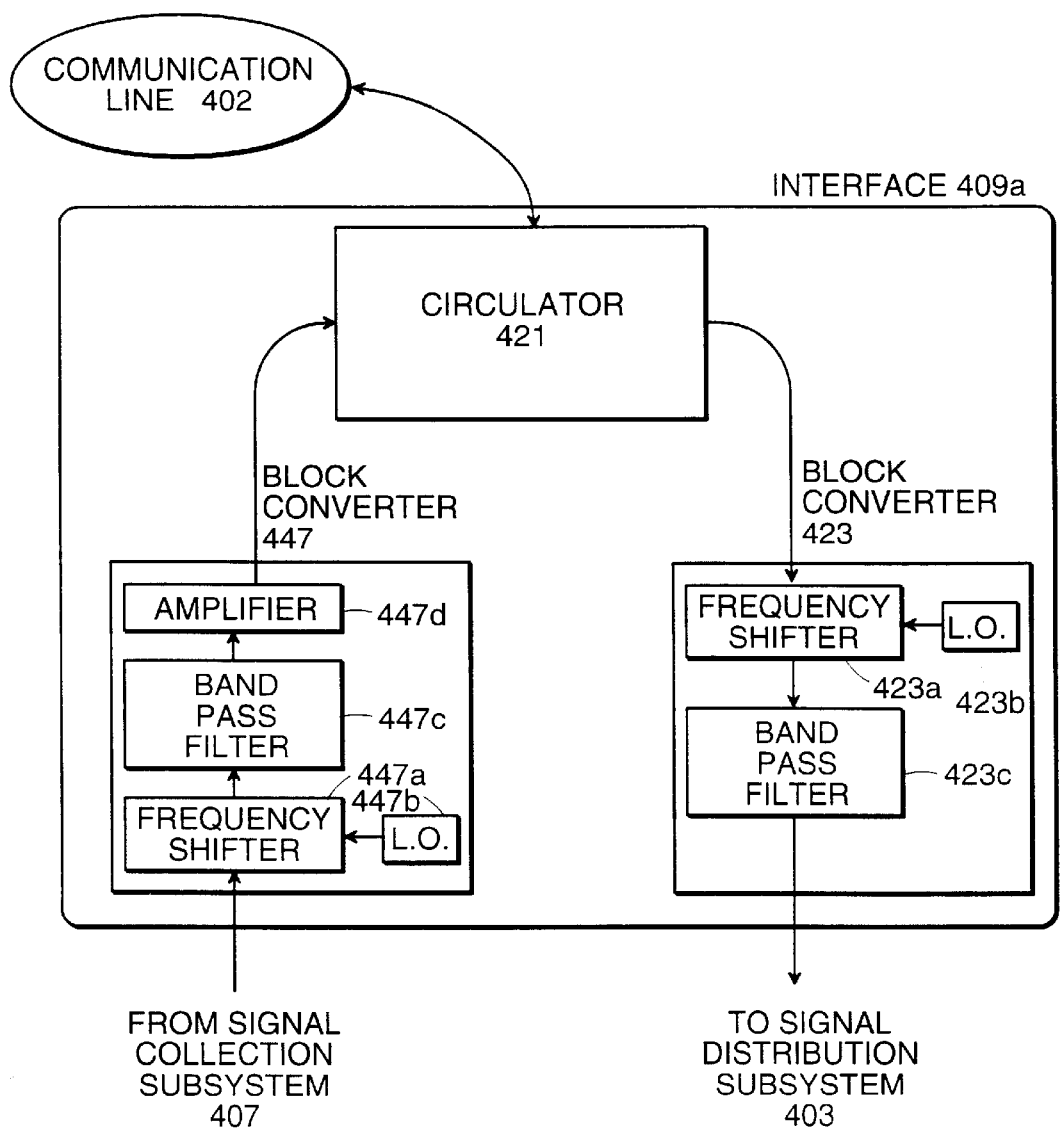
FIG. 4a shows additional details of a component of the processor of FIG. 4 that serves as an interface to the high capacity communication line.

There are many examples of devices that perform such a function. Some of these are designed to interface between an optical line and an electrical communication system. One embodiment of interface 409 is shown in FIG. 4a, and is an example of an interface between a coaxial communication line 402 and an electrical system. It includes circulator 421, block converter 423, and block converter 447.

Circulator 421 receives energy from line 402 and transmits it to block converter 423 while isolating the received energy from block converter 447. Circulator 421 also receives signals from block converter 447 and applies them to communication line 402 while isolating block converter 423 from these signals.

Block converter 423 selects a particular frequency band from its input signal and shifts it in frequency, transmitting the result to signal distribution subsystem 403. This is done in two steps. First, all input signals are heterodyned 423a, 423b to shift the selected band to the output band. Then, the shifted signal is transmitted through the output filter 423c and passed to subsystem 403. As described later on, subsystem 403 transmits the signals received from interface 409 to signal separators 413.

Following is an example. Video signals between the frequencies of 54 Mhz and 900 Mhz transmit from line 402 through circulator 421 to block converter 423. Converter 423 performs a fixed downshift using a preset heterodyne frequency of local oscillator (L.O.) 423b of 620 Mhz, shifting the band between 650–700 MHz to the band between 30–80 Mhz. The result is passed through a filter 423c that only passes energy between 30–80 Mhz. Thus the frequency band between 650–700 MHz is selected and converted to the band between 30–80 Mhz. All other frequencies in the 54 MHz to 900 MHz band are rejected.

Selection and conversion of a frequency band from communication line 402 in the manner described above can be useful when certain frequency bands on a high capacity line are "reserved" for communication with a group of networks. Using the example above, communication line 402 can serve a neighborhood with includes many residences, with the frequencies between 650–700 being dedicated to communication with the residences corresponding to the five local networks 411.

Interface 409 also receives a signal from signal collection subsystem 407. This electrical signal, which may include several individual signals combined together, transmits to block converter 447. The frequency shifter 447a, L.O. 447b, and band pass filter 447c in block converter 447 combine to shift this signal to the frequency at which it will transmit across line 402, and amplifier 447d amplifies the result. Finally, block converter 447 transmits this signal through circulator 421 and onto communication line 402.

Following is an example. Video transmitter 417b receives a signal from video camera 494b (FIG. 1a), converts it to a single 20 Mhz FM video signal between the frequencies of 20–40 Mhz, and transmits it onto local network 411b. This signal is amplified by local network interface 404b and transmitted across extended pair 405b. At transceiver/switch 400, the signal transmits to signal separator 413b (FIG. 2). That component directs the signal to signal collection subsystem 407. Video transmitter 417c feeds a second video signal across extended pair 405c to subsystem 407 using a similar process. Using techniques described below, subsystem 407 converts these two signals to AM video signals within adjacent 6 Mhz channels between 120–132 Mhz. These signals are transmitted over the same conductive path to block converter 447, which upshifts them to the band between 1000–1012 Mhz, and transmits them through circulator 421 to communication line 402.

Signal distribution subsystem 403 receives the electrical signals from block converter 423 and, under control of master controller 415 (via links 446a–446c), selects some of the individual signals contained therein. Subsystem 403 then creates several different combinations of the selected signals. Specifically, a different group of selected signals is combined and applied to each of the conductive paths 478. Furthermore, each selected signal is converted to the frequency, waveform, and amplitude at which it will transmit across one of extended pairs 405. (This conversion also assures that the selected signals in each group do not overlap in frequency.) These signals transmit to each of signal separators 413. (As described above, there is a one-to-one correspondence between signal separators 413 and paths 478.) Several embodiments of this selection and combination process are described below. Examples of the signal processing of subsystem 403 will be given following these descriptions.

Signal separators 413 transmit the signals received from signal distribution subsystem 403 onto the corresponding one of extended pairs 405. Thus, interface 409 and distribution subsystem 403 cooperate to determine which signals transmit from communication line 402 to local networks 411.

In addition to selecting and distributing signals, signal distribution subsystem 403 also splits the signal received from interface 409, providing that signal to control signal processor 420 over path 420*b*. This allows processor 420 to detect signals from communication line 402 that are intended to communicate with master controller 415. As will be described below, processor 420 selects specific signals from path 420*b* by demodulating the energy within a specific frequency band. It then processes the resulting signal, and feeds it to master controller 415.

Except for control signals that provide communication with master controller 415, subsystem 407 receives all non-telephone signals that signal separators 413 receive from extended pairs 405. (Non-telephone signals are those not intended to communicate with local exchange 475.) These signals transmit from signal separators 413 to subsystem 407 along paths 479. Subsystem 407 selects particular signals from among those arriving on paths 479 and combines them onto a single conductive path. (Before combination, signals may be shifted in frequency to prevent them from overlapping in frequency and to arrange them within adjacent channels for application to communication line 402.) This combined signal is transmitted to interface 409, as described above.

A detailed description of several embodiments of signal distribution subsystem 403 and signal collection subsystem 407 is presented next.

Figure 5A:
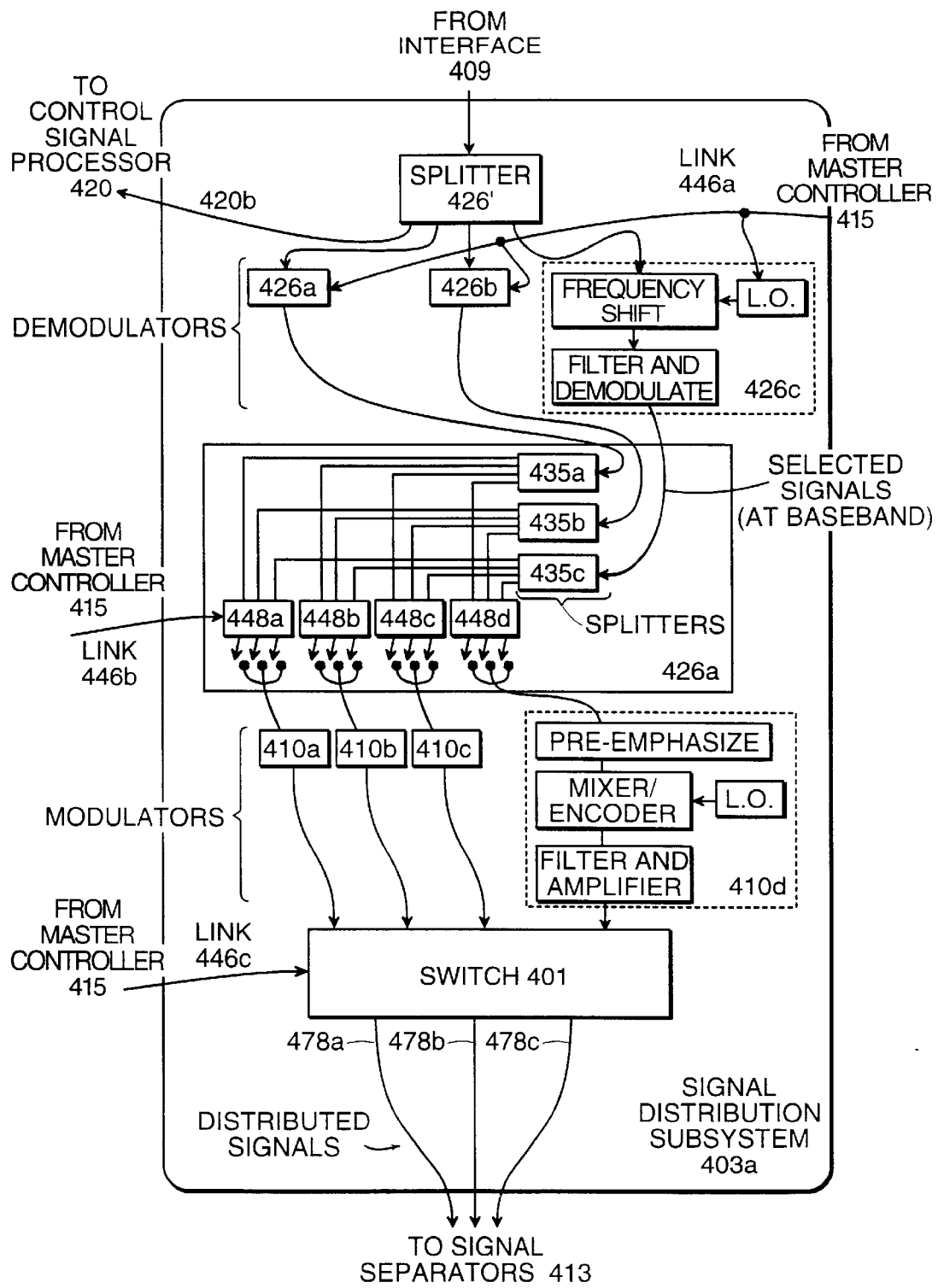
FIG. 5a shows another component of the processor of FIG. 4 that performs the distribution of signals to the various local networks.

2) Signal Distribution Subsystem 403*a* (FIG. 5*a*)

Signal distribution subsystem 403*a*, one preferred embodiment of signal distribution subsystem 403, is shown in FIG. 5*a*. As described above, interface 409 transmits signals along a single conductive path leading to signal distribution subsystem 403*a*. Internal to subsystem 403*a*, these signals transmit to splitter 426', which splits the signal energy along several conductive paths. Four paths are contemplated in FIG. 5*a*. Three paths lead to demodulators 426*a*–426*c*, (collectively, demodulators 426). The fourth path, labelled path 420*b*, leads to signal processor 420.

Processing of the output of splitter 426' by demodulators 426 is described in the following paragraphs. Processing of this output by control signal processor 420 is described further on in this disclosure.

Each demodulator 426 (details are shown for demodulator 426*c* only) selects one signal from among those applied by block converter 423, and converts that signal to baseband. The selection and conversion process conducted by demodulators 426 is similar to that performed by ordinary cable converters that have baseband outputs. As shown in FIG. 5*a*, the input signal is frequency shifted by multiplication with the output frequency of a local oscillator. (A local oscillator is denoted by "l.o." in the figures of this disclosure.) The local oscillator frequency is tuned to bring the selected signal to an intermediate channel. The shifted signal is then filtered, isolating the intermediate channel. Finally, this signal is demodulated, generating the selected signal at baseband.

The identity of the signal selected by demodulators 426 is determined by master controller 415. That component implements its control by sending signals along link 446*a* to each of demodulators 426. These signals determine the frequency of the local oscillators of those components, thus determining which signals are brought to the intermediate channel by each demodulator 426. Ordinary techniques that achieve digital communication between two components on an electronic circuit board can suffice for link 446*a*.

Under an alternative embodiment, the selection of an individual signal from communication line 402 is predetermined by the hardware instead of falling under the control of master controller 415. This can be done simply by designing or manually adjusting demodulators 426 to demodulate only signals within a specific channel. Selection is then determined at the "headend" by feeding the desired signal onto line 402 at the channels to which demodulators 426 are tuned. For example, assume that communication line 402 is a cable TV feed and that 100 NTSC video signals pass through circulator 421 to block converter 423 in interface 409*a*. Assume further that block converter 423 selects the 10 adjacent signals beginning at 300 Mhz and converts them to the 10 adjacent 6 Mhz bands between 108 Mhz and 168 Mhz. Now let demodulator 426*a* be designed to always select the video signal expressed between 108 and 114 Mhz, whatever that signal may be. In this situation, the identity of the signal selected by demodulator 426*a* is determined at the "headend," or root of the cable TV feed. Specifically, whatever signal is fed between 300–306 Mhz at the root will be selected and provided as output by demodulator 426*a*.

The basebanded signals output by demodulators 426 constitute the signals "selected" for distribution to local networks 411. (They are labelled the "selected" signals in FIG. 5*a*.) They will pass through separators 413 to extended pairs 405. First, however, they are converted to the waveform, frequency, and energy level at which they will be transmitted across extended pairs 405. This is accomplished by modulators 410*a*–410*d* (collectively, 410).

Each modulator 410 (the details of modulator 410*d* are shown) is designed or manually adjusted so that it always modulates its input in the same manner, outputting it within the same frequency band and at the same energy level. Thus, each of modulators 410 corresponds to a different "channel" used by signals that transmit across extended pairs 405. To provide flexibility in assigning any one of the signals selected by demodulators 426 to any of the channels created by modulators 410, signals from demodulators 426 transmit to modulators 410 through switch 462*a*. Thus, switch 462*a* assigns the selected signals to different channels.

Switch 462*a* works as follows. Internal to switch 462*a* are splitters 435*a*–435*c* (collectively, splitters 435), which have a one-to-one correspondence with demodulators 426. As shown in FIG. 5*a*, each of the signals from demodulators 426 transmits to splitters 435 which splits the energy of the signals onto four paths, each one leading to a different one of switching banks 448*a*–448*d* (collectively, banks 448). Each bank 448 responds to signals sent from master controller 415 along link 446*b*. In response to these signals any one of banks 448 can switch any one of its inputs to any or all of modulators 410*a*–410*d*. Thus, switch 462*a* can provide each of modulators 410 with the outputs of any demodulator 426. Because the outputs of demodulators 426 are all at baseband, however, master controller 415 ensures that at most one signal (i.e., the output of only one demodulator 426) is provided to any one of modulators 410 at one time. Some of modulators 410, however, may not receive signals.

As described above, each modulator 410 converts the baseband signal it receives to a particular waveform, frequency, and energy level. The signals output by modulators 410 do not undergo further processing (modulation or frequency shifting) before exiting subsystem 403. As described earlier, the waveform, frequency, and energy level of signals output by subsystem 403a is very important because these signals ultimately transmit to extended pairs 405 without any further processing except for filtering and switching. Thus, the processing applied by modulators 410 determine, to a large extent, the reliability of transmission to local networks 411.

As described in the first CIP application, when AM signals are transmitted with a picture carrier below 5 Mhz, spectral tilt is likely to cause distortion. One of the proposed solutions is to "pre-emphasize" the high frequencies of the signal so that the attenuation related to transmission will result in reception of a signal with a flat spectrum. It is preferred that this pre-emphasis be performed within modulators 410. Following is an example of how pre-emphasis can be implemented within modulator 410a.

Assume that modulator 410a outputs an AM NTSC video signal with a picture carrier at 1.25 Mhz (FIG. 3a). The upper sideband of such a signal will extend approximately between 1.25 Mhz and 5.25 Mhz. Assume that attenuation of extended pair 405b at 1.25 Mhz is 1 dB per 100 feet, and at 5.25 Mhz it is 3 dB per 100 feet. (Assume further that the affect of attenuation follows, to a good approximation, a linear variation between those endpoints.) If extended pair 405b is 1000 feet long, and the signal from modulator 410a is to be applied to pair 405b, the energy at 5.25 Mhz would ordinarily be received at a level 20 dB lower than that at 1.25 Mhz. To compensate for this, processor 410a can include circuitry to "pre-emphasize" the signal such that energy at 5.25 Mhz is transmitted 20 dB higher than that at 1.25 Mhz, and such that the pre-emphasis varies approximately linearly between those frequencies. Such pre-emphasis circuitry is known.

It is preferred that the modulation process follow any pre-emphasis process. This sequence is shown in the block diagram of modulator 410d (FIG. 5a). If AM waveforms are used, the modulation process involves mixing or multiplying the frequency of the signal by a local oscillator. If FM waveforms are used, the modulation process involves "encoding" voltage variations of the signal as frequency deviations of the carrier. After modulation, the signal is filtered and amplified to the level at which it will transmit across the wiring.

Each signal produced by modulators 410 transmits through switch 401 over one or more of paths 478 to signal separators 413. (Paths 478 have a one-to-one correspondence with signal separators 413, and thus with extended pairs 405 and local networks 411.) Switch 401, which responds to commands from master controller 415 sent over link 446c, is implemented in the same manner as switch 462a. Master controller 415, however, allows switch 401 to apply the output of more than one modulator 410 onto any one of paths 478a–478c. Thus, switch 410 "composes" the signal sent to each of signal separators 413 by combining the outputs of modulators 410. The only restriction is that the signals from two of modulators 410 that overlap in frequency cannot be switched onto the same one of paths 478. The signals output by switch 401 are labelled "distributed signals" in FIG. 5a.

Figure 6A:
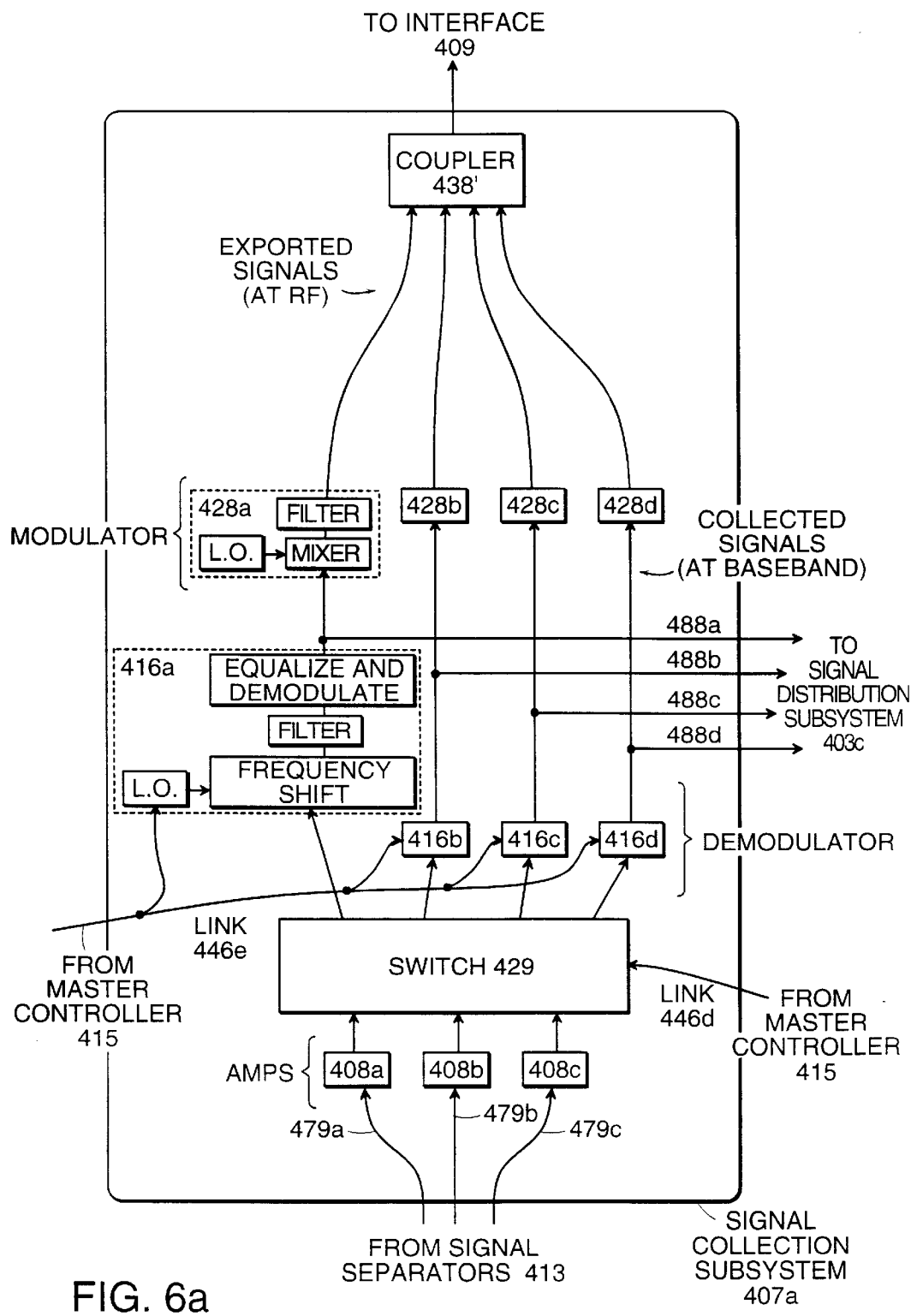
FIG. 6a shows additional details of still another component of the processor of FIG. 4 that performs the reception and disposition of signals sent from the various local networks.

3) Signal Collection Subsystem 407a (FIG. 6a)

Signal collection subsystem 407a, one preferred embodiment of signal collection subsystem 407, is shown in FIG. 6a. Signals received by subsystem 407a arrive along paths 479 and transmit to amplifiers 408a–408c (collectively, amplifiers 408). These signals originate on local networks 411.

Following is an example of the transmission path followed by a signal received by subsystem 407a. Signals fed by video transmitter 417b to local network 411b are received by local network interface 404b and retransmitted onto extended pair 405b. These signals transmit across pair 405b to signal separator 413b. As is described later on, signal separator 413b separates out the telephone signals and passes the remaining signals to amplifier 408b. Equivalent paths are used by other RF transmission devices to send signals to amplifiers 408a and 408c.

The output of each amplifier 408 passes through switch 429 to demodulators 416a–416d (collectively, demodulators 416). Amplifiers 408 are provided to compensate for the energy loss caused by signal splitting internal to switch 429.

The design of switch 429 follows that of switch 462a in FIG. 5a. As such, switch 429 responds to commands from master controller 415. These signals are sent over link 446d.

Each demodulator 416 selects a channel (i.e. a frequency band) from its input signal and converts the energy in that band to baseband frequencies. As shown for demodulator 416a, the demodulation procedure involves frequency shifting a selected frequency band to an intermediate band, filtering that band, and demodulating the result. Equalization of the signal to compensate for spectral tilt is also performed, if necessary. In the case of AM signals, it is preferred that the equalization be done after demodulation. In the case of FM signals, equalization should be done before demodulation but after filtering. The purpose of equalizing FM signals before demodulation is described in the first CIP application. (This equalization process is not to be confused with the process called "emphasis" which is part of standard FM communication. In this process, the level of the higher frequencies of the information signal are amplified before modulation, and then attenuated after demodulation. This compensates for the tendency, inherently part of FM communication, whereby noise affects the higher frequencies of a signal more than the lower frequencies.)

The demodulation process creates a basebanded version of the signal in the selected band. Selection of channels by demodulators 416 is done by altering the frequency of the local oscillator (l.o.) used to implement frequency shifting. This frequency is set in response to control signals from master controller 415 transmitted over link 446e.

The output of each demodulator 416 constitutes the signals "collected" from local networks 411. These signals are passed to modulators 428a–428d (collectively, modulators 428), which have a one-to-one correspondence with demodulators 416. As is described below, modulators 428 perform the first step in "exporting" signals by applying them to communication line 402.

As is also described below, in embodiments in which local networks 411 transmit video signals to each other, signal distribution subsystem 403b (FIG. 5b) is used in place of subsystem 403a, and the "collected" signals are passed along paths 488a–488d (collectively, paths 488) to signal distribution subsystem 403b. Subsystem 403b can transmit each signal received from paths 488 to a local network 411 that is different from the local network that originated the signal.

By controlling switch 429 and demodulators 416, master controller 415 determines which of the signals input to amplifiers 408 are "collected," i.e. output from one of demodulators 416. Note that switch 429, because it follows the design of switch 462a, can simultaneously connect the output of every amplifier 408 to any number of demodulators 416. This is important if the signal provided by one of amplifiers 408 includes more than one independent signal. For example, if the energy output by amplifier 408b includes two adjacent 6 Mhz NTSC video signals between 6–18 Mhz, and the output of amplifier 408b can be switched to both demodulators 416b and 416c, both video signals can be "collected." Note that none of demodulators 416 can receive the output of more than one of amplifiers 408, even if the two output signals do not overlap in frequency. Such switching would not make sense because demodulators 416 select only one signal at a time.

As described earlier, modulators 428 implement the first step in applying the outputs of demodulators 416 to communication line 402. Specifically, each of modulators 428 receives the single basebanded signal output by the corresponding one of demodulators 416. As shown in FIG. 6a, the process includes mixing the frequency of a local oscillator (l.o.) with that of the input signal, and filtering the output. This process creates a new signal, with identical information content, within an RF frequency band.

The local oscillators used by each of the modulators 428 are such that the resulting output frequency bands do not overlap. This allows the outputs to be combined onto a single conductive path. In a preferred embodiment, the frequency bands confining the outputs of modulators 428 are adjacent in addition to being non-overlapping. This minimizes the width of the band occupied by the combined signal.

The signals output by modulators 428 are all transmitted to coupler 428'. That component combines the individual signals onto a single conductive path, and passes it to interface 409. That component applies the combined signal onto communication line 402, as described above.

4) Control Signal Processing (FIG. 7)

Referring to FIG. 7, processor 420 includes filters 427a–427c and 427z (collectively, filters 427), demodulators 443a–443c and 443z (collectively, demodulators 443), and digitizer 436.

As described above, control signals generated by individual control devices 493 and targeted for master controller 415 are transmitted onto local networks 411 by video receivers 419, received by interfaces 404, and fed to extended pairs 405. The control signals are recovered from extended pairs 405 by signal separators 413 and routed to control signal processor 420 along paths 477, which have a one-to-one correspondence with signal separators 413. The control signals arrive at processor 420 at the frequency and waveform at which they were fed to extended pairs 405.

Control signals from communication line 402 also transmit to processor 420. These signals are transmitted from signal distribution system 403 along path 420b (FIG. 4).

As seen in FIG. 6, path 420b connects to filter 427z, while signals transmitting over paths 477 present at corresponding filters 427a–427c. Filters 427 restrict the frequency of the signals passing to the corresponding demodulators 443 to the bands used by the control signals targeted for master controller 415. Signals passing through filter 427z are received by demodulator 443z, while signals passing through filters 427a–427c are received by demodulators 443a–443c.

Demodulators 443a–443c and 443z convert such received signals to baseband frequencies, and pass the results to digitizer 436. That device converts the basebanded signals to digital signals, and passes them to master controller 415 over path 420a. Common methods for communicating digital information between two components on a circuit board can suffice for this link. Methods of digitizing and communicating control signals originating from infrared transmitters are described in detail in the second CIP application.

5) Example #1

Referring to FIGS. 1a, 2, 4, 4a, 5a, 6a, and 7, the following is an example of the processing of non-telephone signals in transceiver/switch 400. Assume that line 402 is a fiber optic cable transmitting high frequency optical impulses that represent frequency modulated encoding of a group of signals with a bandwidth of 5,000 Mhz. Among the individual signals expressed in the 5,000 Mhz band are 50 standard amplitude modulated NTSC signals confined within adjacent 6 Mhz channels. These are expressed between the frequencies of 2000 Mhz and 2300 Mhz.

One of the functions of the communication system of this invention is to transmit any of the individual signals expressed between 2000–2500 Mhz on demand to video receivers 419 and transceiver 491c connected to local networks 411a–411c. Furthermore, the system must allow the users to indicate their video selections by using infrared remote control transmitters 493a, 493b, and 493c shown in FIG. 1a.

Communication line 402 also accommodates communication of signals in the opposite direction, away from transceiver/switch 400. A second task of the communication system is to allow video transmitters 417 and transceiver 491c to transmit signals onto line 402.

The light impulses from communication line 402 are received by interface 409. That component responds to these impulses by producing a frequency demodulated electrical version of the 5000 Mhz signal encoded therein. Block converter 423 in interface 409a selects the frequencies between 2000 Mhz and 2500 Mhz, and converts them to voltage variations between 100 Mhz and 600 Mhz.

The 500 Mhz wide, composite electrical signal provided by interface 409 is transmitted to splitter 426' in signal distribution subsystem 403a. Splitter 426' splits the input energy four ways, transmitting the signal to demodulators 426 and also along path 420b to control signal processor 420.

Referring also to FIG. 8, demodulators 426 react in the following manner. In response to signals fed from master controller 415 over link 446a, demodulator 426a selects and basebands the signal between 176 Mhz and 182 Mhz (video signal U). Similarly, demodulator 426b selects and basebands the 6 Mhz AM signal between 188–194 Mhz (video signal V), and demodulator 426c selects the signal between 200–212 Mhz, which is a digital signal conforming to the "10BaseT Ethernet" standard (digital signal Y), and converts it to a demodulated signal at baseband. Thus, two ordinary NTSC video signals are selected from line 402, basebanded, and provided to switch 462a along two separate conductive paths. A third conductive path provides a 12 Mhz wide computer signal.

Switch 462a applies the output of demodulator 426a (video signal U) onto the path leading to modulator 410a, the output of demodulator 426b (video signal V) onto the paths leading to modulators 410b and 410d, and the output of demodulator 426c (digital signal Y) onto the path leading to modulator 410c.

Modulators 410 modulate their input signals, converting them to frequency bands between 1 Mhz and 22 Mhz. These are the frequencies used to transmit signals from transceiver/ switch 400 to local networks 411. Specifically, modulators 410*a* and 410*b* amplitude modulate video signals U and V, respectively, to produce RF signals at 40 dB mV between 1–6 Mhz in each case. (The frequency band between 1 and 6 Mhz can be used to provide a standard 6 Mhz NTSC channel if the part of the lower vestigial sideband between 0–1 Mhz is filtered out. This technique is described in the second CIP application.) Modulator 410*d*, on the other hand, converts video signal V to an FM signal at 40 dB mV between 7 and 22 Mhz, and modulator 410*c* converts digital signal Y to a signal confined between 6 and 18 Mhz. Switch 401 receives the outputs of modulators 410*a*–410*c* and applies them to paths 478*a*–478*c*, respectively. Switch 401 also applies the output of modulator 410*d* to path 478*a* and couples the output of modulator 410*b* onto path 478*c*. Thus, path 478*a* conducts both video signal U and video signal V (in different frequency bands), path 478*b* conducts video signal V, and path 478*c* conducts both video signal V and digital signal Y (in different frequency bands).

The signals applied to paths 478*a*–478*c* transmit to signal separators 413*a*–413*c*, respectively. Those components feed the signals onto extended pairs 405*a*–405*c*, respectively, using techniques described below.

The signals transmit across pairs 405*a*–405*c* to local network interfaces 404*a*–404*c*, respectively, each of which converts the signals as necessary to enable them to be transmitted over respective local networks 411*a*–411*c*. Specifically, local network interface 404*a* converts video signal V to an AM signal in the frequency band between 24–30 Mhz and video signal U to an AM signal in the frequency band between 12–18 Mhz. Meanwhile, local network interface 404*b* converts video signal V to an AM signal in the frequency band between 54–60 Mhz (corresponding to VHF channel 2). Finally, local network interface 404*c* converts video signal V to the AM signal between 12–18 Mhz, and expresses digital signal Y between the frequencies of 18–40 Mhz. Techniques to perform these conversions are described below.

After this conversion, local network interfaces 404 amplify the signals and retransmit them onto the respective local networks 411. Once applied to local networks 411, signals U, V, and Y are received by video receivers 419 and transceiver 491*c*. Video receivers 419 convert signals V and U to tunable frequencies before transmitting them to connected televisions 492, and transceiver 491*c* converts its signal to a form appropriate for computer 495*c*. Video receivers 419*a* and 419*a*', in particular, apply a single upshift of 186 Mhz to energy between the frequencies of 12 Mhz and 30 Mhz, converting signals U and V to video signals with picture carriers at 199.25 and 211.25 Mhz, (i.e. VHF channels 11 and 13), respectively. A design for a video receiver that performs such a block conversion is given in the second CIP application, and a design for transceiver 491*c* is given in the first CIP application. These conversions allow users at local networks 411*a* and 411*b* to watch video signal V, those at local network 411*a* can also watch video signal U, and computer 495*c* at local network 411*c* can receive digital signal Y, which is an "EtherNet" signal from communication line 402.

Meanwhile, RF transmitters 417 connected to local networks 411 apply signals to those networks that transmit in the opposite direction. These are received by interfaces 404, which in turn apply them to pairs 405. The signals then transmit to signal separators 413 in transceiver/switch 400. Those components direct the signals along paths 479 to amplifiers 408 in collection subsystem 407*a* of processor 418. All of these signals transmit across extended pairs 405 at frequencies between 24 and 100 Mhz, a band that does not overlap with the band in which signals transmit in the opposite direction (i.e., 1 Mhz–22 Mhz). (Techniques embodied in local networks interfaces 404 that receive signals from local networks 411, convert them, and transmit them across extended pairs 405 are described below. The routing of these signals by signal separators 413 is also described below.)

An example of the signals transmitted by the RF transmitters 417 connected to local networks 411 and the conversions performed by local network interfaces 404 follows. Assume that video transmitter 417*b* inputs an NTSC video signal (video signal W) from camera 494*b* and feeds it onto local network 411*b* amplitude modulated between 6–12 Mhz. This signal is received by local network interface 404*b*, converted to an FM signal between 24–54 Mhz, amplified, and applied to extended pair 405*b*. At transceiver/switch 400, video signal W transmits to signal separator 413*b*, which applies it to amplifier 408*b*. Meanwhile, video signal X is generated by camera 494*c* and transmits from video transmitter 417*c* to amplifier 408*c* in an identical manner (via interface 404*c*, extended pair 405*c*, and signal separator 413*c*).

Transceiver 491*c*, meanwhile, receives a digital signal from computer 495*c*. That signal carries 1 Mbits/sec of information, (less than digital signal Y) and is called digital signal Z. Transceiver 491*c* expresses this signal between 1–6 Mhz, and applies it to local network 411*c* where it is intercepted by local network interface 404*c*. Interface 404*c* encodes this signal using frequencies between 54–100 Mhz and transmits it onto extended pair 405*c*. The signal transmits across to transceiver/switch 400. Because it is expressed at relatively high frequencies, signal Z is received with a lower SNR, but its wider bandwidth allows reception with a low error rate. At transceiver/switch 400, digital signal Z transmits through signal separator 413*c* to amplifier 408*c*.

The signal reaching amplifier 408*c* covers the frequencies between 24 Mhz to 100 Mhz and includes both video signal X and digital signal Z from local network 411*c*. Under instructions from master controller 415, switch 429 directs the output of amplifier 408*c* to both of demodulators 416*b* and 416*c*. Meanwhile, video signal W reaches amplifier 408*b*. Upon output from amplifier 408*b*, switch 429 directs that signal to demodulator 416*a*.

Under the control of controller 415, each demodulator 416*b*, 416*c* processes only one of the two individual signals that constitute their inputs. Specifically, demodulator 416*b* demodulates video signal X, providing it at baseband frequencies to modulator 428*b*, while processor 416*c* demodulates digital signal Z, providing it at baseband frequencies to modulator 428*c*. Processor 416*a*, meanwhile, demodulates video signal W, providing it at baseband frequencies to modulator 428*a*.

(These signals also transmit along paths 488. Because signal distribution subsystem 403*a* is not equipped to input signals from these paths, however, signals transmitting along paths 488 are not received.)

Modulators 428 convert their inputs to RF frequencies. Specifically, modulator 428*a* converts video signal W to a modulated form between 400–406 Mhz. Similarly, modulator 428*b* converts video signal X to a modulated form between the frequencies of 406–412 Mhz, and modulator 428*c* converts digital signal Z to a modulated form between the frequencies of 412–424 Mhz.

These three signals are fed to coupler 428'. That component combines the three signals and transmits them to interface 409. Interface 409 then encodes the energy between 400–424 Mhz in this input signal into light impulses which it applies to communication line 402.

Control signals are also transmitted from local networks 411 to transceiver/switch 400. At local networks 411a, control signal A is introduced by IR remote control transmitter 493a in the form of light patterns. These are detected by video receiver 419a, converted to an electrical signal with a 0.5 Mhz bandwidth centered at 23 Mhz, and fed onto local network 411a. Control signal A is then intercepted by local network interface 404a and fed onto extended pair 405a between the frequencies of 22.75–23.25 Mhz. It transmits to transceiver switch 400, passing through signal separator 413a to paths 479a and 477a. Path 479a leads to amplifier 408a. Although this path may connect to one of demodulators 416, control signal A will transmit no further because demodulators 416 do not demodulate signals in the band between 22.75–23.25 Mhz.

Control signal A transmits across path 477a through filter 427a to demodulator 443a in control signal processor 420 (FIG. 7). That component basebands the signal, passing it to digitizer 436 which converts the signal to digital form. Finally, this digital representation of control signal A is transmitted to master controller 415. Control signals B and C are created by IR remote control transmitters 493b and 493c and transmit to master controller 415 in a similar manner using the same frequencies.

Following is an example of a change in channel selection. As explained above, video signal U is part of the 5000 Mhz signal transmitting on line 402. Specifically, assume that video signal U spans the frequencies between 2076 Mhz and 2082 Mhz, which are translated by interface 409 to the band between 176–182 Mhz. This band is selected when demodulator 426a converts it to the "intermediate" frequency. In response to a control signal from local network 411a, however, master controller 415 can instruct demodulator 426a to demodulate a different channel, such as the one between 182 Mhz and 188 Mhz, thereby "assigning" a new channel to video signal U.

FIG. 8 shows a table which summarizes the signals, transmission direction, and channels used for the communication described in this example.

G. Transmitting Signals from one Local Network to a Second Local Network (FIGS. 1b, 5b)

Figure 5B:
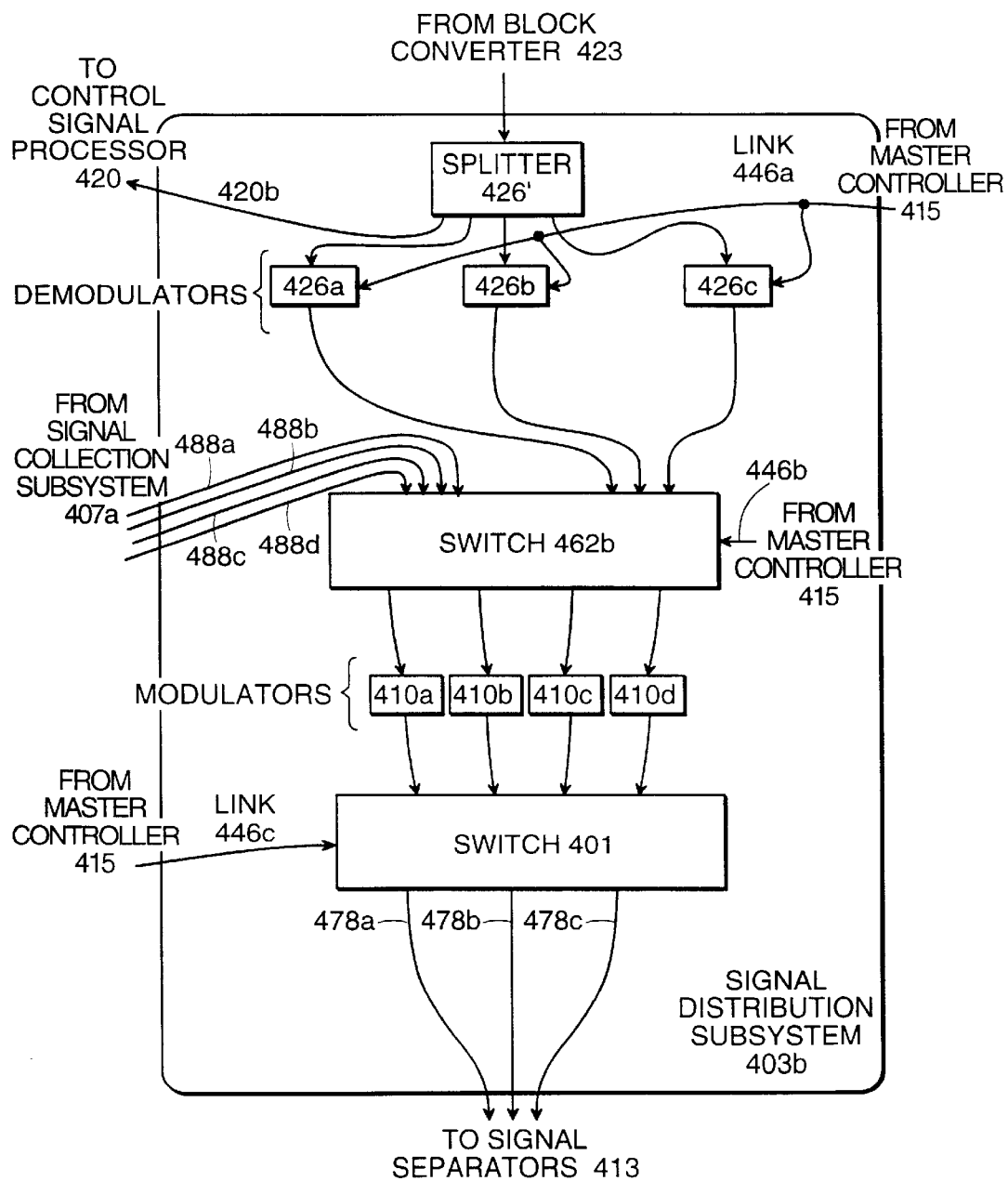
FIG. 5b shows an alternative embodiment of the component of FIG. 5a that allows transmission of signals from one local network to a different local network.

Signal distribution subsystem 403b, an alternative embodiment of signal distribution subsystem 403, is shown in FIG. 5b. There are only two differences between this embodiment and that of subsystem 403a. One is that switch 462b replaces switch 462a. The second difference is that signals from signal collection subsystem 407a (FIG. 6a) transmit at baseband along paths 488 to switch 462b, providing four extra inputs to that switch. Thus, switch 462b can (under the direction of master controller 415 via link 446b) provide signals recovered from local networks 411, in addition to signals provided from communication line 402, to modulators 410. This allows communication between the local networks 411.

Following is an example of communication conducted by a system that includes signal distribution subsystem 403b. Referring to FIG. 1b, a private telephone network connecting offices 512a–512e (collectively, offices 512) is established by PBX ("private branch exchange") 500 and extended pairs 405a–405e that connect between each office and PBX 500. PBX 500, which is located in wiring closet 501, also connects to local exchange 475 (i.e. the public telephone network) through cable 475', which provides two lines of service. Such a configuration represents a typical office telephone system.

Transceiver/switch 400 (FIG. 2) is also located inside wiring closet 501, interposing along the portions of extended pairs 405 that is within a few (e.g., 20) feet of PBX 500. The relatively short portions of extended pairs 405 connecting between transceiver/switch 400 and PBX 500 are called twisted pairs 476a–476c (collectively, 476). High capacity communication line 402 also connects to transceiver/switch 400.

Internal to each of offices 512 are several types of communication devices. (The communication devices connected to offices 512d and 512e are not shown because the system shown in FIG. 1b provides only telephone communication with those offices.) Two of these, telephone devices 514a–514c (collectively, telephone devices 514) and video transceivers 509a–509c (collectively, video transceivers 509), connect directly to the corresponding one of extended pairs 405. The wiring that connects these devices to the extended pairs 405a–405c is shown as local networks 511a–511c, respectively. Thus, in FIG. 1b, the telephone wiring that comprises each local network 511 is simply two short telephone cables connecting to the associated extended pair.

Each telephone device 514 connects to the associated local network 511 via a low-pass filter (LPF). As described in the first CIP application, these filters prevent telephone devices 514 from affecting RF energy on the local networks 511. (These filters may be provided as part of splitter 161, which is described in the first CIP application.)

Each video transceiver 509 connects to the corresponding one of extended pairs 405 to transmit and receive video signals. Video transceivers 509 also detect infrared signals, convert them to electrical signals, and feed them onto the extended pairs 405. Individually, each of these processes is described in the parent and first CIP applications. The first CIP application also describes how to combine RF transmitters and receivers into a single device that communicates through a single connection to active telephone wiring.

Video signals received by transceivers 509 are passed to video displays 508a–508c (collectively, video displays 508). Video sources 507a–507c (collectively, video sources 507) also connect to video transceivers 509. Video sources 507 are devices such as video cameras, VCRs, or digital devices, that create electronic signals containing the information necessary to display the type of video pictures addressed in this disclosure. These signals are passed to the connected one of video transceivers 509. The components in offices 512d and 512e are not shown.

Video sources 507a, 507b, and 507c each create a single video signal, called video signals Va, Vb, and Vc, respectively. These signals are fed to video transceivers 509a, 509b, and 509c. Using amplitude modulation, video transceivers 509 convert their input signals, expressing them between the frequencies of 1 Mhz and 6 Mhz, according to the spectral distribution shown in FIG. 3a. (As noted earlier, AM video signals may suffer from crosstalk interference, even at very low frequencies. Thus, the use of AM in this example is arbitrary, and the use of FM may be indicated if the crosstalk loss is small.) These signals are then transmitted onto the network 511 of twisted pair wiring internal to offices 512a, 512b, 512c, respectively.

Because local network interfaces 404 are not provided, the signals applied by video transceivers 509 to local networks 511 transmit directly onto extended pairs 405a–405c. If the wiring internal to the office is a single wire, this wiring can be simply be considered an extension of extended pairs 405a–405c.

The signals applied to extended pairs 405 transmit to signal separators 413 in transceiver/switch 400 (FIG. 2). Signal Va is routed by signal separator 413a to both filter 427a in control signal processor 420 (FIG. 7), and amplifier 408a in subsystem 407a of processor 418 (FIG. 6a). Signal Va is blocked by filter 427a, but is transmitted by amplifier 408a through switch 429 to demodulator 416a. That component demodulates signal Va, passing it along path 488a to signal distribution subsystem 403b. In a similar manner, signals Vb and Vc are applied at baseband to paths 488b and 488c.

Control signals are also transmitted from offices 512. These control signals are infrared (IR) signals issued by infrared transmitters not shown in the figures. Using techniques described in the parent and first CIP application, the IR signals are detected by video transceivers 509, converted to electrical signals, and transmitted onto local networks 511. These signals are applied to extended pairs 405 and transmit to signal separators 413 following the same routes, described above, followed by the video signals. Control signals from video transceiver 509c, for example, are routed by signal separator 413c to both filter 427c in control signal processor 420, and amplifier 408c in subsystem 403b. These signals are demodulated by demodulator 443c, digitized by digitizer 436, and transmitted to master controller 415.

As described above, video signals Va, Vb, and Vc, transmit along paths 488 to switch 462b in subsystem 403b. That component switches these signals, connecting Va to modulator 410a, Vb to modulator 410b, and Vc to modulator 410c. Using frequency modulation, modulators 410a–410c express their inputs signals between the frequencies of 7–22 Mhz. These signals are all applied to switch 401.

Switch 401 switches signal Vb (output by modulator 410b) onto paths 478a and 478c, and signal Vc onto path 478b. Thus, these signals transmit through signal separators 413 and across extended pairs 405 arriving at offices 512. Because of the connections made by switch 401, signal Vb (originating in office 511b) transmits to offices 512a and 512c, and signal Vc (which was sent from office 511c) transmits to office 512b. Internal to offices 512, video transceivers 509 receive these signals and provide them to video displays 508.

It is thus apparent that the system just described allows workers in offices 512a and 512c to hold a video conference with a worker in office 512b. Initially, the workers in office 512a and 512c watch the worker in 512b, while the worker in office 512b watches the worker in office 512c. By sending a control signal to master controller 415, as described above, the worker in office 512b can switch to display the signal from office 512a. This is done as follows. In response to a signal from office 512b, master controller 415 sends a signal to switch 401, instructing it to connect the output of modulator 410a to path 478b instead of connecting the output of modulator 410c to path 478b. Because modulator 410a provides signal Va on output, this effects the desired switching.

Now assume communication line 402 is a coaxial cable that carries three 6 Mhz video signals between the frequencies of 200–218 Mhz. A worker in office 512b can also select a video signal from communication line 402 from transmission to his or her office. This is done in the following manner.

Signals between 200–218 Mhz on communication line 402 transmit to interface 409a where they pass through circulator 421 to block converter 423. That component downshifts these signals to the frequencies between 54 and 72 Mhz, and passes them through splitter 426' in subsystem 403b to demodulators 426. Next, a control signal is sent from video transceiver 509b to master controller 415, as described above. In response to this signal, master controller 415 directs demodulator 426a to demodulate the signal between 60 Mhz and 66 Mhz, providing it at baseband to switch 462b. In response to another signal from master controller 415, switch 462b connects this signal to modulator 410d. Finally, master controller 415 commands switch 401 to connect the output of modulator 410d (rather than the output of modulator 410a) to path 478b. Because signals passed to path 478b transmit, as described above, to office 512b, the desired signal switching is achieved.

H. A Third Embodiment of Signal Distribution Subsystem 403 (FIG. 5c)

Figure 5C:
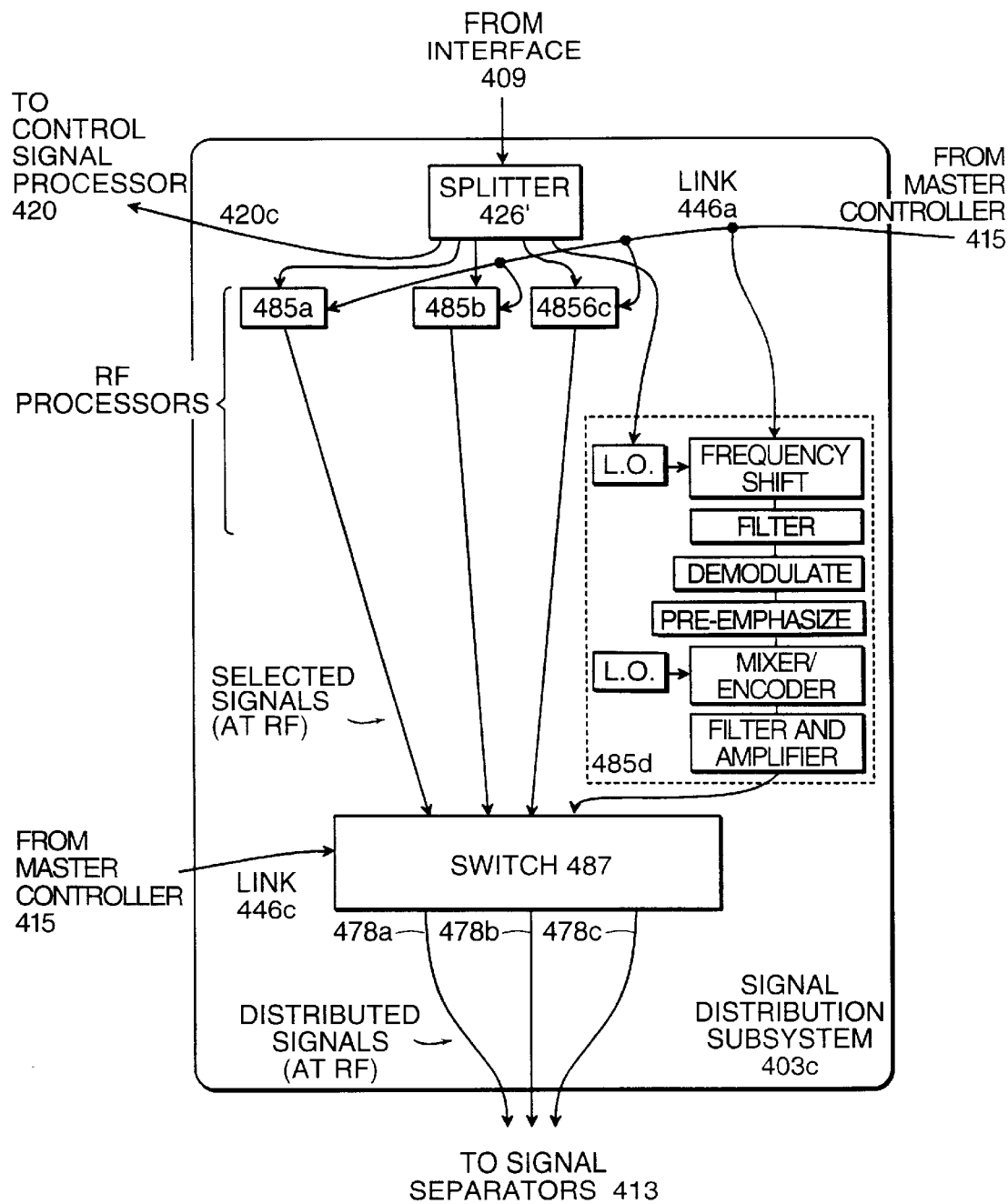

Signal distribution subsystem 403c, which represents a third embodiment of signal distribution subsystem 403, is shown in FIG. 5c. In this embodiment, the demodulation and modulation processes are combined, and only one switch is provided. This has several advantages, which are described below.

Signals transmitted from interface 409 are divided by splitter 426' along five paths. Four paths lead respectively to RF processors 485a–485d (collectively, RF processors 485). The fifth path, labelled path 420b, leads to signal processor 420. The processing of these signals by RF processors 485 is described in the following paragraphs. The processing by control signal processor 420 is described in an earlier section of this disclosure.

Each RF processor 485 selects a channel from among the multiple channels that comprise its input signal and converts the selected channel to the waveform, frequency, and amplitude at which it will transmit through a signal separator 413 and across an extended pair 405. As shown in FIG. 5c, in the first part of this process a selected frequency band is shifted to an intermediate band (using a frequency shifter and local oscillator) and the result is filtered and then demodulated. This creates a basebanded version of the selected signal. (Demodulation of an AM signal involved a process called "detection," while demodulation of an FM signal requires a process called "decoding.")

Selection of channels in RF processors 485 is achieved by tuning the frequency of the local oscillator (l.o.) This is done in response to signals from master controller 415, which are sent over link 446a.

After demodulation, a pre-emphasis process is optionally performed on the basebanded signal to compensate for spectral tilt. As described above and in the first CIP application, this process amplifies the higher frequencies to compensate for the greater attenuation of those frequencies during transmission. After pre-emphasis, the signal is modulated to its final waveform and frequency. (If AM waveforms are used, the modulation process involves mixing the signal with the frequency of a local oscillator. If FM waveforms are used, the modulation process involves "encoding" voltage variations of the signal as frequency deviations of a carrier provided by the local oscillator.) After modulation, the signal is amplified and applied to switch 487.

As described above, each RF processor 485 selects one signal from its input channels and provides that signal at an RF channel. Thus, RF processors 485 are similar to ordinary "cable converters" that receive a band of multiple video signals, select one channel, and output the signal within an different RF channel.

The signals exiting RF processors 485 are labelled "selected signals" in FIG. 5c. Each one will be transmitted to a single signal separator 413, and thus will be transmitted over exactly one extended pair 405. The assignment of the outputs of RF processors 485 to signal separators 413 is accomplished by switch 487 under the control (via link 446c) of master controller 415.

Switch 487 receives the selected signals from RF processors 485, and switches them over paths 478a–478c to signal separators 413a–413c. The design and operation of switch 487 is similar to that of switch 462a. As such, switch 487 responds to control signals sent from master controller 415. These signals are transmitted over link 446c. Master controller 415 may connect the output of several of RF processors 485 to the same one of paths 478. Master controller 415 must ensure, in that case, that these outputs do not overlap in frequency.

Subsystem 403c is efficient for systems in which it is unusual to have duplication within the group of signals selected to be sent to local networks 411. Provision of cable TV signals to a small apartment unit is a good example of such a situation. Assume, for example, that communication line 402 carries 60 cable TV signals to a 20 unit apartment house, and that an embodiment of the communication system disclosed herein was installed to provide a single signal to each of those units. This requirement could be satisfied if the embodiment included subsystem 403c and 20 RF processors 485. It should be clear, furthermore, that any embodiment with fewer than 20 demodulators (which are used for channel selection) and 20 modulators would not suffice. (Specifically, they would fail whenever the 20 units each requested a different one of the 60 signals.)

If one unit required provision of more than one signal at a time, the requirement could be satisfied by adding an extra RF processor 485. For example, assume that 20 RF processors 485 are provided, and their outputs are switched so that they transmit to different ones of the 20 units. Assume further that they each produce a single video signal between the frequencies of 1–6 Mhz. If one apartment unit required transmission of an additional signal, this could be satisfied by providing an extra one of RF processors 485, whose output was confined between the frequencies of 6–12 Mhz, and that this output would be combined with the other signal transmitting to the unit in question.

I. Alternative Signal Collection Subsystem 407b (FIG. 6b)

Figure 6B:
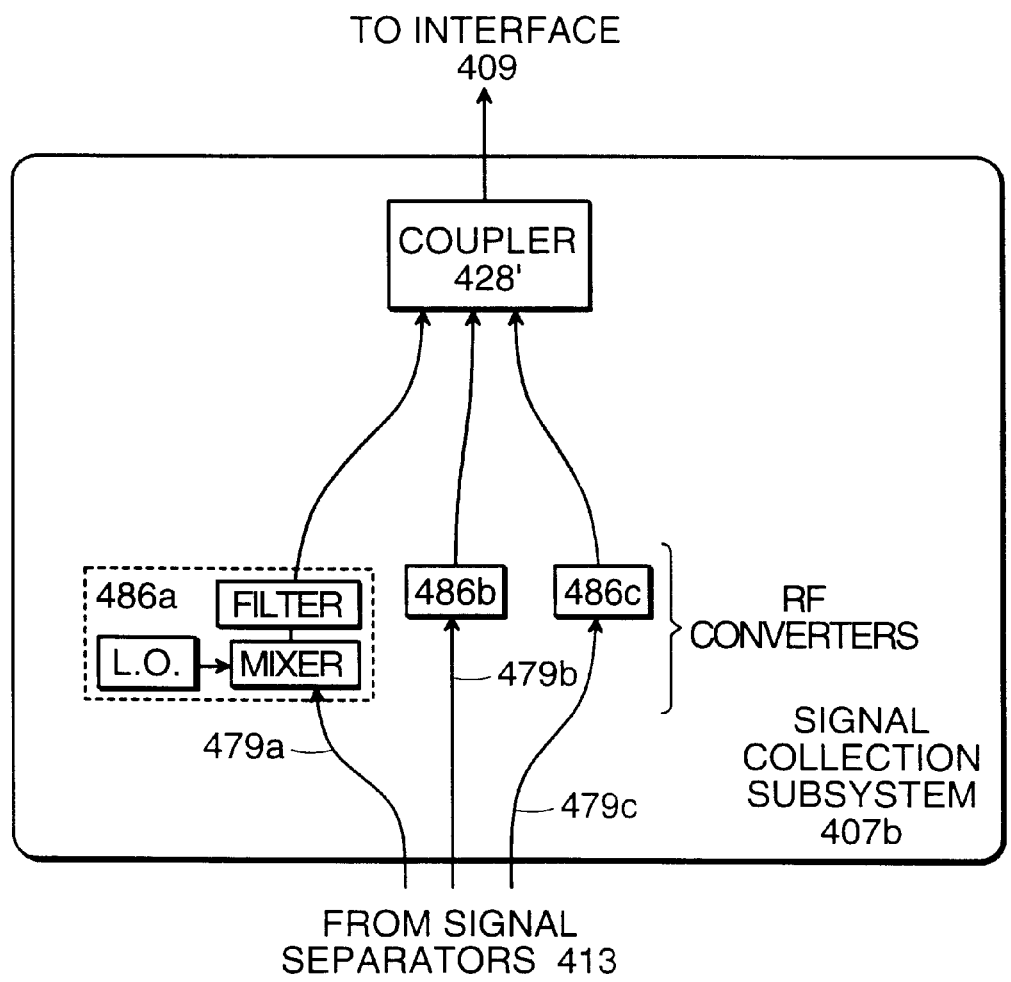

Signal collection subsystem 407b, which represents an alternative embodiment of signal distribution subsystem 407, is shown in FIG. 6b. This embodiment is simpler and less expensive than subsystem 407a, yet it allows each local network 411 to transmit a single signal over extended pairs 405 and to have that signal received by transceiver/switch 400 and applied to communication line 402.

Referring to FIG. 6b, signals from signal separators 413 transmit over paths 479 to RF converters 486a–486c (collectively, RF converters 486) within subsystem 407b. Because they prepare the individual signals collected from extended pairs 405 to be combined onto a single conductive path, RF converters 486 are very similar in function to modulators 428 of subsystem 407a. Each RF converter 486 is fixed to shift the energy of its input signal within a particular frequency band to a different band. As shown in FIG. 6b, this process includes mixing the input signal with a local oscillator, and filtering of the resulting output (e.g.,
to remove all but one sideband). This process creates a new signal, with identical information content, within the new frequency band.

The local oscillators used by each of RF converters 486 are such that the resulting output frequency bands of the three converters 486a–486c do not overlap. This allows the outputs to be combined onto a single conductive path. In a preferred embodiment, the frequency bands confining the outputs of RF converters 486 are adjacent in addition to non-overlapping. This minimizes the width of the band occupied by the combined signals.

The signals produced by RF converters 486 are all transmitted to coupler 428'. That component combines the individual signals onto a single conductive path, and passes it to interface 409, which applies the combined signal onto communication line 402, as described above.

1) Example # 2

Following is an example of communication between transceiver/switch 400 and local networks 411 using an embodiment of the communication system that includes signal distribution subsystem 403c, signal collection subsystem 407b, and interface 409a.

Communication line 402 provides NTSC cable signals at frequencies between 54 Mhz and 850 Mhz. One of the tasks of the communication system in this example is to make the signals between the frequencies of 300 Mhz and 480 Mhz available to local networks 411. Another task is to receive signals from local networks 411 and to add them to this cable between the frequencies of 850 Mhz and 900 Mhz.

The signal from communication line 402 transmits to circulator 421 (FIG. 4a) which feeds it to block converter 423 in interface 409. That device downshifts the band between 300 to 480 Mhz to the band between 54 to 234 Mhz (using an L.O. frequency of 246 Mhz). The result is fed to splitter 426' in subsystem 403c (FIG. 5c). That component splits the energy of the signal five ways, transmitting the signal to RF processors 485 and also along path 420b to control signal processor 420.

Using the system, described above, for communication with master control 415, users at local network 411a select a first channel between 60 and 66 Mhz, and a second channel between 176 and 182 Mhz. In response, master controller 415 instructs converter 485a, via link 446a, to convert the first channel to an AM signal confined between 1–6 Mhz, and it also instructs converter 485b to convert the second channel to an AM signal between 6–12 Mhz. These signals are passed to switch 487. Similarly, users at local network 411b select a third channel between 66 Mhz and 72 Mhz (VHF channel 3) which is converted by RF processor 485c and is provided as an AM signal between the frequencies of 1–6 Mhz. Finally, users at local network 411c select a fourth channel between 182–188 Mhz which is converted by RF processor 485d to the frequencies between 1–6 Mhz. (A standard 6 Mhz NTSC channel can fit between the frequencies 1–6 Mhz by filtering out the part of the vestigial sideband between 0–1 Mhz. This is described more fully in the second CIP application.)

Each of the signals output by RF processors 485 transmits to switch 487. In response to signals sent by master controller 415 on link 446c, switch 487 combines the outputs of RF processors 485a and 485b and connects them to path 478a, thus transmitting these outputs to signal separator 413a. Similarly, the output of RF processor 485c is transmitted over path 478b to signal separator 413b, and the output of RF processor 485d is transmitted over path 478c to signal separator 413c. Using techniques described below, signal separators 413 route these signals to the corresponding ones of extended pairs 405. The four video signals thus transmit local networks 411.

Because the highest frequency transmitted from transceiver/switch 400 to local networks 411 is 12 Mhz, in this case, the signals will suffer a relatively small amount of attenuation as they transmit across extended pairs 405. Thus, there is a relatively high probability that these signals will arrive at local networks 411 with energy levels sufficient to be efficiently and clearly transmitted to video receivers 419. It is assumed that such is the case in this example. Thus, video receiver 419a receives one video signal amplitude modulated between 1–6 Mhz, and another amplitude modulated between 6–12 Mhz. It imparts an upwards frequency shift of 60 Mhz to these signals, converting them to the frequencies between 60–72 Mhz, i.e., VHF channels 3 and 4. This signal is provided to TV 492a. Similarly, video receivers 419b and 419c shift their inputs so that each provides a single signal at VHF channel 3 to both TV 492b and TV 492c, respectively.

Meanwhile, transmission of signals from local networks 411 to transceiver/switch 400 is also provided. Specifically, video transmitter 417b receives a signal from video camera 494b, converts it to a single 30 Mhz FM video signal between the frequencies of 12–42 Mhz, and transmits it onto local network 411b and across extended pair 405b to transceiver/switch 400. Although it suffers significantly greater attenuation than the lower frequency video signals transmitting in the opposite direction, its wide bandwidth compensates by allowing the receiver to tolerate a lower SNR. This signal transmits to signal separator 413b. That component directs the signal to RF converter 486b (FIG. 6b). Video transmitter 417c feeds a second video signal across extended pair 405c to converter 486c using a similar process.

Within subsystem 407b, RF converter 486b converts its input signal to a 6 Mhz AM signal between 24–30 Mhz, and converter 486c converts its input to a 6 Mhz AM signal between 30–36 Mhz. These signals are passed to coupler 428' which combines them onto one conductive path and transmits them to block converter 447 in interface 409 (FIG. 4a). Block converter 447 them shifts these signals upwards to the frequency band spanning 850–862 Mhz. Block converter 447 then amplifies the shifted signal, and passes it through circulator 421b and onto communication line 402. Once on that medium, these two signals transmit in the opposite direction of the 30 NTSC signals that transmit between 300–480 Mhz.

J. Transmission and Recovery of Signals from a Single Twisted Pair in a Bundle (FIGS. 9a–9b)

A primary purpose of signal separators 413 is to receive signals from processor 418 and apply them to extended pairs 405 while simultaneously receiving signals from extended pairs 405 and transmitting them to processor 418 and to control signal processor 420. To perform this function, each signal separator 413 is connected between an extended pair 405 and the corresponding one of twisted pairs 476.

The remaining part of the description of signal separators 413 will be cast in terms of signal separator 413b and local network 411b. Two embodiments of signal separators 413 will be described. One embodiment, shown in FIG. 9a and described first, is appropriate when telephone signals transmit over extended pairs 405 in the ordinary manner, i.e., at voiceband frequencies. The other embodiment is appropriate when telephone signals transmit over extended pairs 405 at frequencies above voiceband, as depicted in FIG. 3b. This embodiment is shown in FIG. 9b.

Figure 9A:
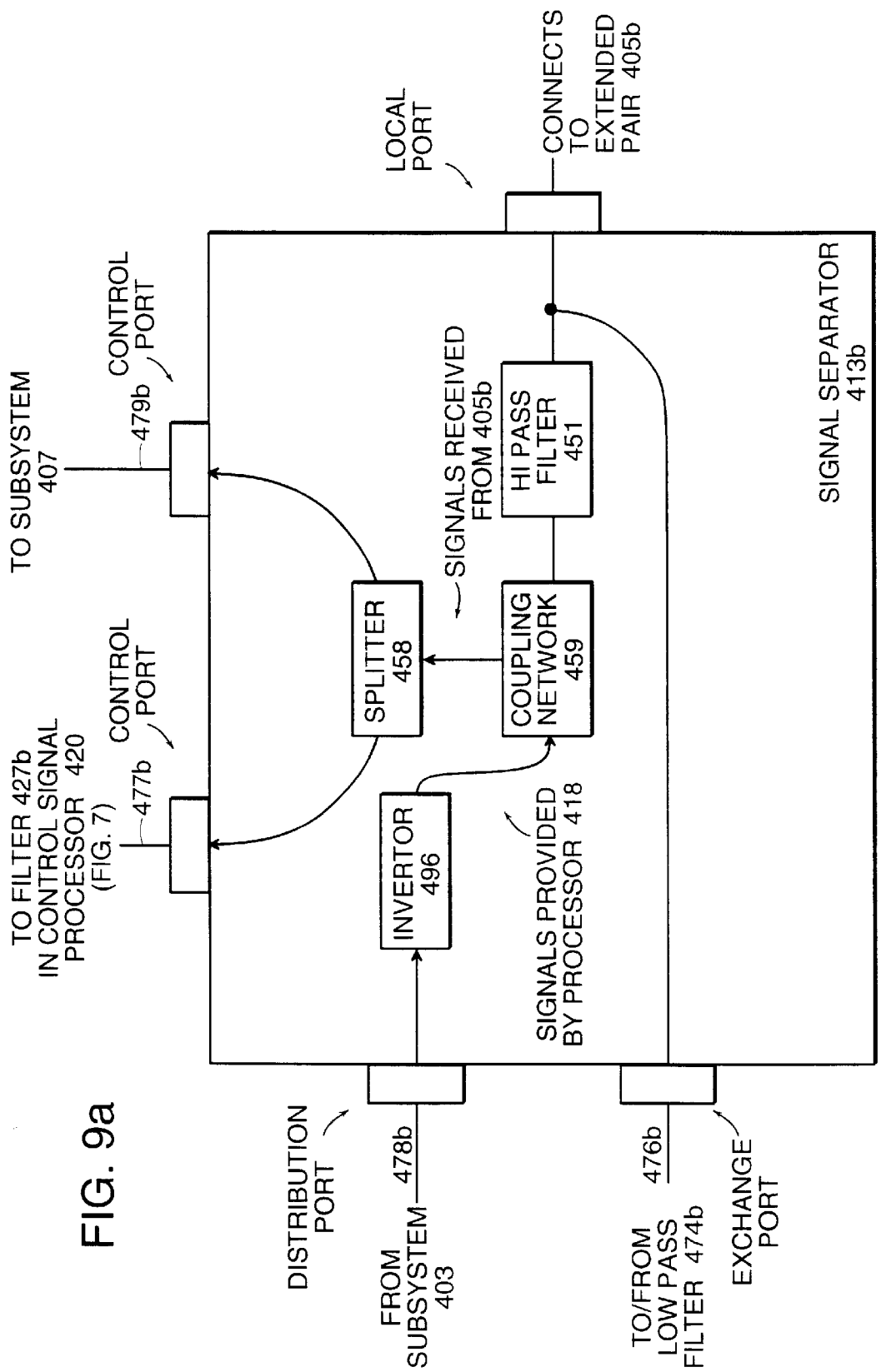
FIGS. 9a and 9b are block diagrams of embodiments of a signal separator in the transceiver/switch of FIG. 2, showing the electronics that route signals onto multiple extended pairs, route signals received from each extended pair, and process the telephone signals on the extended pairs.
Figure 9B:
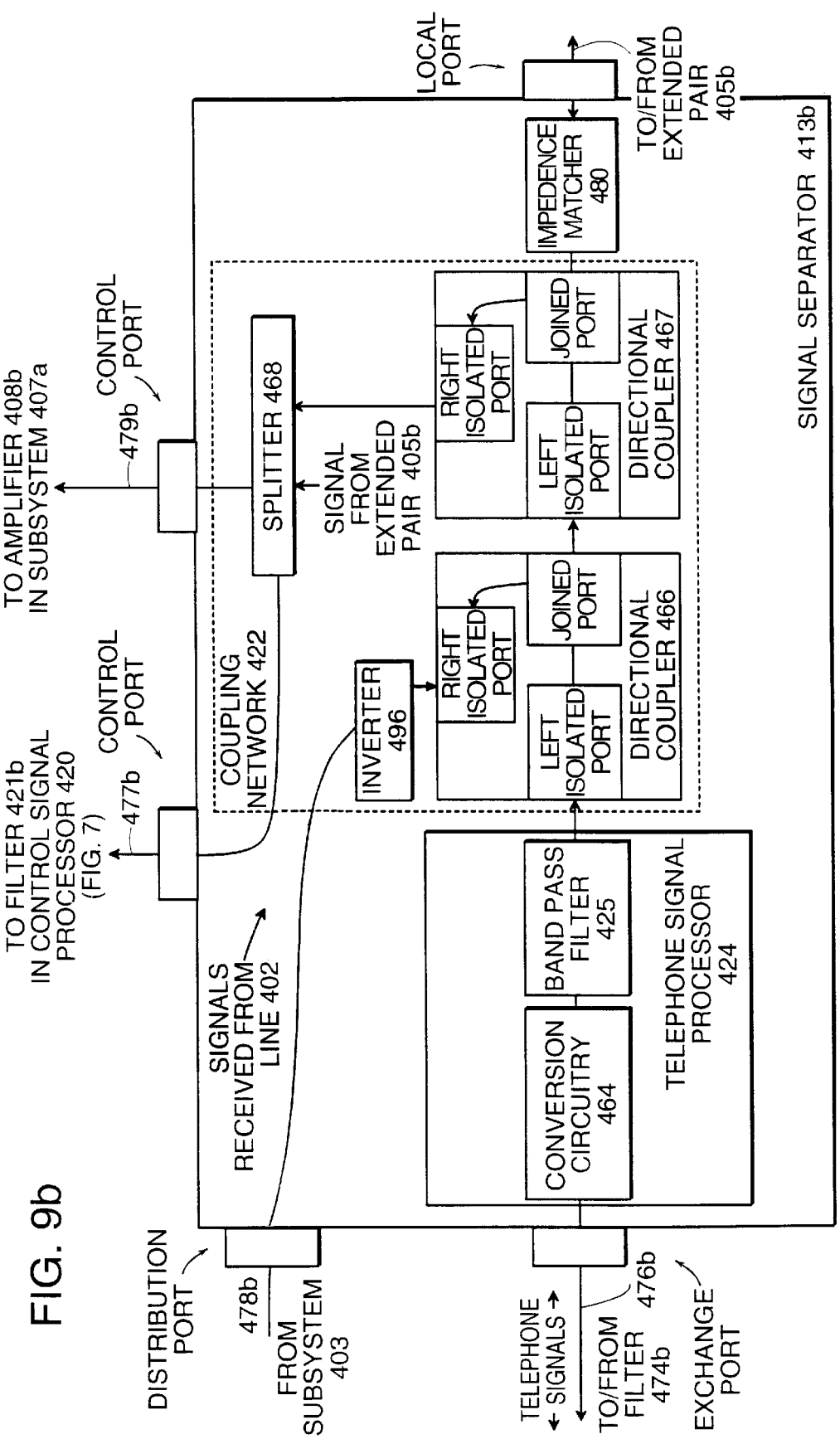

Referring to FIG. 9a, signals that are applied to signal separator 413b are converted and routed in the following manner:

1) Telephone signals from local exchange 475 transmit across extended pair 476b and through filter 474b, entering the "exchange" port of separator 413b. These signals are applied directly to the "local" port and exit the "local" port unchanged.

2) Telephone signals from local network 411b transmit across extended pair 405b, presenting at the "local" port. These signals exit the "network" port, also unchanged.

3) Signals recovered from communication line 402 that are processed by processor 418 and output by switch 401 (FIG. 5a) transmit across path 478b to the "distribution" port of signal separator 413b. These signals exit the "local" port.

4) Infrared control signals detected by video receiver 419b and fed onto local network 411b and transmitted (after reception, processing and retransmission by local network interface 404b, if 404b is provided) across extended pair 405b are applied to the "local" port. These signals are targeted for master controller 415, and are routed through the "control" port and along path 477b to filter 427b in control signal processor 420 (FIG. 7). These signals also transmit through the "collection" port and along path 479b, but are ignored by signal selection subsystem 403.

5) Video signals fed by video transmitter 417b onto local network 411b transmit (after reception, processing and retransmission by local network interface 404b, if 404b is provided) across extended pair 405b to the "local" port. These signals are routed through the "collection" port and transmit across path 479b to amplifier 408b. (Similarly, digital signals fed by transceiver 491c onto local network 411c transmit across extended pair 405c and are routed to amplifier 408c.) These signals also transmit through the "control" port and along path 477b to filter 427b in control signal processor 420. Those signals are blocked from further transmission, however, by filter 427b.

In the embodiment shown in FIG. 9a, signals transmitting through separator 413b are not processed, i.e. they are not amplified, or converted in frequency or waveform.

The major components of signal separator 413b are high pass filter 451, coupling network 459, splitter 458, and invertor 496. These components provide the signal routing and processing described above. It will be appreciated that other embodiments of signal separator 413b that achieve the signal routing and signal conversion described above are also possible.

Transmission of telephone signals through signal separator 413b is straightforward. A simple conductive path connects between the "local" port and the "exchange" port, thereby connecting low pass filter 474b on twisted pair 476b with extended pair 405b. Because low pass filter 474b passes all voiceband energy, this connection completes an simple unbroken conductive path between local exchange 475 and local network interface 404b. High pass filter 451 prevents any telephone signals from diverting towards coupling network 459.

Low pass filters 474 block transmission of the high frequency signals transmitting through signal separators 413 between processor 418 and local network interfaces 411. In addition to preventing the "splitting loss" of these high frequency signals, filters 474 prevent them from creating violations of governmental regulations by conducting onto the public telephone network. Part 68 of the FCC regulations in the U.S., for example, severely limits the energy that can be conducted onto the public network by signals above voiceband and below 6 Mhz.

Video and other non-telephone signals transmitting over extended pair 405b from local network 411b transmit through the "local" port. These signals pass through high pass filter 451 to coupling network 459. They are blocked from transmitting towards local exchange 475 by low pass filter 474b (FIG. 2).

At coupling network 459, directional coupling directs signals received from extended pair 405b to splitter 458, isolating these signals from transmitting through invertor 496 (which is described below) to path 478b leading to subsystem 403. Reverse isolation in invertor 496 can also block these signals from path 478b. If this isolation is not provided, these signals may transmit through switch 401 to the output of modulators 410, where they will be blocked by the reverse isolation of those components. (If subsystem 403 follows the embodiment shown in FIG. 5c, reverse isolation will be provided by RF processors 485.)

The energy of the non-telephone signals is divided by splitter 458, so the signals transmit across path 477b to control signal processor 420 and across path 479b to signal collection subsystem 407. An amplifier, (not shown) can be provided internal to splitter 458 to compensate for the 3 dB of energy lost during splitting.

Control signals targeted for master controller 415 that transmit across path 477b continue through filter 427b (FIG. 7) in control signal processor 420 to demodulator 443b. (All signals at the frequencies covered by the passband of filter 427b are considered to be intended for communication with master controller 415.) Processing of these signals internal to processor 420 is described below. Other signals, such as video signals, transmitting along path 477b will be blocked by filter 427b.

Signals transmitting across paths 479b to subsystem 407a (FIG. 6a) transmit to amplifier 408b. These signals are amplified and transmitted through switch 429 to one or more demodulators 416. Video signals and signals other than the control signals intended for communication with master controller 415 are then subject to selection by demodulators 416, as described above. Signals not selected terminate at that point. If subsystem 407b is provided in place of subsystem 407a, the same type of signal selection takes place at RF converter 486b.

Signals received by processor 418 from communication line 402 that are processed by processor 418 and output by switch 401 (FIG. 5a) transmit across path 478b to the "distribution" port of signal separator 413b. These signals transmit through invertor 496 to coupling network 459. Directional coupling internal to coupling network 459 directs these signals to high pass filter 451, while isolating them from transmitting to splitter 458. The signals from processor 418 emerge from filter 451 and transmit onto extended pair 405b.

Invertor 496 is supplied to reduce the possibility, described above, of increased crosstalk interference when the same video signal transmits within the same frequency band to multiple local networks 411. This possibility is reduced as follows. Invertor 496, which is an ordinary and inexpensive electronic component, implements a 180 degree phase shift across all frequencies. This phase shift is accomplished by simply converting negative voltages to positive, and vice versa. Thus, the polarity of the output of invertor 496 is the opposite of that of its input, and by placing an invertor 496 as shown in FIG. 9a in approximately half of signal separators 413, the likelihood that the electric fields created by each of the pairs in the group of extended pairs 405 will cancel each other is increased. A component that implements a slight delay in transmission can produce a similar affect if the delay times are slightly different for each of signal separators 413. Both methods tend to prevent the interference from adding coherently.

In addition to providing directional multiplexing, coupling network 459 also balances the signals transmitting towards filter 451, and matches the impedance of the conductive path internal to signal separator 413 with the impedance of extended pair 405b. This tends to reduce the radiation of these signals and improve the efficiency of the transfer of energy between pairs 405 and signal separators 413.

Balancing and impedance matching circuitry are shown in FIGS. 6 and 7 of the parent application, for a coupling network that served as a junction of three paths. Those skilled in the art can convert the wound-torroid described therein to achieve the balancing and impedance matching results for this case.

If directional multiplexing in coupling network 459 is not sufficient to prevent transmission of signals from subsystem 403 from transmitting to splitter 458, filtering internal to splitter 458 can prevent these signals from exiting the splitter onto paths 477b or 479b. This type of filtering is possible because, as described above, the frequencies used by signals transmitting towards local networks 411 are different from the frequencies used by signals transmitting towards transceiver/switch 400.

1) Example #3

Referring also to FIG. 8, the routing of each of the signals used in the previous example is now described. Signals communicating with local network 411a are routed by signal separator 413a, those communicating with local network 411b are routed by signal separator 413b, and those communicating with local network 411c are routed by signal separator 413c.

Video signal U and video signal V exit switch 401 on conductive path 478a. Video signal U is confined within the 1–6 Mhz band, as shown in FIG. 3a, and video signal V is confined between 7–22 Mhz. These signals transmit along path 478a to signal separator 413a, transmitting through invertor 496 to coupling network 459. They continue on through high pass filter 451 and onto extended pair 405a.

Simultaneously, video signal V exits switch 401 along path 478b at frequencies between 1–6 Mhz. Signal V transmits to signal separator 413b, transmitting through invertor 496 to coupling network 459. It continues on through high pass filter 451 and onto extended pair 405b. Video signal V follows a similar path at similar frequencies, exiting switch 401 along path 478c to signal separator 413c, and transmitting onto extended pair 405c.

Meanwhile, digital signal Y exits switch 401 confined between the frequencies of 6–18 Mhz. It follows a path to extended pair 405c using the same route as video signal V.

Video signals W and X, digital signal Z, and control signals A, B, and C all transmit in the reverse direction. Video signal W and control signal B are both transmitted onto local network 411b. These signals are intercepted by local interface processor 404b and retransmitted across extended pair 405b to signal separator 413b. Inside that signal separator 413*b*, video signal W and control signal B pass through high pass filter 451 to coupling network 459. These signals are directed by that network towards splitter 458. That component splits the signal energy, transmitting half along path 477*b* to filter 427*b* in processor 420 and half along 479*b* to splitter 408*b* in processor 418. Filter 427*b* allows only control signal B to pass through to be processed by control signal processor 420. (Ultimately, control signal B will communicate with master controller 415.) Video signal W and control signal B both pass along path 479*b* to amplifier 408*b* in collection subsystem 407*a*, and exit to switch 429. Only video signal W, however, is transmitted by switch 429 to demodulators 416.

Video signal X, control signal C, and digital signal Z, meanwhile, are applied to local network 411*c* and transmit across extended pair 405*c* to signal separator 413*c*. The filtering and directional multiplexing internal to that component directs them through splitter 458 and across path 479*c* to amplifier 408*c*. The signals input to splitter 408*c* also transmit across path 477*c* to filter 427*c* in signal processor 420.

Finally, control signal A transmits across extended pair 405*a* to signal separator 413*a* which directs it to filter 427*a* in control processor 420 and to amplifier 408*a* in subsystem 407*a*.

2) Transmitting Telephone Signals Above Voiceband (FIG. 9*b*)

The embodiment of signal separator 413*b* shown in FIG. 9*b* is now described. This embodiment is used when signals received from communication line 402 are transmitted by transceiver/switch 400 across extended pair 405*b* using, in addition to higher frequencies, frequencies at voiceband. (The spectral distribution of these signals is shown in FIG. 3*b*.) As described above, signal separator 413*b* and local network interface 404*b* cooperate, in this embodiment, to transmit telephone signals at frequencies above voiceband.

Referring to FIG. 9*b*, the major components of signal separator 413*b* are coupling network 422, telephone signal processor 424, and impedance matcher 480. Processor 424 works in conjunction with local interface 404*b* to communicate telephone signals across extended pair 405*b* at RF frequencies.

Telephone signals from local exchange 475 transmit at voiceband through low pass filter 474*b* (FIG. 2) and through the "exchange" port of separator 413*b* to conversion circuitry 464, which is part of processor 424. Circuitry 464 converts all of these signals to RF frequencies. The converted signals include voice, ringing, and hookswitch signals. The converted telephone signals are transmitted through bandpass filter 425 to coupling network 422.

Filter 425 passes energy within the bands occupied by the telephone signals in their RF form, but blocks all other signals, including voiceband signals. This prevents conversion circuitry 464 from loading down non-telephone signals that transmit to processor 424.

The telephone signals transmitted from local exchange 475 always exit the "local" port of signal separator 413*b* because filters located on the paths exiting network 422 block these signals from exiting through the "collection," "distribution," and "control" ports. (This filtering is described below.) These signals transmit onto extended pair 405*b*. They are received and converted back to their original form by local network interface 404*b* as will be described below. The reconverted signals are then transmitted onto local network 411*b* as normal voiceband signals.

Telephone signals transmitting in the reverse direction, from telephone device 414*b* to local exchange 475, are converted in the following manner. Local network interface 404*b* intercepts the signals from telephone device 414*b*, which are at voiceband, converts them to RF signals, and transmits them across extended pair 405*b*. Processing of telephone signals by local network interfaces 404 is described in greater detail below.

Telephone signals in the RF band from extended pair 405*b* transmit through the "local" port of signal separator 413*b* to coupling network 422. These signals then transmit to telephone signal processor 424 but are blocked from exiting network 422 towards the "collection," "distribution," and "control" ports by filters connected to the paths leading to those ports. (Coupling network 422 is described in greater detail below.) These telephone signals pass through filter 425 to conversion circuitry 464 which converts them back to voiceband, and transmits them to filter 474*b* and across twisted pair 476*b* to local exchange 475.

Means to convert telephone signals from voiceband to RF signals and back to voiceband are well known and can be used to implement the functions of conversion circuitry 464 and the companion conversion component in local network interfaces 404. Indeed, common cellular or cordless telephones convert voiceband, switchhook, and ringing signals to RF frequencies to transmit the signals over a wireless link to a telephonic communication line.

Routing of non-telephone signals through signal separator 413*b* (as shown in FIG. 9*b*) is now described. Coupling network 422 includes directional couplers 466 and 467 and splitter 468. Couplers 467 and 466 each have a joined port and left and right isolated ports. Signals presenting at a joined port pass to through to each of the isolated ports. (The signal energy is evenly split.) Signals presenting at an isolated port exit through the joined port, but are blocked, (e.g. have a 30 dB loss) from exiting the other isolated port.

Signals from extended pair 405*b* pass through the "local" port and present at impedance matcher 480. These signals include both telephone signals, control signals, and signals destined for transmission to communication line 402. Impedance matcher 480 matches the impedance of the telephone line to the circuitry internal to transceiver/switch 400.

After passing through impedance matcher 480 these signals transmit to directional coupler 467, exiting through both of the isolated ports and transmitting to the joined port of coupler 466 and splitter 468. Signals presenting at the joined port of coupler 466 exit both of the isolated ports. As can be seen by tracing the paths, signals exiting the isolated port leading towards switch 401 in subsystem 403 (i.e., the right isolated port of coupler 466) pass through to modulator 410*b* where they are blocked (i.e. meet a high impedance) by the reverse isolation at the output of that device. A filter can be provided at the output of modulator 410*b* to prevent loading down of these signals.

From among the signals that pass out the left isolated port of coupler 466 leading towards processor 424, only telephone signals are received by processor 424. These are processed as described above. Non-telephone signals are blocked by filter 425 in that processor.

Signals from extended pair 405*b* that present at the joined port of coupler 467 and exit the left isolated port towards splitter 468 are split and routed to filter 427*b* in control signal processor 420 and amplifier 408*b* in subsystem 407 of processor 418. As will be described later on, filter 427*b* blocks signals other than those at frequencies used by the control signals that communicate with master controller 415. Thus, processor 420 separates the special control signals from the group of "collected" signals.

As described above, signals presenting at amplifier 408b are amplified and transmitted through switch 429 to demodulators 416. Video signals and signals other than telephone signals and control signals intended for communication with master controller 415 are then subject to selection by demodulators 416, as described above. Signals not selected terminate at that point. (Thus, control signals and telephone signals will terminate.) If subsystem 407b is provided in place of subsystem 407a, the same type of signal selection takes place at RF converters 486.

As described above, the signals received by processor 418 from communication line 402 that are intended for transmission to local network 411b are output from switch 401 (in subsystem 403a, FIG. 5a). These signals exit along path 478b, pass through the distribution port of signal separator 413b and through invertor 496 to the right isolated port on directional coupler 466 in coupling network 422. (This path can be traced in FIGS. 2 and 9b.)

Signals passing through the right isolated port of directional coupler 466 exit through the joined port of coupler 466. (They are substantially blocked from exiting the left isolated port by the directional multiplexing of coupler 466; filter 425 blocks the portion of the energy that exits from the left isolated port.) They then pass through the left isolated port of coupler 467, to the joined port of coupler 467. (They are blocked from exiting the other isolated port of coupler 467 by the directional multiplexing and, ultimately, by the reverse isolation of modulators 410.) Finally, they pass though the joined port of coupler 467, through impedance matcher 480b onto extended pair 405b. The impedance matching enables these signals to feed onto extended pair 405b, which has a different impedance, without substantial signal refections.

K. Signal Processing at the Local Network Interface (FIGS. 10–13)

The signals fed to one of extended pairs 405 by transceiver/switch 400 are received at the opposite end by the corresponding one of local network interfaces 404 which processes these signals and retransmits them onto the corresponding one of local networks 411. If two-way communication between transceiver/switch 400 and local networks 411 is performed, each local network interface 404 also receives signals transmitted onto local networks 411 and transmits them onto the corresponding one of extended pairs 405.

The primary function of local network interfaces 404 is to process the signals intercepted from extended pairs 405 so that when they are retransmitted their ability to communicate to the RF receivers connected to local networks 411 will be enhanced. Processing of signals transmitting towards transceiver/switch 400 provides similar benefits.

A particularly important process performed by local network interfaces 404 is amplification. This allows signals transmitting along the transmission path between transceiver/switch 400 and the RF receivers on local networks 411 to be amplified at an intermediate point, boosting their energy levels up to the maximum limit (i.e., the limit at which they radiate RF energy just below governmental limits.) This re-amplification will improve the SNR at the receive end, increasing the attenuation that the signal can encounter along the transmission path while still being successfully received. Processing that converts signal waveform and frequency can also be useful, as described below.

In some embodiments, particularly those where a video signal is transmitted over one of extended pairs 405 at baseband frequencies (FIG. 3B), telephone signals transmit from transceiver/switch 400 to local network interfaces 404 at RF frequencies, having been converted from voiceband by a telephone signal processor 424 in one of signal separators 413. When telephone signals transmit at RF frequencies, local network interfaces 404 convert the signals received from extended pairs 405 to ordinary voiceband telephone signals, and feed them onto the corresponding local networks 411 for reception by telephone devices 414 in the ordinary manner. Conversion also takes place in the opposite direction. I.e., voiceband telephone signals from devices 414 that transmit across local networks 411 are received by the corresponding local network interfaces 404, frequency converted, and applied to the corresponding one of extended pairs 405 at RF frequencies.

Figure 10:
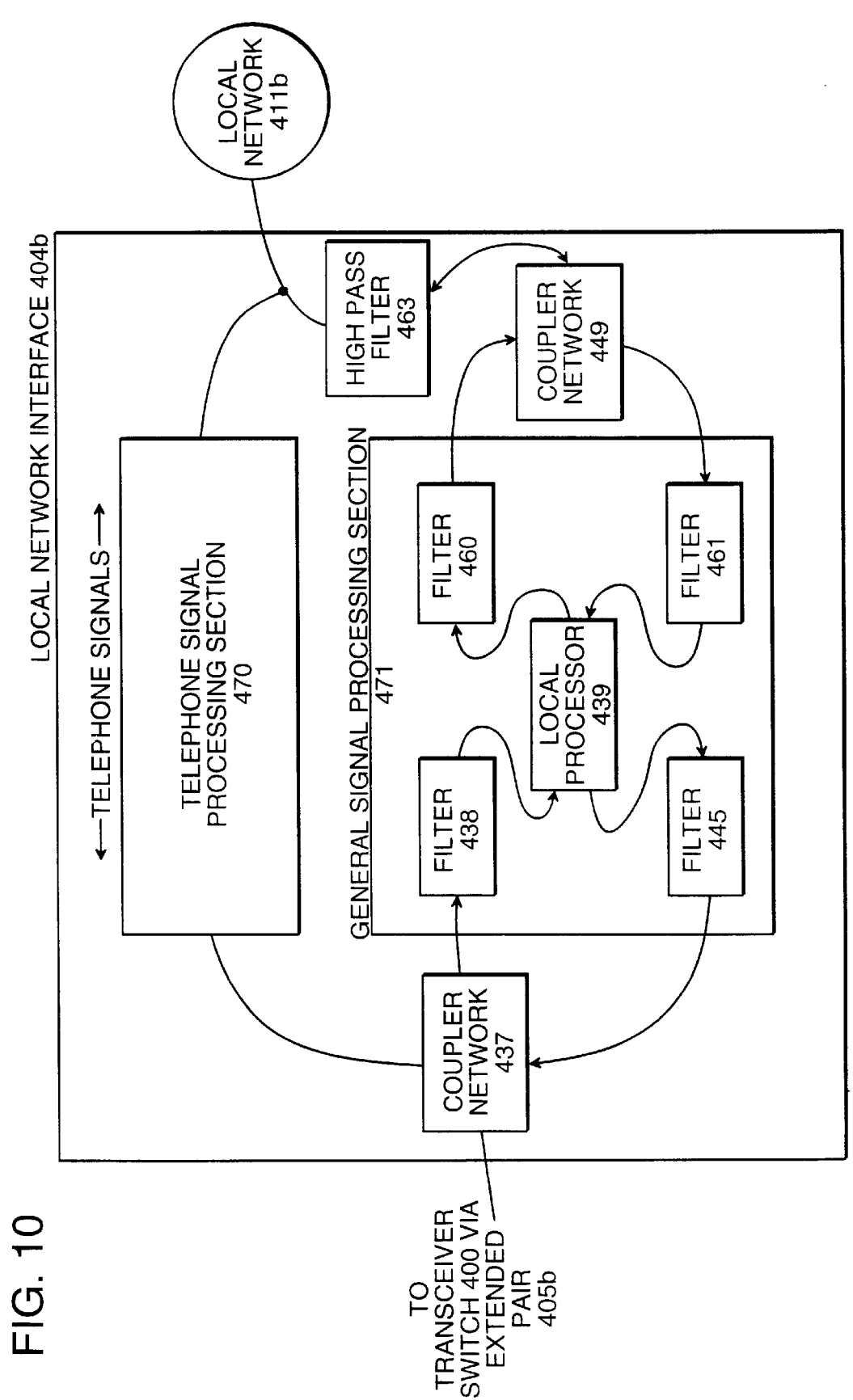

A general embodiment of a local network interface 404 is shown in FIG. 10. The description that follows will be cast in terms of local network interface 404b, but applies, of course, to any one of local network interfaces 404 shown in FIG. 1a.

Referring to FIG. 10, the principle components of local network interface 404b are the telephone signal processing section 470, general signal processing section 471, coupling networks 437 and 449, and high pass filter 463. All signals from extended pair 405b transmit to coupling network 437, and high-frequency (i.e., non-voiceband) signals from local network 411b transmit through high pass filter 463 to coupling network 449. Directional multiplexing and filtering in coupling networks 437 and 449, and filtering on paths connected to these coupling networks, cause the converging signals to be routed as follows. Telephone signals from extended pair 405b are blocked by filters 438, 445 in general signal processing section 471 and thus are routed through telephone signal processing section 470 and onto local network 411b (and are blocked from coupling network 449 by high pass filter 463). Telephone signals also transmit across the same path in the opposite direction. Non-telephone signals from extended pair 405b are routed to general processing section 471, and non-telephone signals from section 471 pass through coupling network 437 to extended pair 405b. Also, non-telephone signals from local network 411b transmit to general processing section 471, and non-telephone signals from general processing section 471 transmit onto network 411b.

The transmission of telephone signals through local interface 404b and the details of telephone signal processing section 470 are described first. That description also includes a description of two particular embodiments of coupling network 437. Several embodiments of general processing section 471 and coupling network 449 are described after that.

1) Transmission of Telephone Signals across Local Interface 404b (FIGS. 13a, 13b)

When non-telephone signals transmitting on extended pair 405b do not have energy at voiceband frequencies, (e.g. the video signals represented in FIG. 3a or 3c) signal separators 413 according to FIG. 9a are used, and the telephone signals communicating between local exchange 475 and telephone devices 414b are confined to the voiceband. FIG. 13a shows coupling network 437a which is an embodiment of network 437 used when telephone processor 424 is not included in signal separator 413b. In this case, the telephone signals are at voiceband.

Referring to FIG. 13a, voiceband telephone signals from extended pair 405b that transmit to interface 404b are blocked by high pass filter 472 in coupling network 437a, passing instead through low pass filter 442, which is designed to pass only energy at voiceband frequencies, in telephone signal processing section 470a. These signals continue on to local network 411b. (They are blocked from the alternative path by high pass filter 463.) Transmission of telephone signals in the opposite direction traces the reverse path. Thus, an unbroken path for voiceband signals from telephone device 414b (FIG. 1a) to local exchange 475 is provided.

FIG. 13b shows coupling network 437b and telephone signal processing section 470b, which are specific embodiments of network 437 and section 470. Section 470b processes telephone signals that transmit over extended pair 405b at frequencies above voiceband (e.g., at RF).

All signals from extended pair 405b are applied directly to coupler 437b. Coupler 437b matches the impedance of each of the five paths that converge at its ports. Coupler 437b also balances the signals transmitting from interface 404b onto extended pair 405b. Finally, coupler 437b allows all converging signals to flow through freely to the other ports, meaning that routing of signals through that coupler is determined by the surrounding filters. (An example of such a coupler is shown in the first CIP application.)

Telephone signals transmitting over extended pair 405b at frequencies above voiceband that transmit to coupler 437b are routed to band pass filter 454 and are blocked on all other exiting paths by filters that pass different frequency bands. The signals passed by filter 454 continue on to telephone signal converter 452. Converter 452 converts these signals to voiceband and transmits them through low pass filter 455 to local network 411b where they communicate with telephone device 414b in the ordinary manner. High pass filter 463 blocks these signals from transmitting along the alternative path.

In the reverse direction, processor 452 receives telephone signals at voiceband from local network 411b via low pass filter 455. Processor 452 converts these signals to RF and passes them through filter 453 to coupler 437b. These signals transmit only onto extended pair 405b because they are blocked from the other paths (by filters 445, 438, and 454). This completes a two-way telephone communication link using RF between processor 452 and telephone signal processor 424 in signal separator 413b at transceiver/switch 400.

2) Transmission of Non-Telephone Signals from Extended Pair 405b to Local Network 411b

Referring again to FIG. 13a, non-telephone signals from extended pair 405b that transmit to coupling network 437a pass through high pass filter 472 to coupler 483. They are blocked from the alternative path by filter 442, which passes only voiceband signals.

Coupler 483 matches the impedance of each of the three paths that converge at its ports. Coupler 483 also balances the signals transmitting from interface 404b onto extended pair 405b.

In one embodiment of coupler 483, all signals converging at its ports flow freely through to the other ports. This means that the routing of signals through couplers 483 is determined by the filters on the connecting paths. In an alternative embodiment of coupler 483, isolation is provided between the two paths leading to local processor 439 (FIG. 10). This increases the separation provided at coupling network 483 by filters 445 and 438. Referring to FIG. 13b, coupler 437b matches the impedance of each of the paths that converge at its ports and balances the signals transmitting from interface 404b onto extended pair 405b. All signals converging at coupler 437b pass freely out the other ports, meaning that routing of signals through coupler 437b is determined by the filters connected to its ports.

Non-telephone signals received from pair 405b that transmit to coupler 483 (in FIG. 13a) or coupler 437b (in FIG. 13b) exit on the path leading to filter 438 (FIG. 10). Filter 438 passes only energy at frequencies used by non-telephone signals transmitted by transceiver/switch 400, allowing those signals to pass through to local processor 439. The same signals are blocked along the path leading from network 437 by filter 445, which passes only energy at frequencies used by non-telephone signals transmitting towards transceiver/switch 400. (In FIG. 13b, non-telephone signals received from extended pair 405b are also blocked from the two other paths by filters 453 and 454.) Thus, all non-telephone signals received from extended pair 405b are received by local processor 439.

After processing, local processor 439 transmits these signals to filter 460, and they ultimately transmit onto local network 411b, as will be described below. To avoid interference with telephone communication on local network 411b, signals transmitted by processor 439 to filter 460 are always provided at frequencies above the ordinary telephone voiceband.

One important function of processor 439 (and of local network interfaces 404) is to amplify non-telephone signals received from filter 438, relaying them onto local network 411b at a higher energy level, thereby increasing the SNR at the input to the RF receivers connected to local networks 411. Without this increase, the attenuation in transmitting from transceiver/switch 400 may prevent signals from reaching the receive end with sufficient SNR.

Another function of processor 439 is to convert signals from filter 438 to the waveform (i.e., the modulation method) and frequency at which they will transmit onto local network 411b. Changing the waveform and frequency can simplify the design of the RF receivers of these signals, e.g., video receivers 419 and transceiver 491c. This is especially true if video is transmitted over pair 405b in FM form, or if the video signals transmitted by interface 404b onto local network 411b must coordinate with video signals transmitting locally, e.g., from video transmitters 417b to video receiver 419b. (Choosing waveforms for various video signals transmitting across a local network and arranging their frequency bands to simplify receiver design is thoroughly discussed in the second CIP application.) Various embodiments of processor 439, some of which perform frequency and waveform conversion, all of which perform amplification, are given below.

Additional details of the routing of signals transmitting from processor 439 to local network 411b are now described. Filter 460 blocks energy at all frequencies except those used by signals fed to that filter from processor 439. The signals passed by filter 460 transmit to coupling network 449.

Coupling network 449 serves as a junction for signals converging from three paths. Signals flow freely through this junction, exiting each of the opposite two paths. Thus, filters 460, 461, and 463 determine the routing of the signals at coupling network 449.

Signals transmitting to coupling network 449 from filter 460 exit through the port leading to high pass filter 463. That filter blocks only voiceband signals, allowing the signals from processor 439 to pass through onto local network 411b. Filter 455 in telephone signal processor section 470b (FIG. 13b) blocks signals from processor 439 from transmitting along the alternative path. Filter 442 in telephone signal processor section 470a (FIG. 13a) performs a similar function. Because it is a low-pass filter, filter 442 also suppresses the energy of transients and harmonics of voiceband signals originating at telephone device 414b (or other telephone devices connected to local network 411b) from transmitting onto extended pair 405b. Because these may contain significant energy at higher frequencies, they can ordinarily cause interference with the RF signals communicating over that pair. The low pass filters that connect between devices 414 and the local networks 411 can also suppress these harmonics.

In addition to serving as a junction, coupling network 449 matches the impedance of the wiring of local network 411b to the circuitry internal to interface 404b. It also balances RF signals flowing from processor 439 onto local network 411b, and unbalances RF signals flowing in the opposite direction. These functions tend to minimize radiation and increase the efficiency of the transfer of RF energy between local network 411b and interface 404b.

Referring also to FIG. 8, the following example shows how signals from extended pair 405a are coupled by local network interface 404a onto local network 411a. Video signals U and V are fed onto extended pair 405a by signal separator 413a in transceiver/switch 400. Signal U is amplitude modulated in the 1–6 Mhz band, while signal V is frequency modulated in the 7 to 22 Mhz range. At local network interface 404a, these signals transmit to network 437, and exit towards filter 438. (They are blocked from the other paths by the surrounding filters.) Signals U and V pass through filter 438 and are received by processor 439.

Processor 439 demodulates video signal V, and remodulates it using AM between the frequencies 24–30 Mhz at a signal level of 40 dB mV. In parallel with this process, processor 439 demodulates video signal U and remodulates it using AM between the frequencies 12–18 Mhz and at a signal level of 40 dB mV. These signals are combined onto a single conductive path and fed through filter 460 to coupling network 449. They pass through that network, exiting through filter 463 and onto local network 411a. Video receiver 419a recovers these signals from the network, and block converts them upwards by 164 Mhz, providing them to television 492a at 176–182 Mhz (VHF channel 7) and 188–194 Mhz (VHF channel 9). (A design for a video receiver that performs such a conversion is given in the second CIP application.) One of the detailed embodiments of processor 439 shown below includes import processor 440b. That component is designed to conduct the processing required to perform the conversion of video signal U and video signal V used in this example.

3) Transmission of Non-Telephone Signals from Local Network 411b to Extended Pair 405b Video transmitter 417b connects to local network 411b to transmit signals at frequencies above voiceband. Examples of these signals are ordinary video signals from video cameras, digital signals from computers, and control signals from infrared transmitters. These signals are referred to as non-telephone signals because they are not meant to communicate to local exchange 475. Techniques that transmit these signals across networks such as local network 411b are described in the parent and first and second CIP applications.

Certain control signals transmitted by video receiver 419b are intended to communicate with master controller 415 in transceiver/switch 400. These signals indicate, among other things, which signals are to be recovered from communication line 402 and transmitted over extended pair 405b to local network 411b. Master controller 415 can make these determinations because it controls certain other components in transceiver/switch 400, as described above.

Because many potential users are familiar with issuing control signals using infrared transmitters, that is the preferred method of originating these control signals, e.g., issuing infrared signals from remote control transmitter 493b. Video receivers 419b detect these infrared patterns and convert them to voltage variations that are applied to local network 411b and received by local network interface 404b. That component relays the control signals across extended pair 405b to transceiver/switch 400 where it is received, as described above, by control signal processor 420.

Referring to FIG. 10, non-telephone signals fed to local network 411b for transmission to transceiver/switch 400, are blocked by a high impedance at telephone signal processing section 470. (In the embodiment of section 470b, this impedance is supplied by low pass filter 455. In the embodiment of section 470a, this impedance is supplied by low pass filter 442.) Because these signals are expressed in RF, however, they pass through high pass filter 463 to coupling network 449. These signals will exit that network towards filter 461, but will be blocked from the other exit by filter 460. (As described above, filter 460 only allows energy used by signals transmitting from processor 439 to pass.) Thus, signals from video transmitter 417b will pass through filter 461 to processor 439.

Among the signals received from filter 461, those intended for transmission to communication line 402 are converted by processor 439 to the waveform, frequency, and amplitude at which they will be fed to extended pair 405b. The relationship between these characteristics and the reliability of communication over extended pair 405b was described above. Processor 439 feeds the converted signals through filter 445. The signals are then forced by the filtering (i.e., blocked by filters 438 and 442) though coupling network 437 and onto the corresponding extended pair 405b.

In some embodiments, signals recovered by processor 439 from local network 411b are processed and retransmitted onto that network. Such a procedure, and its attendant advantages, is described in the second CIP application. That procedure is included as an option of the communication system described herein because local network interfaces 404 provide a natural place to implement such a retransmission process. A specific embodiment of processor 439 that retransmits signals back onto local network 411b is described below.

Referring also to FIG. 8, the following is an example of transmission of signals from local network 411b through processor 439 to extended pair 405b. Video transmitter 417b receives video signal W at baseband from video camera 494b, amplitude modulates it between 6–12 Mhz, and feeds it onto local network 411b where it transmits to filter 463 in local network interface 404b. Being blocked by low pass filter 455 (or by filter 442 when the embodiment shown in FIG. 13a applies) and filter 460, signal W transmits through high pass filter 463, coupling network 449 and filter 461 to processor 439. Processor 439 converts video signal W to an FM signal between 24–54 Mhz, and transmits it through filter 445 and coupling network 437 onto extended pair 405b. (The relatively wide bandwidth is advantageous because, being at relatively high frequencies, the signal will suffer more attenuation and be received at a lower SNR. Increasing the bandwidth compensates for this by making the reception process more sensitive.)

Meanwhile, video receiver 419b detects control signal B (FIG. 8) which is issued by the user with infrared remote control transmitter 493b. Video receiver 419b converts this signal to voltage variations within the 0.5 Mhz band centered at 23 Mhz, and feeds the signal onto local network 411b. Following the same route as video signal W, control signal B transmits to processor 439. Processor 439 receives control signal B and video signal W combined on the same conductive path. After processing, control signal B is at a higher energy level. (Signal W is converted as described above.) The two signals are fed through filter 445 to coupling network 437. Filtering at network 437 routes the combined signal onto extended pair 405b. One of the detailed embodiments of processor 439 shown below includes export processor 441b. That component is designed to conduct the processing of video signal W and control signal B used in this example.

It will be appreciated that the part of signal processor 439 that receives RF signals from pair 405b and the part that feeds signals onto pair 405b, together with coupling network 437 and filters 438, 445, and 442 comprise a transceiver that performs two-way RF communication with a network of active twisted pair wiring, specifically, extended pair 405b. A complete description of the basic signal processing elements required of such a transceiver is given in the first CIP application. The processing implemented by components 439, 437, 445, 442, and 438 of this disclosure includes those elements.

It will further be appreciated that the part of signal processor 439 that receives RF signals from local network 411b and the part that feeds signals onto local network 411b, together with coupling network 449 and filters 442, 460, 461, and 463 also comprise a transceiver that performs two-way RF communication with a network of active twisted pair wiring, specifically, local network 411b. A complete description of the basic signal processing elements required of such a transceiver is also given in the first CIP application. The processing implemented by components 449, 460, 442, 461, 463, and 439 of this disclosure includes those elements.

Figure 11A:
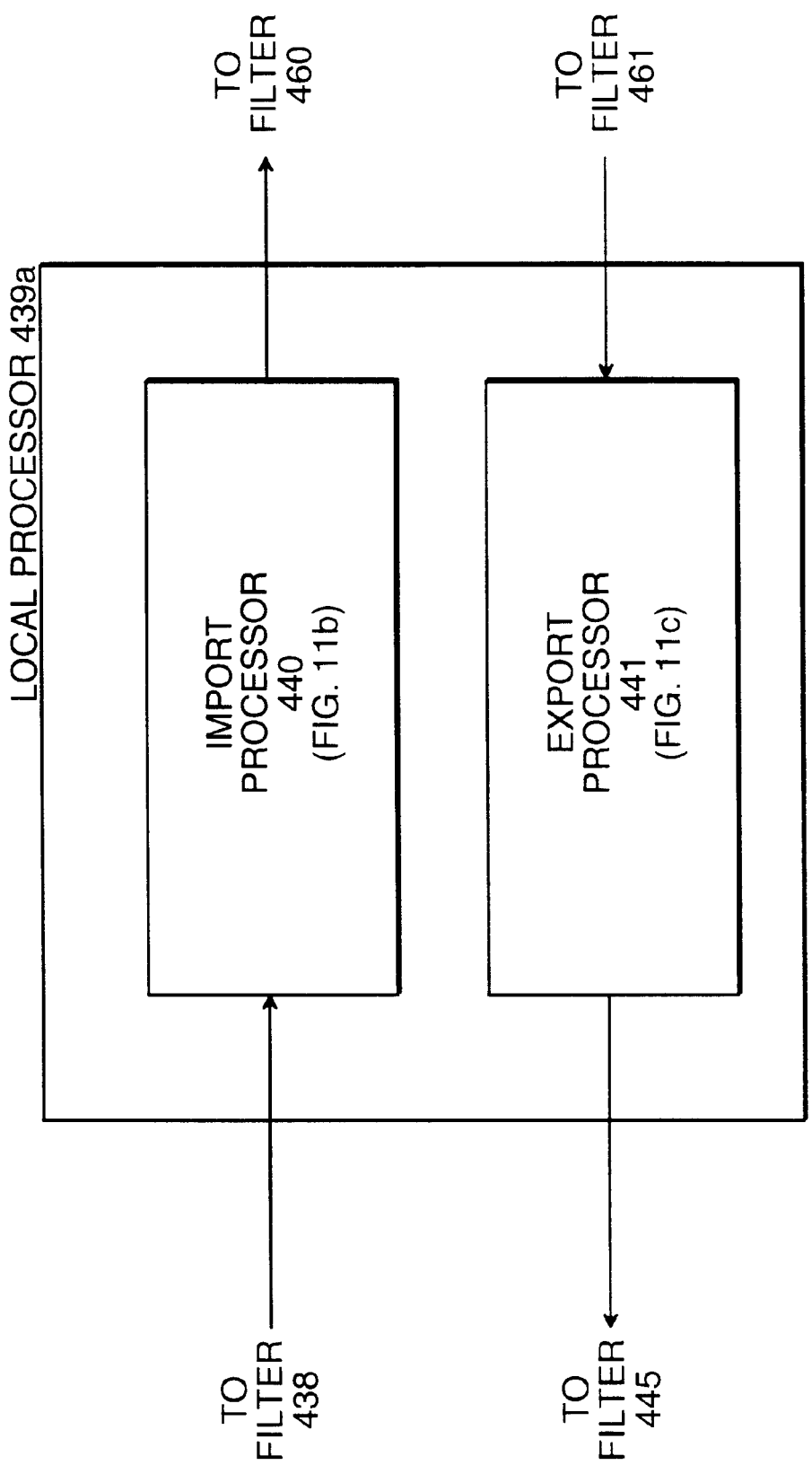
FIGS. 11a–11c show additional details of various embodiments of components of the local network interface of FIG. 10 that process the non-telephone signals transmitting between the local networks and the transceiver/switch.
Figure 11B:
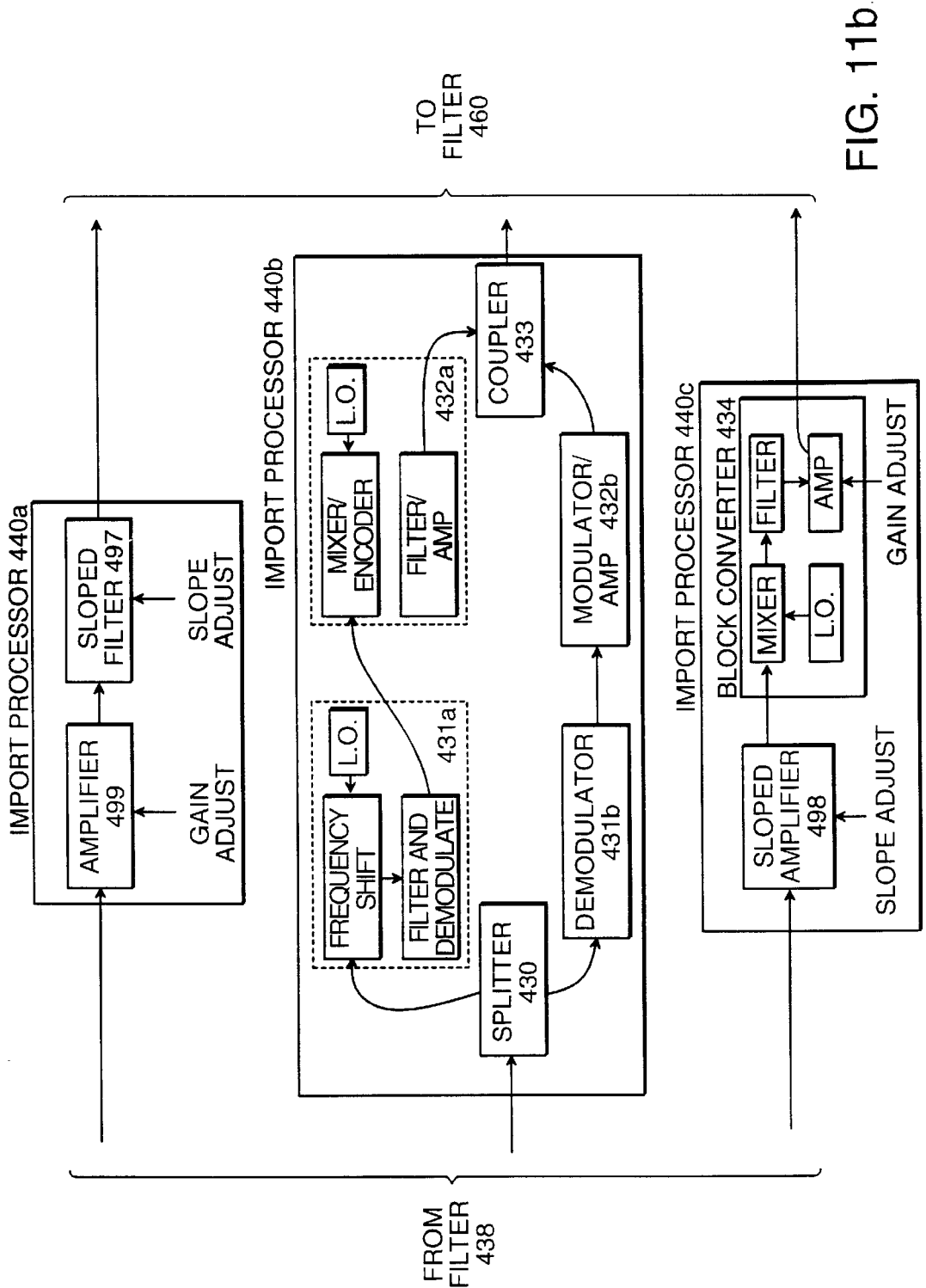

4) Details of Specific Embodiments of Local Processor 439 (FIGS. 11a, 11b)

FIG. 11a shows processor 439a which is a specific embodiment of processor 439. In processor 439a, all of the non-telephone signals received from local network 411b are transmitted through filter 445 and onto extended pair 405b, and all non-telephone signals received by that processor from extended pair 405b are transmitted through filter 460 and onto local network 411. This simplifies the design, enabling processor 439a to be separated into two independent processors. As is seen in FIG. 11a, non-telephone signals transmitting from extended pair 405b onto local network 411b transmit through import processor 440. Non-telephone signals transmitting in the other direction, from local network 411b to extended pair 405b, transmit through export processor 441.

Import processor 440 converts the signals it receives from extended pair 405b to the waveform, frequency, and signal level at which they are fed through filter 460, network 449, and high pass filter 463 onto local network 411b. FIG. 11b shows three different embodiments of import processor 440.

Processor 440a, which is shown at the top of FIG. 11b, does not alter the waveform or frequency of its input. Rather, processor 440a simply adjusts the signal energy to a selected level. Typically, this adjustment results in an amplitude increase, thereby increasing the SNR at the RF receivers connected to local network 411b.

Typical governmental regulations do not limit the total energy that can be radiated by a single device. Rather, each individual signal transmitted by an RF device faces limitations on the radiation it can generate. For this reason, transceiver/switch 400 feeds each signal to extended pairs 405 at energy levels that create radiation just below the legal limits. This will maximize the SNR at the opposite end of extended pairs 405. For the same reason, import processor 440a boosts the levels of the signals it receives back to these "maximums" before retransmission onto local network 411b.

Because signals at higher frequencies encounter more attenuation, they will be received at levels further below the maximum than lower frequency signals. Thus, import processor 440a provides a gain that increases with frequency. This is achieved by a two phase process. In the first phase, the same gain is imparted to signals at all frequencies by amplifier 499. In the second phase, filter 497 applies an attenuation to the signal that decreases with increasing frequency, thus providing an output signal whose gain increases with frequency. Although this two-phase process is described herein, other techniques that impart a "sloped gain" can be used.

To provide a device that can be used in a variety of installations, processor 440a allows the overall gain and the slope of the gain to be adjusted. As shown in FIG. 11b, these adjustments are preferably manual. (Alternatively, the adjustments can be made automatically using suitable feedback techniques.) Manual means are acceptable because the levels of signals received from transceiver/switch 400 are not likely to change, making an initial adjustment sufficient. Also, it is likely that local network interfaces 404 will be professionally installed, removing another reason for providing automatic adjustment.

Processor 440b (shown in the center of FIG. 11b) is designed to receive multiple (two in the embodiment shown) signals from extended pair 405c. (Because they are recovered from a single pair, of course, each signal will be confined within different frequency bands.) Processor 440b demodulates, basebands and then remodulates each signal, providing them at a specific waveform, frequency, and energy level.

Processor 440b is especially useful when the signals transmitted over pairs 405 are FM video signals. If video signals transmit onto local networks 411 in FM form, video receivers 419 must convert them to AM because most ordinary televisions only receive AM signals. (Some receive unmodulated signals, none receive FM video signals.) Referring to FIG. 8, processor 440b can implement the conversion that local network interface 404a performs on video signals U and V before those signals are transmitted onto local network 411a.

The functioning of processor 440b is as follows. The combined signals are divided in power by splitter 430, transmitting to demodulators 431a and 431b. Each of those components basebands a different one of the signals. The basebanded signals transmit to modulator/amps 432a and 432b, respectively. These components convert their basebanded signal to the new waveform, frequency band, and energy level, and feed them to coupler 433. (FIG. 11b shows the individual steps of the modulation and demodulation processes inside the blocks representing demodulator 431a and modulator 432a.) Coupler 433 recombines the signals, which are expressed within non-overlapping frequency bands, providing them to filter 460 along the same conductive path.

Import processor 440c (shown at the bottom of FIG. 11b), is designed to block convert signals from one frequency range to a second frequency range. Referring to FIG. 8, assume that in addition to video signal V transmitting between 1 and 6 Mhz, a second video signal (not shown in FIG. 8) is amplitude modulated between 6–12 Mhz and transmits across extended pair 405*b*. Both these signals transmit to import processor 440*c* and are upshifted in block converter 434 by 60 Mhz, thereby converting them to frequency bands of 61 MHz–66 MHz (VHF channel 3) and 66 MHz–72 MHz (VHF channel 4), respectively. Because these channels are tunable by ordinary televisions, video receiver 419*b* will not need to convert the signals before transmitting them to television 492*b*. The signals are amplified after conversion, then exit towards filter 460 and are applied to local network 411*b*. This block conversion can also enable the video signals to coordinate (i.e., avoid interference) with video signals transmitting locally across local network 411*b*, i.e., between video transmitter 417*b* and video receiver 419*b*.

Import processor 440*c* includes sloped amplifier 498 and block converter 434. Sloped amplifier 498 performs a process similar to that of import processor 440*a*. It amplifies the input, but imparts more gain to the higher frequencies because they have attenuated more during transmission across the associated one of extended pairs 405. The output of sloped amplifier 498 is fed to block converter 434. As is seen in FIG. 11*b*, that component shifts the signal in frequency by an amount equal to the frequency of a local oscillator. In the example above, the shift is 60 Mhz. The resulting signal is passed through a filter, amplified, and transmitted to filter 460. (In the example above, filter 460 would pass only the frequencies between 60–72 Mhz.) To allow import processor 440*c* to be used in a variety of installations, the gain of the amplifier in block converter 434 is manually adjustable, as is the slope of amplifier 498. (In practice, these settings would be adjusted to provide all of the output signals at levels that generate radiation slightly below the governmental limit.)

Figure 11C:
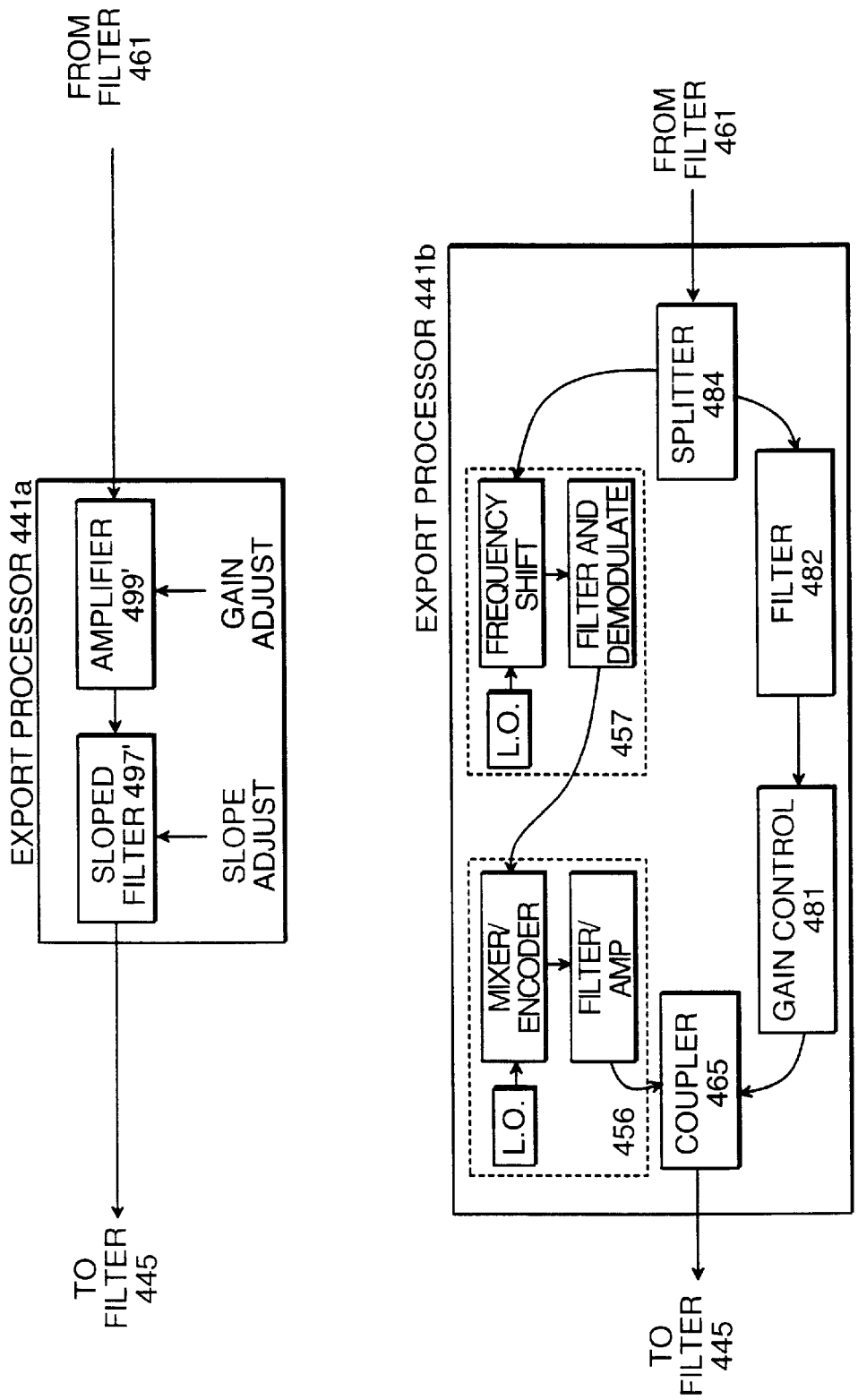

Export processor 441 receives signals from local network 411*b* and converts them to the waveform, frequency, and signal level at which they are fed, ultimately, to extended pair 405*b*. Two embodiments of export processor 441 are shown in FIG. 11*c*, and are now described.

Export processor 441*a* amplifies the level of the signal applied to it, providing these signals on output at levels that will create radiation on the extended pair 405 just below the legal limits. As such, it must impart a higher gain to the higher frequency signals because they have suffered more attenuation in transmitting across network 411*b*. Thus, it works in a manner identical to import processor 440*a* (FIG. 11*b*), and its components, amplifier 499' and sloped filter 497', correspond in function to amplifier 499 and sloped filter 497 of processor 440*a*.

Export processor 441*b* is designed to provide frequency and/or waveform conversion for one of its input signals, and to simply adjust the energy level of the others. The signals received by export processor 441*b* pass to splitter 484, which directs the signals to both demodulator 457 and filter 482. Demodulator 457 selects one of the signals for demodulation. The basebanded result is passed to modulator 456 which remodulates the signal, providing it with a different waveform, frequency, and energy level. (The typical modulation and demodulation steps are shown internal to the blocks representing modulator 457 and demodulator 456.) Filter 482, meanwhile, filters out the signal selected by demodulator 457, passing the remaining signal or signals for amplitude adjustment by gain control 481 to a fixed level, typically resulting in a level increase. (Gain control 481 performs its processing in a manner identical to the processing performed by export processor 441*a* and import processor 440*a*.) The output of gain control 481 and the output of modulator 456 (which are in different frequency bands) are then combined onto the same conductive path by coupler 465, and passed to filter 445.

Referring to FIG. 8, an example of the processing conducted by export processor 441*b* is given. Video receiver 419*b* provides control signal B between 22.75–23.25 Mhz and feeds it onto local network 411*b*, and video transmitter 417*b* feeds video signal W onto local network 411*b*, using amplitude modulation between 6–12 Mhz. At local network interface 404*b*, video signal W is selected and demodulated by demodulator 457, and then frequency modulated between 24–54 Mhz by modulator 456. Control signal B, meanwhile, passes through filter 482 to gain control 481, which increases its energy level. These two signals are then joined by coupler 465 and fed onto extended pair 405*b* by other components of local network interface 404*b*.

Figure 12:
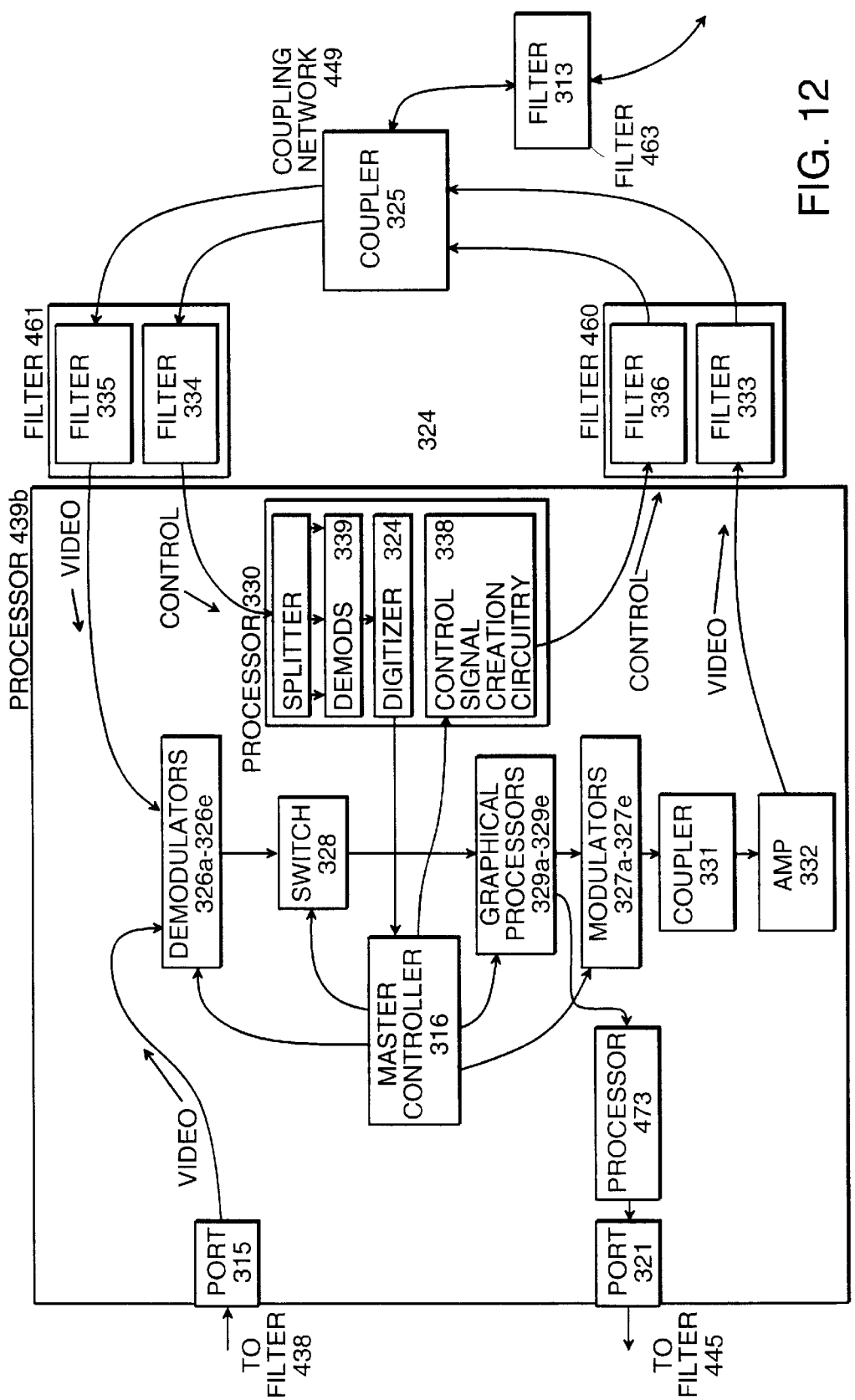
FIG. 12 shows one of the RF processors (described in the second CIP application) that performs part of the function of the local network interface of FIG. 10.

5) An Embodiment of Local Processor 439 that Retransmits Signals Recovered from Local Network 411*b* (FIG. 12)

As discussed above, FIG. 10 shows a general embodiment of processor 439. As can be seen from that figure, processor 439 receives signals from local network 411*b* and also transmits signals onto that network. (The signals transmitted onto local network 411*b* are either received from extended pair 405*b*, received from local network 411*b*, or they are generated internally.) In the more specific embodiments shown in FIGS. 11*a*–11*c*, only those signals recovered from extended pair 405*b* are fed onto local network 411*b*.

Processor 439*b*, shown in FIG. 12, is a different specific embodiment of processor 439, and is described in this section. In contrast to processor 439*a*, the signals transmitted onto local network 411*b* by processor 439*b* can come from two sources: 1) they can be signals recovered from extended pair 405*b*, or 2) they can be signals received from local network 411*b*.

There are several reasons to provide for both sources. One of the advantages is that it allows for certain simplifications and economies in design of the components that receive the video signals, i.e., video receivers 419. It also allows for modifications of the retransmitted signals to be applied by a single device, i.e., the device performing such retransmission. Such modifications can include superposition of textual information such as a clock, a channel display, etc.

These advantages are described in the second CIP application, wherein a similar signal processing device, RF video processor 312, is described. That device recovers video signals from a network of telephone wiring, processes those signals, and retransmits them onto the same network. Processor 312 is slightly modified in this application to provide processor 439*b*. More precisely, RF/video processor 312, shown in FIG. 2 of the second CIP application, is modified and combined with master controller 316 of the second CIP application to provide a specific embodiment of the following elements of this application: processor 439, filters 461, 460, 463, and coupling network 449.

To see how RF/video processor 312 is modified, realize that two of the functions of processor 439, receiving signals from network 411*b* and transmitting them onto that network, are already part of processor 312. The other two functions, receiving signals from extended pair 405*b* and converting signals and feeding them through filter 445 and onto extended pair 405*b*, are provided in the following manner.

As described in the second CIP application, signals output from graphical processors 329 are basebanded video signals, but they can also be basebanded signals of a general nature. Any one of these outputs can be split, under control of master controller 316, and fed to processor 473. Processor 473 converts the signal to the waveform, frequency, and amplitude at which it will transmit across extended pair 405b. Finally, the signal is fed through port 321 to filter 445. After passing through that filter, the signal follows the transmission path, described above, onto extended pair 405b.

As described earlier, signals received from extended pair 405b pass through filter 438. To feed these signals to processor 312, a conductive path is provided between filter 438 and port 315. (In the second CIP application, one intended function for port 315 was to input cable TV signals.) Thus, this simple connection, plus processor 473, are the only additions necessary to adapt processor 312 to perform all of the functions of processor 439.

Note that in the embodiment shown in FIG. 12, filter 461 is actually two separate filters, as is filter 460. Furthermore, each conductive path leading to and from those filters is actually composed of two separate parallel paths. This separation is due to the fact that in this embodiment, processor. 439 recognizes a separate class of signals and processes them differently.

The signals in the special class are those intended communicate with master controller 316, and also signals sent by controller 316 that are intended to control devices that receive signals from or transmit them to local network 411b. In particular, the control signal from infrared transmitters 493b are detected by video receiver 419b, converted to voltage, and fed onto network 411b. This signal passes through filter 334 to processor 330.

In the reverse direction, master controller 316 instructs control signal creation circuitry 338 to generate control signals and feed them through filter 336 (part of filter 460) onto local network 411b. These signals will be received by video transmitters 417 and converted to infrared signals that are broadcast into the environment where they can be detected by nearby infrared responsive devices, such as TV 492b. This communication process is described more fully in the second CIP application.

Figure 14:
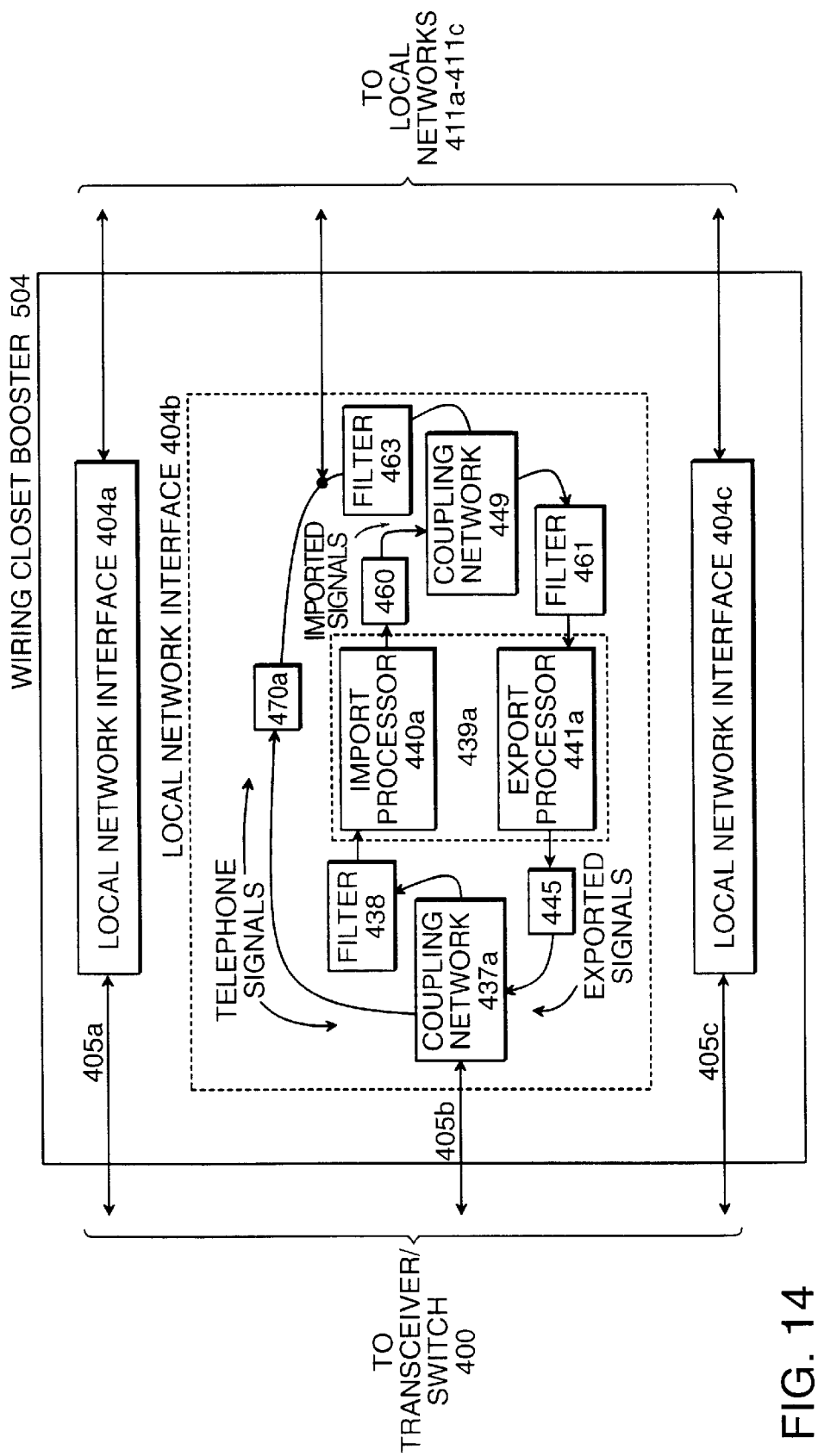
FIG. 14 shows additional details of a wiring closet booster that includes several local network interfaces for boosting the levels of signals transmitting in both directions between the transceiver/switch and several of the local networks.

L. Boosting Signal Power within a Wiring Closet (FIG. 14)

As discussed above, the twisted pairs providing telephone service to the units of an apartment building often converge in a room in the basement of such a building, providing a point of common access to a large number of units. Other "common points of access" often available in an apartment building are the wiring closets that are often located on every floor. These provide an intermediate point of convergence to the telephone wires of the units on that floor. Bundles of multiple twisted pair wires often lead from the basement location to the wiring closets.

Locating transceiver/switch 400 in the basement is an economical alternative because it frees one from the requirement of bringing communication line 402 to the wiring closet of each floor, and because one device embodying transceiver/switch 400 can suffice for the entire building. (Although this device will need to have more internal components, economies will be enjoyed in hardware, maintenance, and installation.)

In very large apartment buildings, however, the distances may be such that extended pairs 405 will be relatively long for certain apartment units. As is described above, this increases the attenuation of transmission, preventing the use of higher frequencies and limiting the number of signals that can transmit at a single time. One solution to this problem is to provide amplification of the signals at an intermediate points, such as in the wiring closets.

Amplification at an intermediate point is most useful if half of the signal attenuation occurs before amplification, and half occurs afterwards. It can be shown that this maximizes the SNR at the receive end. To see this, assume that amplifying a particular signal to 50 dB and applying it to telephone wiring creates EMF radiation just below the legal limits. Assume further that a given transmission path imparts 30 dB of attenuation and that the noise level at the input to the amplifier and at the input to the receiver at the end of the path is 5 dB mV. Assuming the signal encounters the amplifier after 25 dB of attenuation, the SNR at the amplifier input will be 20 dB. Because the amplifier processes signal and noise in parallel, and both signal and noise attenuate in parallel during transmission to the receiver, the SNR will be no higher than 20 dB at the input to the receiver.

Now assume that the amplifier is encountered after only 5 dB of attenuation. The signal level at the amplifier output will still be 50 dB mV but 25 dB of attenuation is encountered in transmission to the receiver, making the signal level 25 dB mV at that point. Because the noise will again be at its 5 dB mV minimum, the SNR will be 20 dB.

By contrast, if amplification is applied after 15 dB of attenuation, which is the "midpoint", the signal level at both the amplifier input and the receiver input will be 35 dB mV, and the SNR at the receiver will be 30 dB.

Often, signal loss is divided approximately evenly between the attenuation of transmission on extended pairs 405, and the attenuation cause by the splits in signal energy that occur at the junctions of local networks 411. This is an important reason why local network interfaces 404 are useful. When transceiver/switch 400 is located on a telephone pole, for example, the initial signal level is often sufficient to provide a good SNR at each of local network interfaces 404, and the received signal is then boosted to transmit across local networks 411 to present at a receiver 419 with adequate SNR.

The wiring configuration of most apartment buildings offers a similar opportunity. Specifically, amplification devices can be placed in the wiring closets to boost the level of the signals transmitting in both directions between transceiver/switch 400 and local networks 411. As such, this booster serves the function of local network interfaces 404, being located in a wiring closet instead of being mounted on the an external wall of a house.

A major advantage of this location is that one electronic device can provide the hardware for several local networks 411 at the same time. This provides hardware, installation, and maintenance economies. (A disadvantage is that the wires from several local networks 411 are still close enough to make crosstalk an issue.)

FIG. 14 shows a design for wiring closet booster 504, which houses local network interfaces 404a, 404b, and 404c. A situation where local interfaces 404a–404c can be co-located can occur, for example, when the five local networks 411 are located in different units in an apartment building, and the units of local networks 411a, 411b, and 411c are located on the same floor and served by the same wiring closet.

Only the details of local network interface 404b are shown. Furthermore, it is seen that the signal processing in each of 404a, 404b, and 404c is independent and that they operate on different signals. It will be appreciated, however, that local interfaces 404a–404c can be serviced by the same power supply. This is one of the hardware economies of including them in the same housing.

The embodiment of local network interface 404b shown in FIG. 14 is similar to that shown in FIG. 10. The only differences are that some of the components are replaced by components that represent more specific embodiments. Specifically, coupling network 437a, telephone signal processing section 470a, and local processor 439a, represent coupling network 437, telephone signal processing section 470, and local processor 439. Internal to local processor 439a, import processor 440a represents import processor 440, and export processor 441a represents export processor 441.

According to the descriptions, provided above, of the components that are shown in FIG. 14, telephone signals transmit at baseband through telephone signal processing section 470a between extended pair 405b and network 411b. Also, non-telephone RF signals from transceiver/switch 400 transmit through coupling network 437a, filter 438, import processor 440a, filter 460, coupling network 449, and filter 463 onto local network 411b. In the opposite direction, non-telephone RF signals transmit from local network 411b through filter 463, coupling network 449, filter 461, export processor 441a, filter 445, coupling network 437a and across extended pair 405b to transceiver/switch 400. Filters 460 and 445 are shown with dashed lines because these filters may not be necessary if the directional multiplexing in coupling networks 437a and 449 provides strong isolation of transmission paths.

Important to booster 504 are import processor 440a and export processor 441a. These components amplify their input signals, outputting the individual signals in the various frequency bands at the energy level at which the radiated energy they create is just below the legal limit. This maximizes the SNR of non-telephone signals received from local networks 411a–411c, and the SNR of non-telephone signals received from transceiver/switch 400.

There may be applications for allowing for communication between local networks 411 by transmitting signals between the ones of local network interfaces 404 located together within wiring closet booster 504. This function is contemplated within this disclosure but technology to achieve it is not specifically described.

M. Transmission of Compressed Digital Video Signals (FIG. 15)

As described above, NTSC video signals can be digitized and compressed, without losing information content, so that the resultant digital bitstream has a data rate that is slow enough to be expressed as an analog waveform in a remarkably narrow channel. Specifically, the resulting waveform can be confined within channels less than 4 Mhz wide, and can be accurately received with SNRs less than 30 dB. Thus, video signals encoded in this manner are more amenable to transmission within the system disclosed herein than even FM video signals.

Transmission of digital signals between transceiver/switch 400 and local networks 411 was described above. Conceptually, these components are sufficient to transmit a digital bitstream representing a video signal. That description, however, does not include the digitization and compression components that may be used to convert the signal at the transmit end, and does not include the elements that may be used to reconstruct the signal so that it can be viewed at the receive end. Those components and the manner in which they coordinate with the other elements of this communication system are the subject of this section.

As mentioned earlier, electronics that digitize and compress analog NTSC video signals in real time are relatively expensive, as are the electronics that perform the subsequent reconstruction of the analog signal from the digital bitstream. The expense typically increases dramatically with the compression ratio, so that a compression process that allows the resulting bitstream to be expressed in bandwidths less than 4 Mhz and minimum SNRs less than 30 dB is relatively complex and costly.

As a result, transmission of compressed digital video is comparatively less complex and expensive if the video signals on communication line 402 are already in this form (i.e. an analog waveform representing a compressed digital bitstream) when they are applied to transceiver/switch 400. Such a system can be very economical in distribution of cable TV, where a group of video signals is to be made available for selection by a large number of subscribers. The economy arises from the fact that this single group of signals need be digitized and compressed only once—at the head-end of the cable system.

Referring to FIG. 5a, signal distribution subsystem 403a can select digitized video signals from communication line 402 and to feed them onto extended pairs 405. Indeed, transmission of these signals is, as a practical matter, no different than transmission of the digital signals described above.

Following is an example. Assume communication line 402 is a single coaxial cable that provides 60 channels of digital video signals, confined within adjacent 4 Mhz bands that extend between 200 Mhz and 440 Mhz. These signals are received by interface 409 and transmitted directly to splitter 426' in subsystem 403a. (I.e., interface 409 does not block shift or otherwise process these signals.) Splitter 426' feeds the signals to each demodulator 426. Under control of master controller 415, demodulator 426a basebands the channel between 204 MHz and 208 Mhz, and transmits it to switch 462a, which in turn applies this basebanded signal to modulator 410d. Modulator 410d remodulates the signal, using AM, to the frequencies between 12 MHz–16 Mhz. Thus, the effect of this modulation/demodulation is simply to shift the signal to the new band. The output of modulator 410d is fed to switch 401, and that device directs the signal through signal separator 413b onto extended pair 405b.

If subsystem 403c (FIG. 5c) is provided instead of subsystem 403a, the processing and signal flow work similarly. In this case, RF processors 485 convert the selected signal to the channel between 12 MHz and 16 Mhz.

If local network interfaces 404 are provided, they can receive the digital signals from extended pairs 405, amplify them, convert them in frequency, and retransmit them onto local networks 411, all using the techniques described above. If local network interfaces 404 are not provided, these are signals transmitted directly onto local networks 411 confined within a channel whose bandwidth is the same as the original channel confining the digital signal.

Referring to FIG. 15, the digital signals transmitted onto local networks 411 are received by digital video receiver 505. This device is not shown connected to any local network in FIGS. 1a or 1b. It is shown connected to TV 492b and local network 411b, however, and it coordinates with the rest of the system components in the same manner as video receiver 419b.

In a general sense, this receiver is identical to television transceiver 15, shown in FIG. 2 in the parent application. Specifically, video processing circuitry 506 corresponds to RF converter 19, coupling network 513 corresponds to coupling network 18, and control signal processing circuitry 514 corresponds to control signal processing circuitry 17.

Video signals from local network 411b are blocked from telephone device 414b by the low pass filter and are directed by coupling network 513 to video processing circuitry 506. Coupling network 513 and circuitry 514 function identically to their corresponding components in transceiver 15.

Like RF converter 19, video processing circuitry 506 converts the received video signal to a form that is tunable by ordinary televisions. The following process is used, however, because the signal is an analog representation of a bitstream that represents a video signal.

In the first stage of the processing, the video signal is basebanded in the ordinary fashion. The elements in FIG. 15 show the steps of this process: shifting to an intermediate channel by mixing with a local oscillator, filtering of the intermediate channel, and then demodulation. Using the example above, the 16 MHz–20 Mhz signal may be shifted to the 40 MHz–44 Mhz band, filtered, and then detected, resulting in a basebanded signal. Alternatively, the "intermediate channel" can be fixed at 16 MHz–20 Mhz, removing the need for frequency shifting.

In the second stage, the basebanded analog signal is converted to a digital bitstream, which is decompressed in real time. In the classic procedure, a digital process reads the bitstream and uses that data to fill out a matrix of storage locations representing the pixels of the image. This matrix is refreshed 60 times a second, the "refresh rate" of NTSC video. The actual NTSC signal is then created by scanning across the storage locations (conceptually, the pixels of a frame) just as a video camera creates a picture by scanning across a photoconductive grid.

The third stage is the modulation stage. The newly recreated NTSC signal is passed to this stage at baseband. It is mixed using a local oscillator, creating an AM NTSC signal in the ordinary manner. This signal is passed to TV 492b.

Note that channel selection still takes place in the ordinary manner. Using the examples above, IR transmitter 493b issues infrared signals that are detected by the IR sensitive diode of receiver 505. These signals are converted by circuitry 514 to, for example, a 0.5 Mhz signal centered at 23 Mhz. (This is the frequency used for communication of control signals in FIG. 8.) These signals are applied to local network 411b and transmit to master controller 415 using the circuitry and signals paths described in the sections above. In response to this signal, controller 415 can instruct demodulator 426a to select a different channel from among the 60 available between 200 MHz–440 Mhz on communication line 402.

When FM communication techniques are not sufficient due to the length of extended pairs 404 and the nature of local networks 411, communication of the video signals in compressed digital form is indicated, even if signals are provided by communication line 402 in analog form. In that event, digitization and compression are performed prior to transmission onto extended pairs 405. This conversion can take place in signal distribution subsystem 403a.

Referring to FIG. 5a, the desired result can be achieved by replacing one of modulators 410 for every digital video signal provided by processor 418. The new processors 410 are similar in that they receive a basebanded video signal and output an analog waveform confined within a particular channel at a signal level that creates radio energy just below the legal limits. The difference is that the waveform now represents a compressed digital bitstream, which in turn represents the original NTSC signal.

The above description includes the components used to transmit digital video signals from transceiver/switch 400 to local networks 411. Similar techniques can be used for transmission in the opposite direction but are not specifically described herein.

Figure 16:
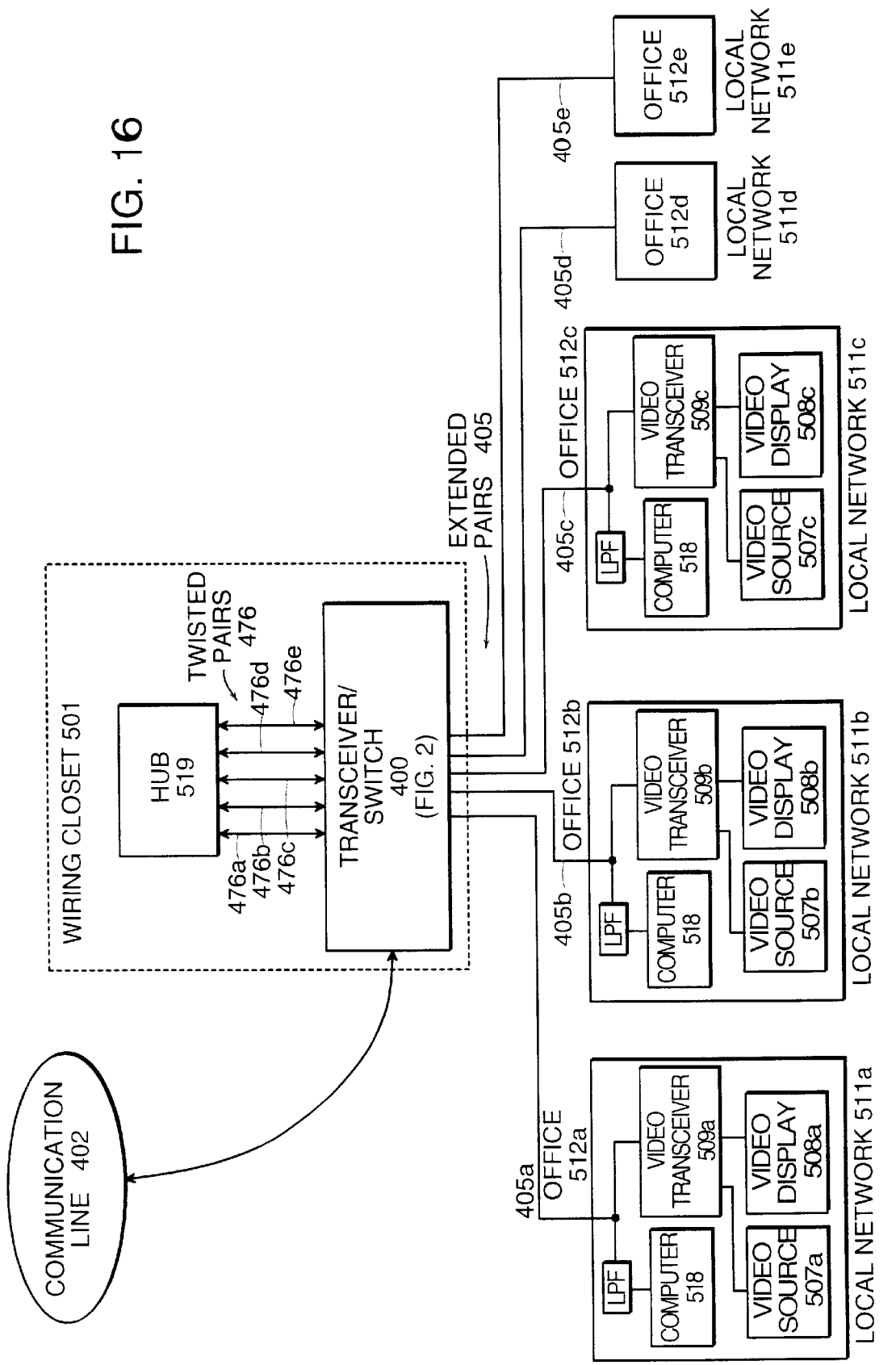
FIG. 16 shows another embodiment of the invention.

N. Transmission of Video Signals Across Computer Communication Networks with "Star" Configurations (FIG. 16)

As described in the summary section, in many office buildings, the telephone wiring is not the only network of twisted pair wiring that extends to each office and converges at a common point. Over the past several years, common communication networks that connect personal computers, known as Local Area Networks or LANs, have begun to use twisted pair wiring for their conductive paths. In the typical configuration, a digital electronic device serves as the "hub" for such a system, and a separate twisted pair wire connects from the hub to each of the computer nodes in a "star configuration". In this section, the techniques described for communication across wiring networks that conduct telephone communication are extended to provide the same communication capabilities across computer networks that used twisted pair wiring and adopt such a "star" configuration.

To illustrate such a star configuration, one need only change a few of the elements of the setup shown in FIG. 1b. The result is shown in FIG. 16. One change is that PBX 500 is replaced by communications hub 519, which is the digital device that serves as the "nerve center" of the communication system. Another change is that line 475' is not required. Finally, telephone devices 514 are replaced by computers 518, which are the devices that communicate across the network using the concepts described herein.

The only fundamental change required when the communication medium is provided by this new system is that the lower bound on the frequencies available for communication with line 402 (or for communication between the RF transmitters, receivers, and transceivers connected to the local networks) will be higher. Specifically, the lower bound must be above the highest frequency used for communication between computers 518 and hub 519. For example, when the computer communication system follows the 10 Base T standard, which is the most popular standard for local area networks that use twisted pair wires, the computers communicate at frequencies up to 15 Mhz, and the lower bound must be above that above that frequency.

Following are the electronic changes that should be made to provide all of the functions discussed above:

1) The low pass filters connecting between computers 518 and local area networks 511 must have higher cutoff values. Specifically, the cutoff frequency must be high enough to pass the communication signals transmitting between hub 519 and computers 518.
2) The cutoff frequency of low pass filters 474 (FIG. 2) is increased in a similar fashion. The cutoff frequency of low pass filter 442 should also be increased if local network interfaces 404 are provided.
3) The cutoff frequency of hi-pass filter 451, which is part of signal separators 413 shown in FIG. 9a, should be raised above the highest frequency used by computers 518. Thus, this filter will not pass some of the lower frequency signals it passed previously.
4) The spectral distributions shown in FIG. 3 will not be available if they overlap the frequencies used by the computer signals. Higher frequencies can be used.
5) The minimum frequencies suggested in Section C will also not be available if they overlap the frequencies used by the computer signals.

O. Preventing Unintended Reception and Control Signal Confusion

The problem of energy from one extended pair crossing over to a second pair and causing interference with video signals was described above. One proposed solution was to lower the susceptibility to interference by encoding the signals using frequency modulation. Susceptibility would be reduced because of the low "capture ratios" exhibited by FM receivers.

A second problem is caused by energy crossover, however, that may not be adequately addressed by low "capture ratios." This problem is one that arises when the second pair is not being used to conduct video signals, and the energy crossing onto that wire is sufficient to allow reception of the signal on the local network to which the second extended pair connects. A related problem is where the control signal transmitted onto one extended pair crosses over to a second pair, causing transceiver/switch 400 to react as if a control signal had genuinely been applied to the second pair.

The proposed solution is to ensure that a signal always transmits onto each of the extended pairs in a bundle within each of the channels used for transmission, whether or not a genuine signal is intended for conduction at that channel. A convenient way of doing this is to transmit the unmodulated carrier for every channel onto those wire pairs that are not intended to conduct a signal at that channel. Similarly, continuously transmitting the carrier of the control signal can solve the related problem of control signal "confusion."

Following is an example using the signals listed in FIG. 8. Note that video signal V is transmitted onto extended pair 405a between the frequencies of 7 Mhz and 22 Mhz. This signal is created by frequency modulating a carrier of 14.5 Mhz, and is received by local network interface 404a and relayed onto network 411a. Assuming that signal V was not transmitted onto extended pairs 405b and 405c but crosses over onto pairs 405b and 405c, there would be a danger that the crossover signal V could be received by local network interfaces 404b and 404c. (FIG. 8 shows that signal V is indeed transmitted to networks 411b and 411c between 1–6 Mhz, but we will ignore that fact for the purposes of this example.) The proposed solution is to transmit the unmodulated 14.5 Mhz carrier onto extended pairs 405b and 405c, lowering the SNR of the crossover video signal V received by local network interfaces 404b and 404c below acceptable levels.

Continuing the example, users at network 411a may issue infrared control signals that are transmitted over extended pair 405a by modulating a carrier with a fundamental frequency of 23 Mhz. Theoretically, these signals can crossover onto extended pairs 405b and 405c, incorrectly exciting control signal processor 420 in transceiver/switch 400. The proposed solution is to have video receivers 419b and 419c continuously feed their 23 Mhz carrier, unmodulated, onto networks 411b and 411c (from which they are relayed onto extended pairs 405b and 405c by local network interfaces 404b and 404c.)

Still other embodiments are within the scope of the following claims.

What is claimed is:

1. A system for communicating information between an external source of information and destinations of information over a telephone wiring network used for passing telephone signals in a telephone voice band between a plurality of telephone devices and a telephone exchange, comprising:

a transceivers coupled between a conductive path of the telephone wiring network and a first destinations of information, including circuitry coupled to said conductive path for accepting signals in a high frequency band of frequencies above the highest frequency of the telephone voice band and rejecting signals in the telephone voice band;

a plurality of filters, each coupled between said conductive path and a corresponding one of the plurality of telephone devices, for preventing transmission of signals in the high frequency band to the telephone devices; and a signal interface coupled between the external source of information and said conductive path, including
      circuitry for receiving an external signal encoding an information stream from the external source of information,
      circuitry for transmitting over the telephone wiring network to the transceiver an internal signal in the high frequency band encoding the information stream, and
      circuitry for limiting transmission of the internal signal in the high frequency band from the telephone wiring network to the telephone exchange and for passing signals in the telephone frequency band between the telephone wiring network and the telephone exchange;

wherein each of the plurality of filters is coupled to said conductive path at a location separated from the transceiver and from the signal interface.

2. The system of claim 1 wherein the telephone wiring network includes a plurality of separate conductive paths that includes the first conductive path, each of the plurality of separate conductive paths being coupled to the signal interface.

3. The system of claim 2 further comprising additional transceivers, each coupled between a different one of the separate conductive paths and a different one of a plurality of destinations of information, wherein the signal interface further includes circuitry for transmitting over the telephone wiring network to each of the additional transceiver an internal signal in the high frequency band.

4. The system of claim 1 wherein the external signal includes an external data signal encoding a data stream and the internal signal includes an internal data signal encoding the data stream.

5. The system of claim 4 wherein the transceiver further includes circuitry for receiving the internal data signal and presenting the data stream to the destination of information.

6. The system of claim 1 wherein the transceiver further includes circuitry for transmitting a control signal in the high frequency band to the signal interface.

* * * * *